(12) United States Patent
Okamoto et al.

(10) Patent No.: US 8,977,716 B2
(45) Date of Patent: Mar. 10, 2015

(54) INFORMATION PROCESSING DEVICE, METHOD, AND PROGRAM

(75) Inventors: Naoya Okamoto, Tokyo (JP); Ken Onogi, Tokyo (JP); Fujio Nobori, Kanagawa (JP); Seiichi Aoyagi, Tokyo (JP)

(73) Assignee: Sony Corporation (JP)

( * ) Notice: Subject to any disclaimer, the term of this patent is extended or adjusted under 35 U.S.C. 154(b) by 404 days.

(21) Appl. No.: 12/449,278

(22) PCT Filed: Jan. 31, 2008

(86) PCT No.: PCT/JP2008/051533
§ 371 (c)(1),
(2), (4) Date: Jul. 29, 2009

(87) PCT Pub. No.: WO2008/093780
PCT Pub. Date: Aug. 7, 2008

(65) Prior Publication Data
US 2010/0030868 A1    Feb. 4, 2010

(30) Foreign Application Priority Data

Feb. 2, 2007    (JP) .............................. P2007-024293
Mar. 27, 2007    (JP) .............................. P2007-082825

(51) Int. Cl.
*G06F 15/16* (2006.01)
*H04N 21/4147* (2011.01)
(Continued)

(52) U.S. Cl.
CPC ......... *H04N 21/4147* (2013.01); *H04N 21/254* (2013.01); *H04N 21/435* (2013.01); *H04N 21/6581* (2013.01); *H04N 21/8173* (2013.01)
USPC ........................... 709/219; 709/227; 719/329

(58) Field of Classification Search
USPC ......................................................... 709/217
See application file for complete search history.

(56) References Cited

U.S. PATENT DOCUMENTS 6,658,522 B1 * 12/2003 Martin et al. ..................... 711/1
7,030,890 B1   4/2006 Jouet et al.
(Continued)

FOREIGN PATENT DOCUMENTS

EP    0 762 686 A2    3/1997
EP    1098246 A1    5/2001
(Continued)

OTHER PUBLICATIONS

Office Action from Japanese Application No. 2008-556175, dated Sep. 4, 2012.
(Continued)

*Primary Examiner* — Viet Vu
*Assistant Examiner* — Herman Belcher
(74) *Attorney, Agent, or Firm* — Lerner, David, Littenberg, Krumholz & Mentlik, LLP

(57) ABSTRACT

The present invention relates to an information processing device, an information processing method, and a program for easily acquiring information. A television receiver accesses an application server and acquires an application list therefrom. When an application is selected from the application list, the television receiver again accesses the application server and acquires the selected application therefrom. While executing a process based on the acquired application, the television receiver accesses a content server as needed and acquires content data therefrom. The acquired application and content data are deleted from a storage unit when an end of the process based on the application is designated. The present invention applies to television receivers which acquire data via a network.

6 Claims, 45 Drawing Sheets

(51) Int. Cl.
*H04N 21/254* (2011.01)
*H04N 21/435* (2011.01)
*H04N 21/658* (2011.01)
*H04N 21/81* (2011.01)

(56) References Cited

U.S. PATENT DOCUMENTS

| | | | |
|---|---|---|---|
| 7,209,253 B2 | 4/2007 | Takayama | |
| 7,376,907 B2 * | 5/2008 | Santoro et al. | 715/765 |
| 2005/0044191 A1 | 2/2005 | Kamada et al. | |
| 2005/0066366 A1 | 3/2005 | Takamine | |
| 2005/0262548 A1 | 11/2005 | Shimojo et al. | |
| 2007/0061724 A1 * | 3/2007 | Slothouber et al. | 715/716 |
| 2008/0120664 A1 * | 5/2008 | Kassam et al. | 725/110 |

FOREIGN PATENT DOCUMENTS

| | | |
|---|---|---|
| JP | 2002-297522 A | 10/2002 |
| JP | 2003-521764 A | 7/2003 |
| JP | 2004-343683 A | 12/2004 |
| JP | 2005-072694 A | 3/2005 |
| JP | 2005522955 A | 7/2005 |
| JP | 2005-303553 A | 10/2005 |
| JP | 2005-303605 A | 10/2005 |
| JP | 2005-310173 A | 11/2005 |
| JP | 2006050237 A | 2/2006 |
| JP | 2006-115213 A | 4/2006 |
| JP | 2006352565 A | 12/2006 |
| JP | 2007512586 | 5/2007 |
| JP | 2009509245 A | 3/2009 |
| WO | WO-01/23995 A2 | 4/2001 |
| WO | 0131442 A2 | 5/2001 |
| WO | 03088645 A1 | 10/2003 |
| WO | 2006024309 A1 | 3/2006 |

OTHER PUBLICATIONS

Office Action from Japanese Application No. 2008-556176, dated Sep. 4, 2012.
Office Action from Japanese Application No. 2008-556177, dated Sep. 4, 2012.
NTT Communications, Net TV Album. Create/See Album, OCN Photograph Friend, NTT Communications Nov. 27, 2006, URL, http://web.archive.org/web/20061127193153/photofriend.jp/aquos/index4.html.
NTT Communications Providing of Trial of Photograph Public Presentation Service, "OCN Photograph Friend" Let Me See Photographs, Photograph Community Which Can have Chat with: NTT Communications News Release, Dec. 20, 2005, URL, http://www.ntt.com/release/2005NEWS/001211220.html, http://www.ntt.com/release/2005NEWS/0012/1220a.html, and http://www.ntt.com/release/2005NEWS/0012/1220b.html.
Colaitis F: La norme MHEG, video a la demande et television interactive. The MHEG standard for video on demand and digital television services. No. 4, Oct. 1, 1995, pp. 33-39, XP 000533328.
Steven Morris et al: "Interactive TV Standards: A Guide to MHP, OCAP, and Java TV (Chapters 3 and 4)", Jan. 1, 2005, Interactive TV Standards, Amsterdam : Elsevier, NL, pp. 41-88, XP 002394425.
Supplementary European Search Report EP 08704280, dated May 24, 2012.
Office Action from Japanese Application No. 2008-556174, dated Jan. 31, 2013.
Office Action from Japanese Application No. 2008-556178, dated Jan. 31, 2013.
Office Action from Japanese Application No. 2008-556175, dated Feb. 5, 2013.
Office Action from Japanese Application No. 2008-556176, dated Feb. 5, 2013.
Lamadon J.L. et al: Usages of a SMIL player in digital television. In Proceedings of the 7th IASTED International Conference on Internet and Multimedia Systems and Applications, Honolulu, Hawaii, Aug. 13-15, 2003, pp. 579-584. IASTED.

* cited by examiner

FIG.44 (44-1)
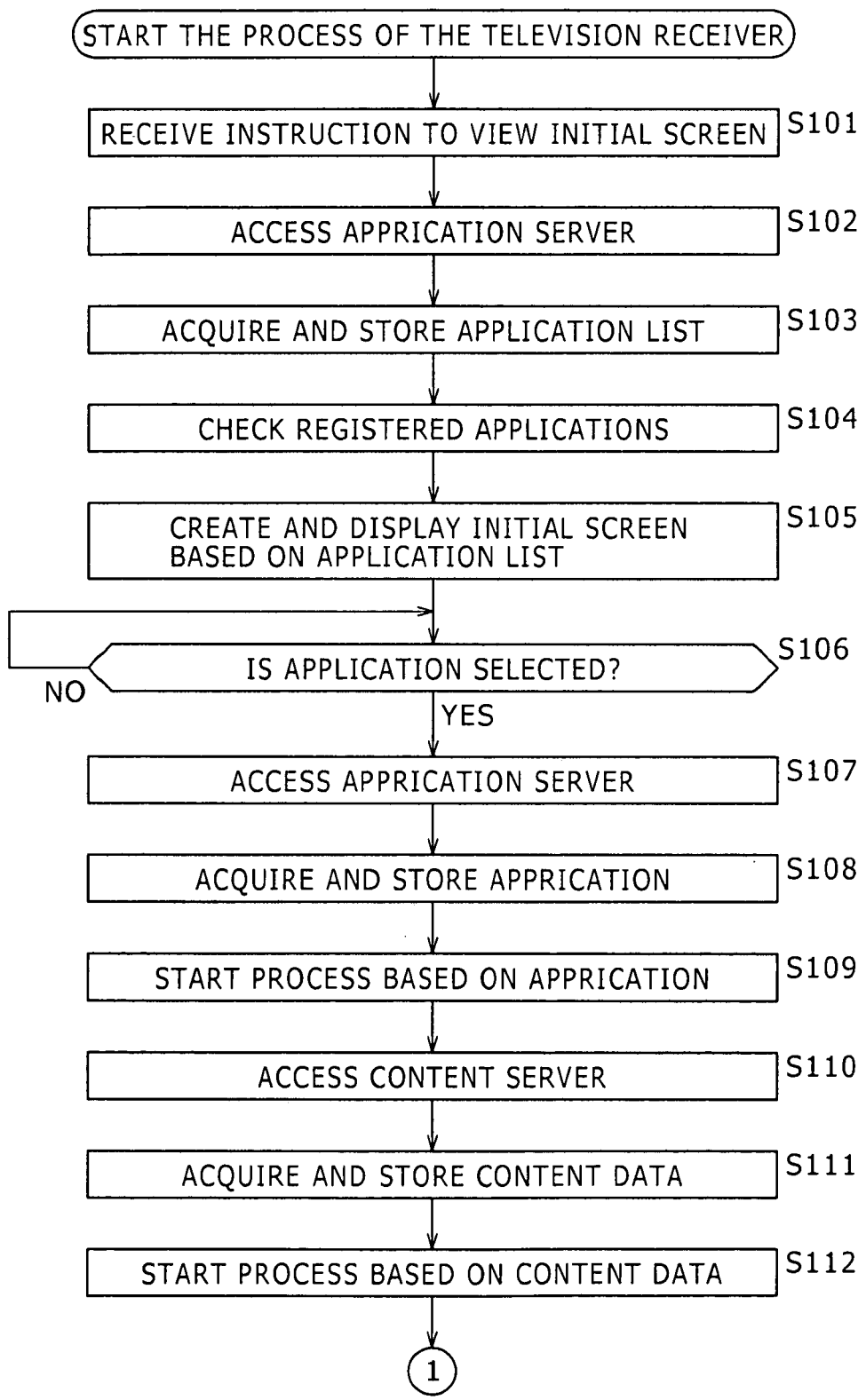

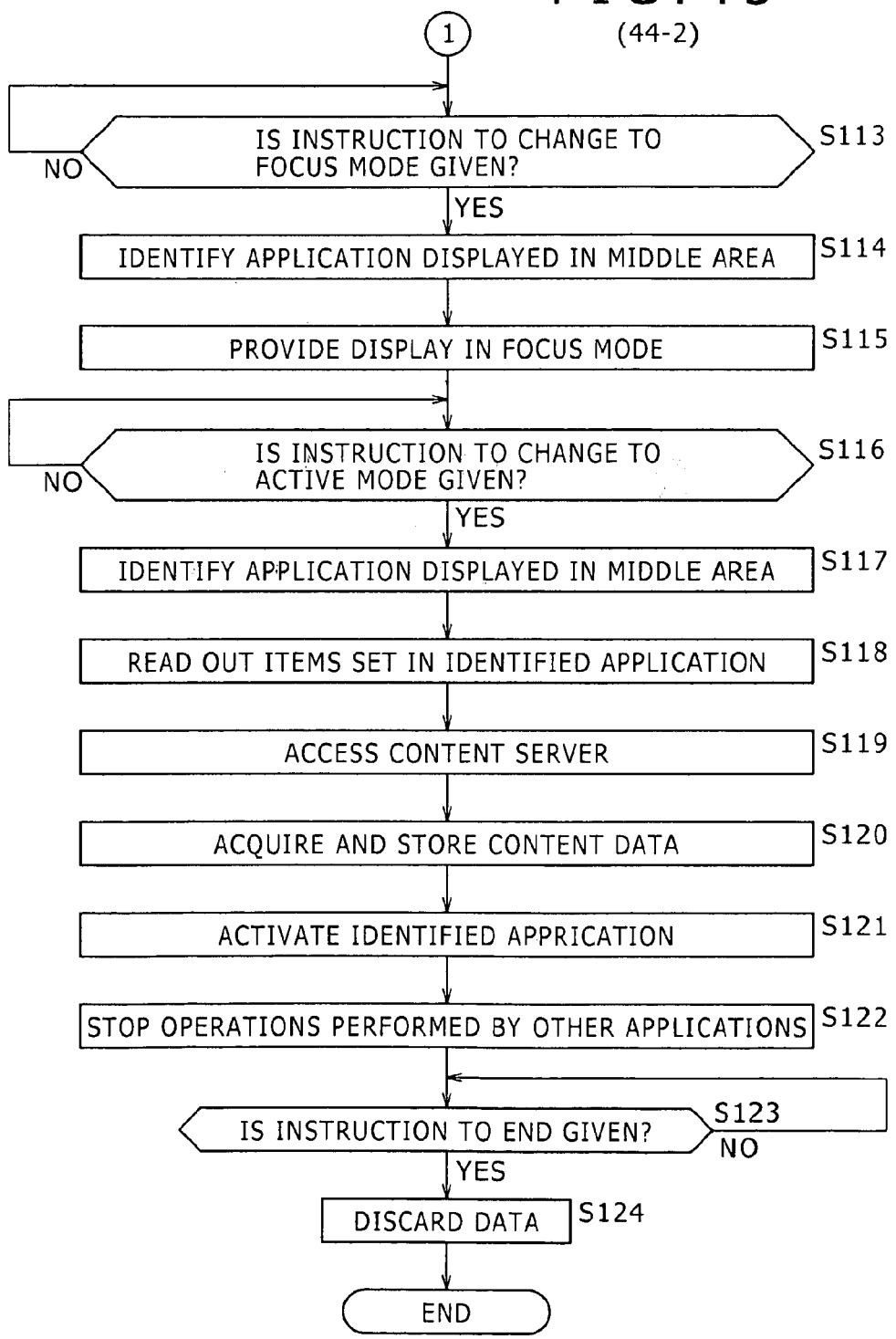

INFORMATION PROCESSING DEVICE, METHOD, AND PROGRAM

CROSS-REFERENCES TO RELATED APPLICATIONS

The present application is a national phase entry under 35 U.S.C. §371 of International Application No. PCT/JP2008/051533 filed Jan. 31, 2008, published on Aug. 7, 2008 as WO 2008/093780 A1, which claims priority from Japanese Patent Application No. JP 2007-024293 filed in the Japanese Patent Office on Feb. 2, 2007 and Japanese Patent Application No. JP 2007-082825 filed in the Japanese Patent Office on Mar. 27, 2007.

TECHNICAL FIELD

The present invention relates to an information processing device, an information processing method, and a program. More particularly, the invention relates to an information processing device, an information processing method, and a program for allowing a user to acquire information easily.

BACKGROUND ART

Thanks to the popularization of the Invention, users are able to acquire information. And in digital television broadcasting, bidirectional communication and other techniques allow the users to acquire desired information about television broadcasts as well. And using mobile phones or the like, the users can read QR code (registered trademark) and other suitable codes to access relevant sites and acquire desired information therefrom (e.g., see Patent Document 1).

Patent Document 1: Japanese Patent Laid-Open No. 2005-303553

DISCLOSURE OF INVENTION

Technical Problem

The users can acquire information in diverse ways, but are desirous of gaining it in easier, more simplified fashion. It has also been desired that not only persons knowledgeable about relevant operations but anyone wishing to browse desired information be able to do it in simple operations.

The present invention has been made in view of the above circumstances and envisages enabling the user to acquire information in simpler and easier fashion than before while viewing a television broadcast.

Technical Solution

An information processing device according to one aspect of the present invention includes: list acquisition means for accessing a first device based on a stored URL to acquire a list of information about a plurality of applications stored in the first device; list display control means for controlling the display of the list; application acquisition means for accessing a second device to acquire an application therefrom; content data acquisition means for executing a process based on the application and, in the course of the process, accessing a third device to acquire content data therefrom; display control means for controlling the display based on the application and the content data; and discarding means for discarding the application and the content data when the process based on the application is terminated.

If there exist applications that have been registered for simultaneous execution, then the application acquisition means may acquire all the registered applications; wherein the content data acquisition means may access a different unit of the third device for each of the applications and acquire content data therefrom; and wherein the display control means may control the display using the content data corresponding to each of the applications.

The first device and the second device may be the same device, and the third device may differ with regard to each of the applications listed in the list.

The applications may be widgets.

There may be further included storage means for storing information which is used to select the content data to be selected from the third device and which is related to identifiers identifying the applications, wherein the content data acquisition means may read from the storage means the information related to the identifiers of the applications and may acquire from the third device the content data corresponding to the read-out information.

An information processing method according to one aspect of the present invention includes: a list acquisition step of controlling communication means to access a first device based on a stored URL to acquire a list of information about a plurality of applications stored in the first device; a list display control step of controlling the display of the list on display means; an application acquisition step of controlling the communication means to access a second device and acquire an application therefrom; a content data acquisition step of controlling the communication means to execute a process based on the application and, in the course of the process, to access a third device and acquire content data therefrom; a display control step of controlling the display based on the application and the content data on the display means; and a discarding step of controlling storage means to discard the application and the content data stored in the storage means when the process based on the application is terminated.

A program according to one aspect of the present invention causes a computer to execute a procedure including: a list acquisition step of controlling communication means to access a first device based on a stored URL to acquire a list of information about a plurality of applications stored in the first device; a list display control step of controlling the display of the list on display means; an application acquisition step of controlling the communication means to access a second device and acquire an application therefrom; a content data acquisition step of controlling the communication means to execute a process based on the application and, in the course of the process, to access a third device and acquire content data therefrom; a display control step of controlling the display based on the application and the content data on the display means; and a discarding step of controlling storage means to discard the application and the content data stored in the storage means when the process based on the application is terminated.

Given the information processing device, information processing method, and program according to one aspect of the present invention, an application list is acquired. When an application is selected from the application list, the selected application is acquired along with registered applications. The multiple applications thus acquired are processed in parallel. And as needed, content data is acquired. When the process based on the applications is terminated, the acquired applications and content data are discarded.

Advantageous Effects

According to one aspect of the present invention, it is possible, illustratively during the viewing of a television broadcast, to browse other information on the same display screen as the broadcast television program.

BRIEF DESCRIPTION OF DRAWINGS

FIG. 44 is a flowchart explanatory of the operations of the television receiver.

FIG. 45 is a flowchart explanatory of the operations of the television receiver.

EXPLANATION OF REFERENCE NUMERALS

11 Network, 12 Application server, 13 Content server, 14 Television receiver, 219 Graphic creation circuit, 220 Panel drive circuit, 221 Display panel, 230 SDRAM, 231 Flash memory, 232 CPU, 251 Remote controller

BEST MODE FOR CARRYING OUT THE INVENTION

Explained below in reference to the drawings are embodiments of the present invention.

[System Configuration]

Figure 1:
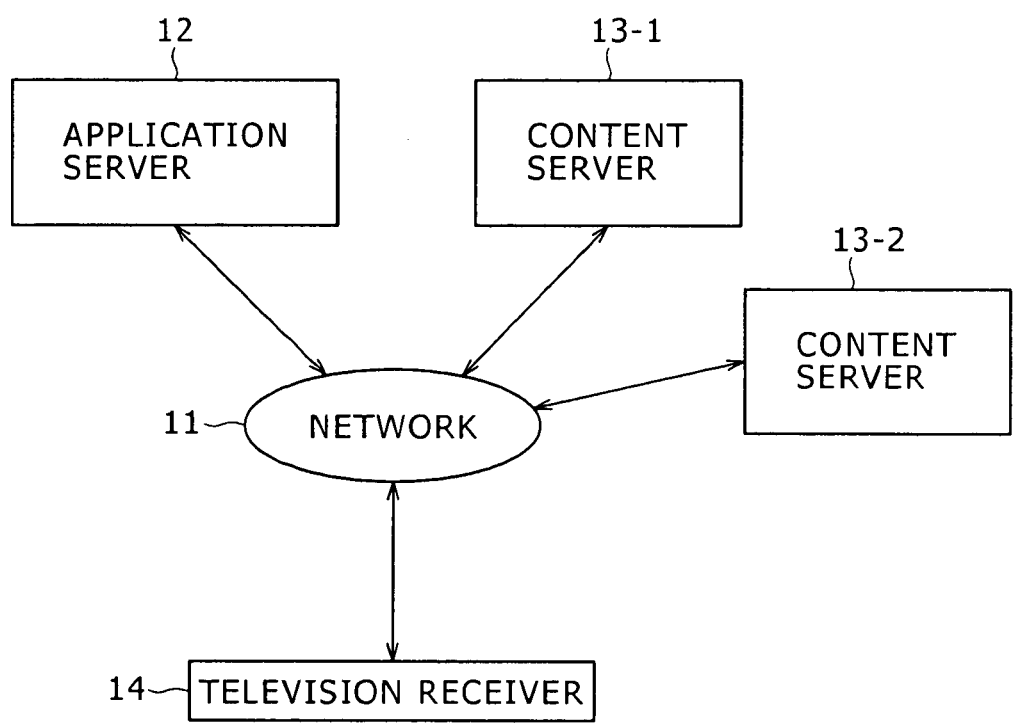
FIG. 1 is a view showing a configuration of an embodiment of the system to which the present invention is applied.

FIG. 1 is a view showing a configuration of an embodiment of the system to which the present invention is applied. The system shown in FIG. 1 is made up of an application server 12, a content server 13-1, a content server 13-2, and a television receiver 14 all connected with a network 11.

The network 11 is structured to include the Internet and LAN (local area network), and is used to let the connected devices exchange data therebetween. The application server 12 is a server that manages applications, to be discussed later, and a list of these applications.

The content servers 13-1 and 13-2 are servers that manage the contents to be used by the applications which in turn are managed by the application server 12. In the ensuing description, where there is no need to distinguish the content servers 13-1 and 13-2 individually, these servers will be simply referred to as the content server 13. And whereas FIG. 1 shows the example in which two content servers 13 are connected to the network 11, two or more content servers 13 may obviously be connected to the network 11.

The contents managed by the content server 13 are made of text, picture, and video data. The contents may also be programs.

The television receiver 14 is an information processing device on the side of a user, and has the capability to receive television broadcasts and to provide the user with television broadcast programs, and the capability to acquire via the network 11 an application managed by the application server 12 and to execute a process based on the acquired application to provide the user with relevant information and the like. Whereas FIG. 1 shows the example in which one television receiver 14 is connected to the network 11, one or more television receiver 14 is connected to the network 11.

Given the system shown in FIG. 1 as the embodiment of the present invention, the user can view television broadcast programs and browse relevant information through the process based on the application managed by the application server 12.

More details of the system will be explained below.

Figure 2:
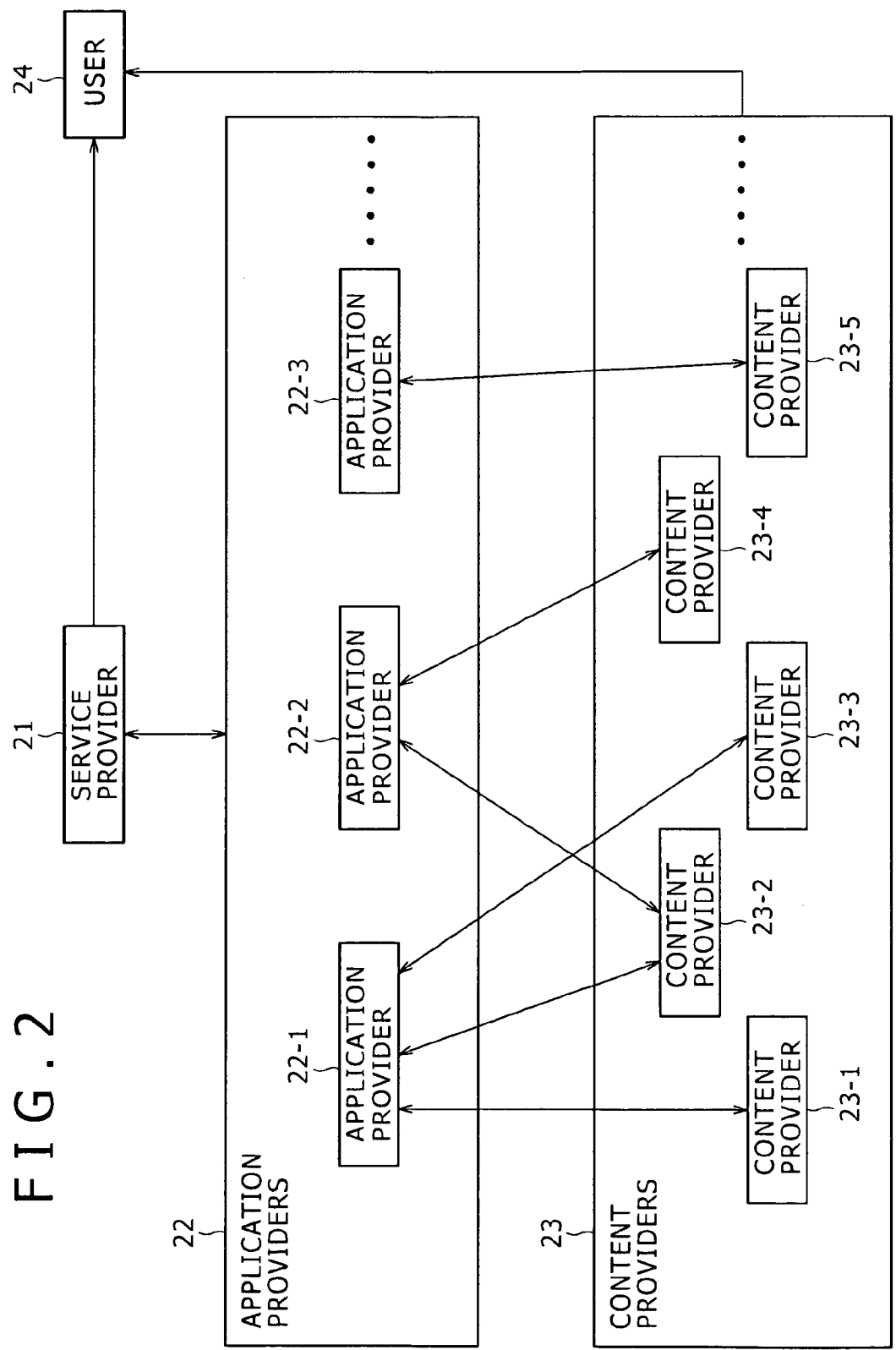
FIG. 2 is a view showing a detailed structure of the system.

FIG. 2 is a view showing relations between administrators who manage servers and a user who uses services. As service-providing parties, there exist a service provider 21, an application provider 22, and a content provider 23. As service-using parties, there exists a user 24.

The service provider 21 manages the application server 12. The application provider 22 is made up of a plurality of application providers 22 such as an application provider 22-1, an application provider 22-2, an application provider 22-3, etc. The content provider 23 is made up of a plurality of content providers 23 such as a content provider 23-1, a content provider 23-2, a content provider 23-3, a content provider 23-4, a content provider 23-5, etc.

A plurality of service providers 21 do not exist. The service provider 21 manages the application server 12 which, as will be discussed later in reference to FIG. 4, manages an application list 71 and applications 72. The application list 71 contains information about the applications 72 which are provided by the application provider 22.

The application provider 22 is a party that provides the applications 72. The applications 72 are structured to refer as needed to the content data managed by the content server 13. The content data to be referenced is provided by the content provider 23.

In the example shown in FIG. 2, the application provider 22-1 provides the service provider 21 with an application 72 that refers to the content from the content provider 23-1, to the content from the content provider 23-2, and to the content from the content provider 23-3.

Likewise in the example shown in FIG. 2, the application provider 22-2 provides the service provider 21 with an application 72 that refers to the content from the content provider 23-2 and to the content from the content provider 23-4. And likewise in the example shown in FIG. 2, the application provider 22-3 provides the service provider 21 with an application that refers to the content from the content provider 23-5.

In this manner, the application provided by the application provider 22 provides applications 72 that may refer to contents provided by a plurality of content providers 23 to the service provider 21. The service provider 21 and the application provider 22 have some sort of contract made therebetween, so that the service provider 21 may receive contract fees or registration fees from the application provider 22.

Also, the service provider 21 can examine or otherwise check the applications 72 before they are registered with the application server 12 in order to rejection applications 72 containing viruses or the like. Establishing a unique service provider 21 makes it possible to enhance security.

The applications 72 managed by the service provider 21 are provided to the user 24 upon his or her request. As mentioned above, the applications 21 registered with the service provider 21 are checked for viruses or the like before and also after registration if necessary to make sure that secure applications are provided.

If an application provided to the user 24 is structured to reference contents provided by the content provider 23, one of the processes based on that application is arranged to be such a process that will receive the contents supplied from the content provider 23.

Contracts may be made individually between the application providers 22 and the content providers 23.

In some cases, an application provider 22 doubles as a content provider 23. Basically, the content provider 23 manages the content server 13. But if the application provider 22 doubles as the content provider 23, then the application provider 22 may manage the content server 13.

For example, the application providers 22 include a company that operates a search site and a company that runs its operations on a network, while the content providers 23 include a company that provides such contents as news and weather forecasts constituting the pages of a search site.

[Typical Structure of the Application Server]

Figure 3:
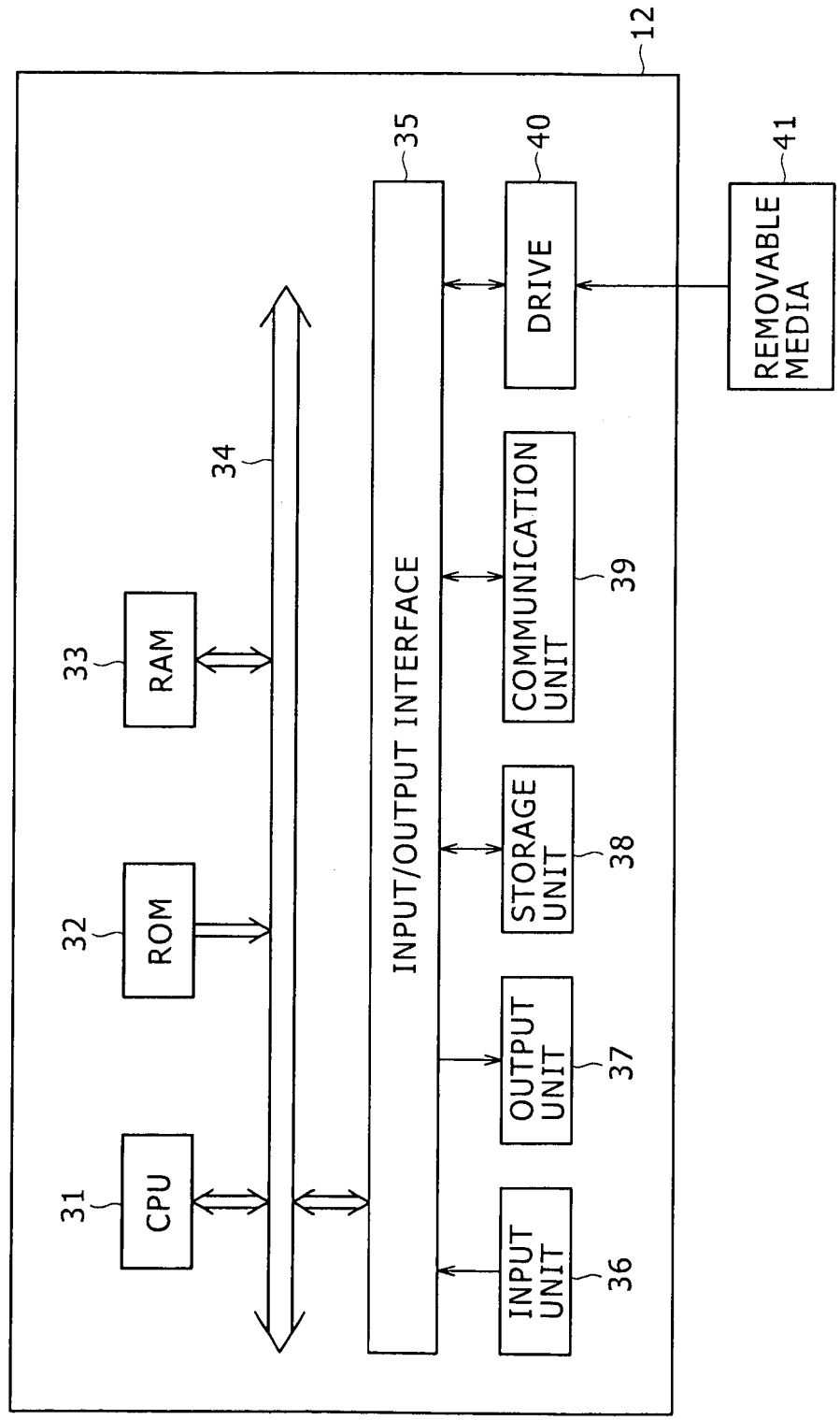
FIG. 3 is a view showing a typical internal structure of an application server.

FIG. 3 is a view showing a typical internal structure of the application server 12. The application server 12 may be constituted illustratively by a personal computer, and the internal structure of the application server 12 may be made the same as that of the personal computer.

The application server 12 is made up of a CPU (central processing unit) 31, a ROM (read only memory) 32, a RAM (random access memory) 33, a bus 34, an input/output interface 35, an input unit 36, an output unit 37, a storage unit 38, a communication unit 39, and a drive 40.

In the application server 12, the CPU 31, ROM 32 and RAM 33 are interconnected via the bus 34. The bus 34 is further connected with the input/output interface 35. The input/output interface 35 is connected with the input unit 36 typically made up of a keyboard, a mouse and a microphone; with the output unit 37 typically composed of a display and speakers; with the storage unit 38 typically formed by a hard disk and a nonvolatile memory; with the communication unit 39 typically constituted by a network interface; and with the drive 40 for driving removable media 41 such as magnetic disks, optical disks, magneto-optical disks, or semiconductor memories.

As the CPU 31, it is possible to adopt "Cell" reported in an article titled "Birth of Cell" of Nikkei Electronics, published by Nikkei BP Inc., on Feb. 28, 2005, pp. 89-117.

On the application server 12 structured as described above, a series of processes, to be discussed later, is initiated by the CPU 31 loading programs illustratively from the storage unit 38 where they are stored into the RAM 33 for execution therein via the input/output interface 35 and bus 34.

Figure 4:
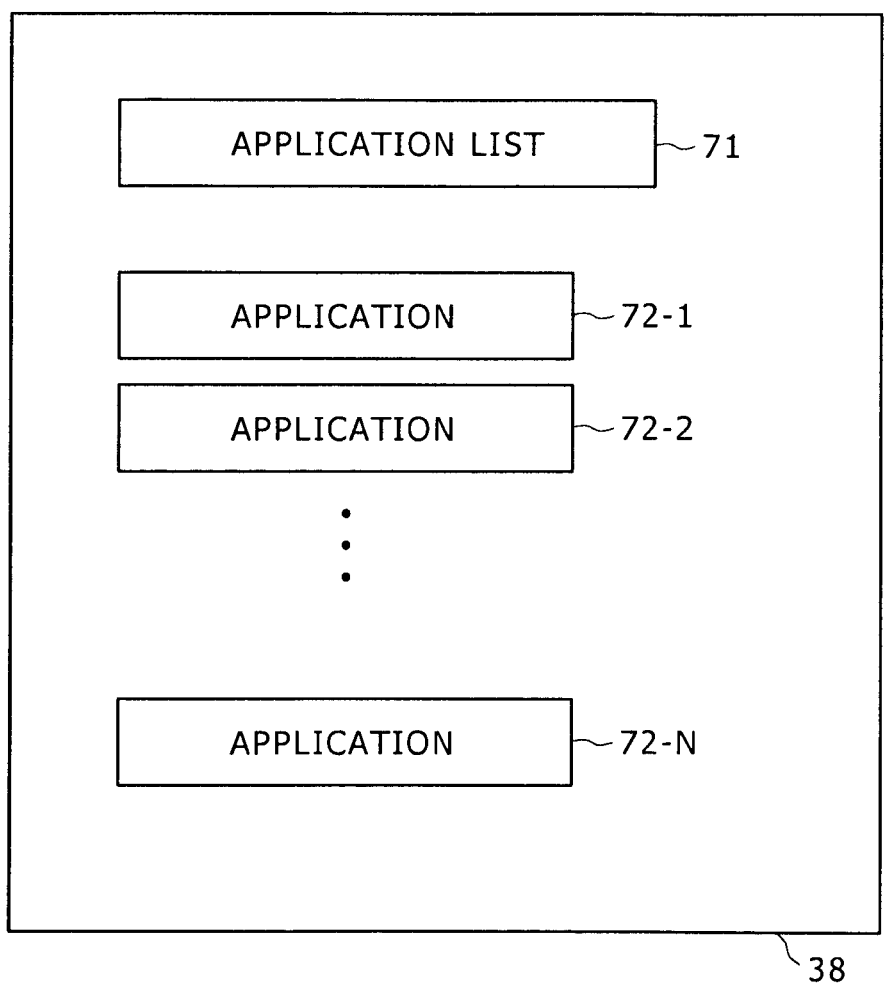
FIG. 4 is a view explanatory of data managed by the application server.

FIG. 4 is a view explanatory of the data stored in the storage unit 38. The storage unit 38 stores the application list 71 and applications 72-1 through 72-N. The application list 71 is a list that covers the applications 72-1 through 72-N managed by the application server 12. The application list 71 constitutes data which is provided to the television receiver 14 when accessed thereby, i.e., when a menu screen on which to select an application is displayed on the television receiver 14 side.

The applications 72-1 through 72-N are the data of the application bodies. In the ensuing description where is no need to distinguish the applications 72-1 through 72-N individually, they will be simply referred to as the application 72.

The application 72 may typically be a program called a widget. The widget is primarily a single-function program executed in a specific run-time environment on the desktop of the personal computer. There exist programs that provide a clock, a calendar, a dictionary, a calculator, weather information and the like, and these programs are characterized by their ability to be connected to the network.

The application server 12 provides the application list 71 to the television receiver 14. And when an application 72 is selected from the application list 71 on the side of the television receiver 14, the application server 12 provides the selected application 72 to the television receiver 14.

[Typical Internal Structure of the Content Server]

Figure 5:
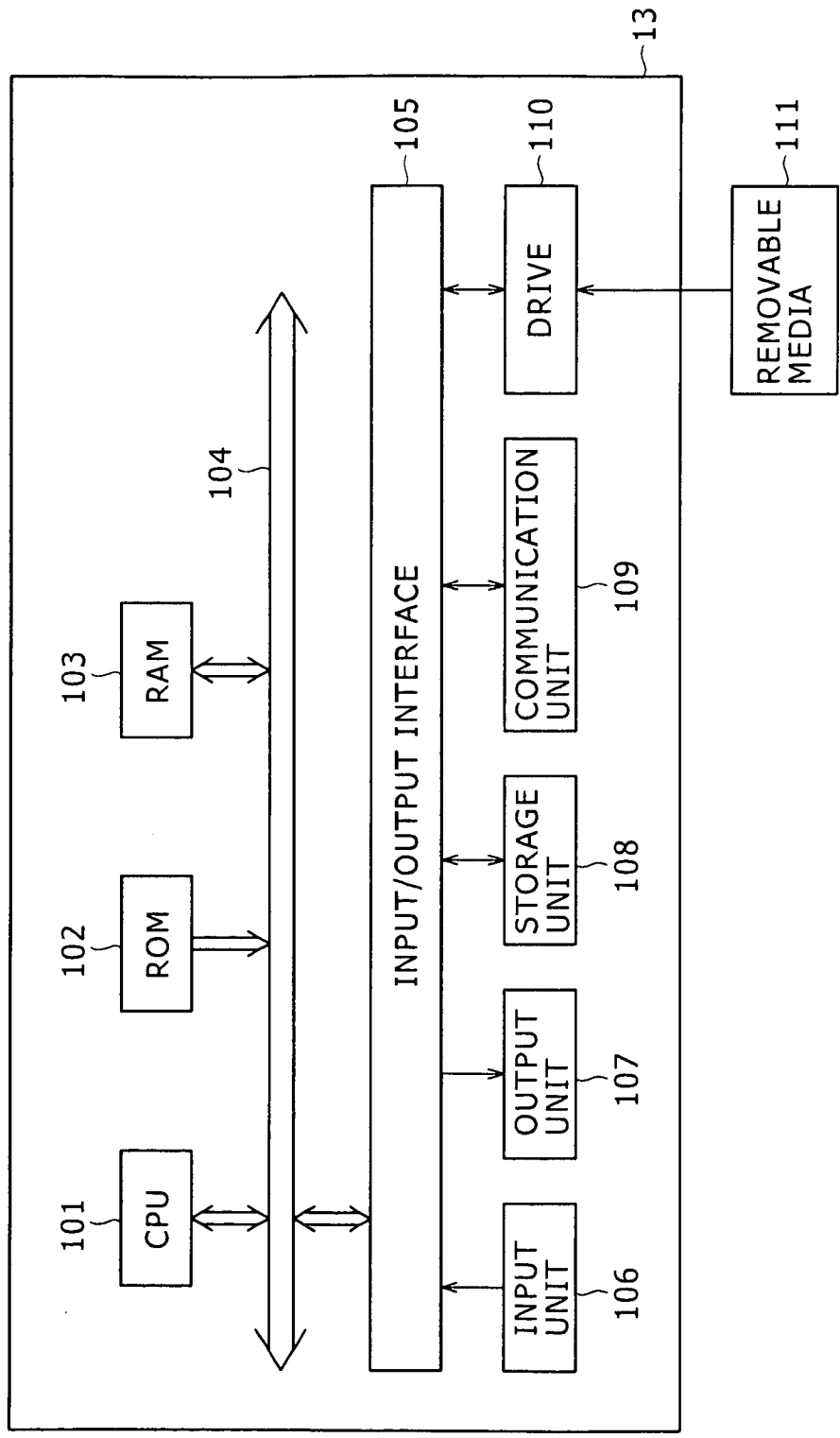
FIG. 5 is a view showing a typical internal structure of a content server.

FIG. 5 is a view showing a typical internal structure of the content server 13. Like the application server 12, the content server 13 may illustratively be constituted by a personal computer, and the internal structure of the content server 13 may be made the same as that of the personal computer.

In the content server 13, a CPU 101, a ROM 102 and a RAM 103 are interconnected via a bus 104. The bus 104 is further connected with an input/output interface 105. The input/output interface 105 is connected with an input unit 106 typically made up of a keyboard, a mouse and a microphone; with an output unit 107 typically composed of a display and speakers; with a storage unit 108 typically formed by a hard disk and a nonvolatile memory; with a communication unit 109 typically constituted by a network interface; and with a drive 110 for driving removable media ill such as magnetic disks, optical disks, magneto-optical disks, or semiconductor memories.

As the CPU 101, it is possible to adopt "Cell" reported in an article titled "Birth of Cell" of Nikkei Electronics, published by Nikkei BP Inc., on Feb. 28, 2005, pp. 89-117.

On the application server 13 structured as described above, a series of processes, to be discussed later, is initiated by the CPU 101 loading programs illustratively from the storage unit 108 where they are stored into the RAM 103 for execution therein via the input/output interface 105 and bus 104.

Figure 6:
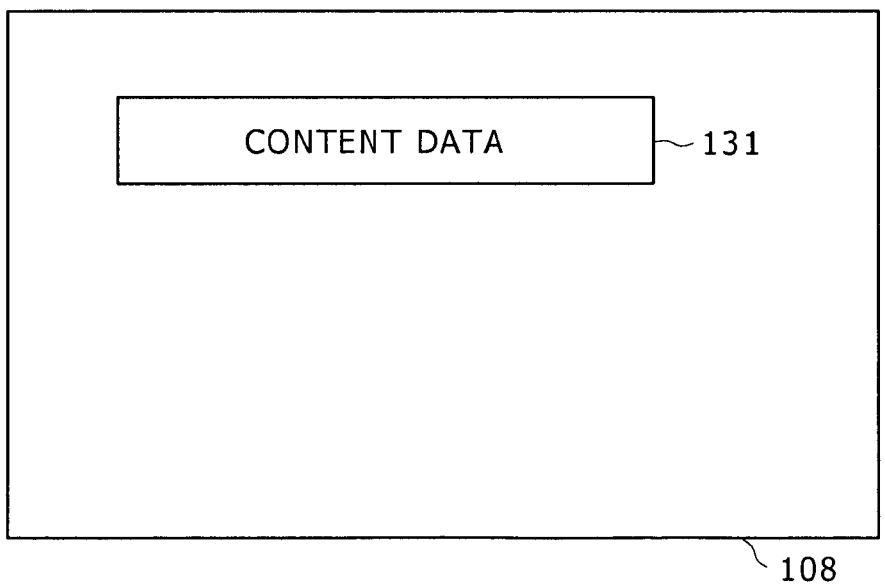
FIG. 6 is a view explanatory of data managed by the content server.

The storage unit 108 of the content server 13 stores content data 131 as shown in FIG. 6. The content data may be programs or text data.

The application 72 managed by the application server 12 contains a URL (uniform resource locator) at which is managed the content data needed by the application 72 in question. When a process based on the application 72 is carried out on the side of the television receiver 14, the content server 13 is accessed based on the URL included in the application 72, and the content data 131 is provided.

Illustratively, if the application 72 is one which provides news, then the content data 131 may be text data and picture data describing the specifics of the news. And if the application 72 is one which provides fortune-telling, then the content data 131 may be text data describing the specifics of the horoscope for each sign and the picture data presenting images of the constellations.

It is assumed here for purpose of explanation that the content data 131 is managed by the content server 13. Alternatively, the content data 131 can be managed by the application server 12. In this case, the service provider 21 doubles as the application provider 22 constituted by a plurality of application providers 22.

Also, the content data 131 managed by the content server 13-1 is different from the content data 131' managed by the content server 13-2 (a dash (') is attached to the content data so as to distinguish it from the content data 131 managed by the content server 13-1). In other words, the content data cited illustratively by the application 72-1 is the content data 131, and the content data cited illustratively by the application 72-2 is the content data 131'. In this manner, different applications 72 are structured to cite different content data 131.

Also, there may be a case where one application 72 gains access to a plurality of content servers 13 in order to acquire a plurality of content data 131 therefrom.

[Internal Structure of the Television Receiver]

Figure 7:
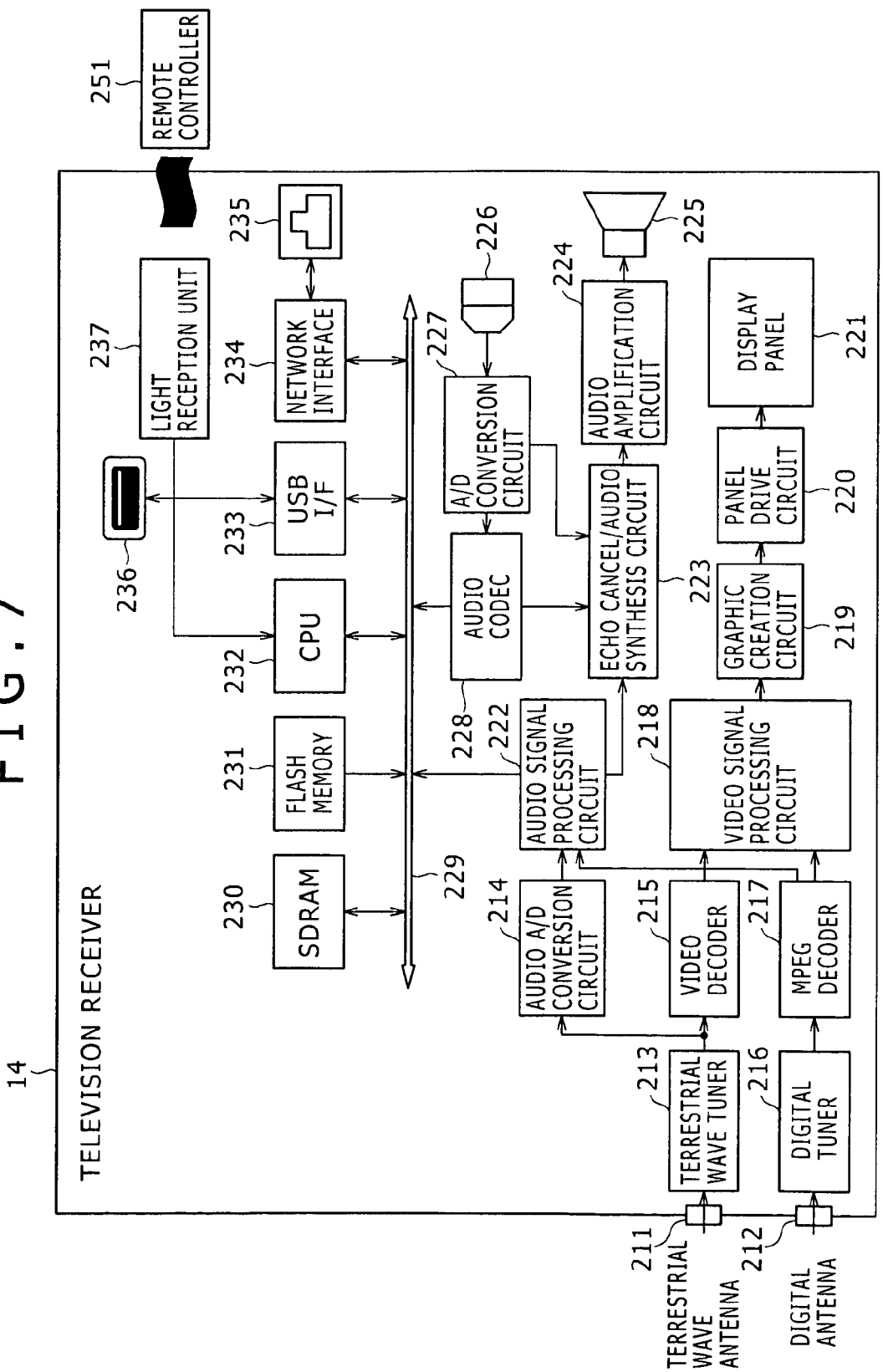
FIG. 7 is a view showing a typical internal structure of a television receiver.

FIG. 7 is a view showing a typical internal structure of the television receiver 14.

The television receiver 14 is furnished with an antenna input terminal 211 to which are input signals from an antenna for receiving terrestrial analog broadcasts, and an antenna input terminal 212 to which are input signals from an antenna for receiving digital broadcasts (terrestrial digital broadcasts, BS/CS digital broadcasts). Alternatively, only one of the two terminals may be furnished to the television receiver 14.

A terrestrial wave tuner 213 receives a broadcast wave signal input to the antenna input terminal 211 and demodulates the signal into a video signal and an audio signal. The terrestrial wave tuner 213 outputs the audio signal thus acquired to an audio A/D (analog/digital) conversion circuit 214 and the acquired video signal to a video decoder 215.

The audio A/D conversion circuit 214 performs an A/D conversion process on the audio signal supplied from the terrestrial wave tuner 213, and outputs a digital audio signal acquired from the process to an audio signal processing circuit 222.

A video decoder 215 performs a decoding process on the video signal supplied from the terrestrial wave tuner 213, and outputs a digital component signal acquired from the process to a video signal processing circuit 218.

A digital tuner 216 receives a broadcast wave signal input to the antenna input terminal 212 and demodulates the signal into an MPEG-TS (Moving Picture Experts Group-Transport Stream). The digital tuner 216 outputs the acquired MPEG-TS to an MPEG decoder 217.

The MPEG decoder 217 descrambles the MPEG-TS supplied from the digital tuner 216 to extract therefrom a stream containing the data of the program targeted for reproduction (i.e., targeted for viewing). The MPEG decoder 217 decodes the audio packets making up the extracted stream, and outputs the audio data thus acquired to the audio signal processing circuit 222. The MPEG decoder 217 also decodes the video packets making up the stream and outputs the acquired video data to the video signal processing circuit 218.

Also, the MPEG decoder 217 performs the process of outputting EPG (electronic program guide) data that was extracted from the MPEG-TS to a CPU (central processing unit) 232 via a path not shown.

The video signal processing circuit 218 performs processes such as noise reduction on the video data supplied from the video decoder 215 or from the MPEG decoder 217, and outputs the video data thus acquired to a graphic creation circuit 219.

The graphic creation circuit 219 creates the video data of the program to be displayed on a display panel 221 and the picture data based on the application 72 supplied over the network 11, and outputs the created video data and picture data to a panel drive circuit 220.

Also, the graphic creation circuit 219 is structured as needed to create video data (graphic) for displaying the screens for use by the user in selecting items or doing other things, to superpose the created video data onto the video data of a program, and to output the superposed video data to the panel drive circuit 220.

The panel drive circuit 220 drives the display panel 221 based on the data supplied from the graphic creation circuit 219, causing the display panel 221 to display program video and the various screens mentioned above.

The display panel 221 is typically composed of an LCD (liquid crystal display) and, under control of the panel drive circuit 220, displays program video or the like.

The audio signal processing circuit 222 performs processes such as noise reduction on the audio data supplied from the audio A/D conversion circuit 214 or from the MPEG decoder 217, and outputs the audio data thus acquired to an echo cancel/audio synthesis circuit 223.

The echo cancel/audio synthesis circuit 223 outputs the audio data that was supplied from the audio signal processing circuit 222 to an audio amplification circuit 224, and causes speakers 225 to output program audio.

Also, if the audio data supplied over the network 11 is fed from an audio codec 228, or if the audio data of the user (user A) of the television receiver 14 is supplied from an A/D conversion circuit 227, the echo cancel/audio synthesis circuit 223 performs echo cancellation on the audio data of the user A. The echo cancel/audio synthesis circuit 223 outputs the audio data acquired through synthesis to the audio amplification circuit 224.

The audio amplification circuit 224 performs a D/A conversion process and an amplification process on the audio data supplied from the echo cancel/audio synthesis circuit 223 and thereby controlling the volume of the audio data to a suitable level. Thereafter, the audio amplification circuit 224 causes the speakers 225 to output the audio thus processed.

The A/D conversion circuit 227 receives the user's audio signal picked up by a microphone 226 furnished on the television receiver 14 for use in voice communication, and performs an A/D conversion process on the received audio signal. The A/D conversion circuit 227 outputs digital audio data that was acquired through the A/D conversion process to the echo cancel/audio synthesis circuit 223 and audio codec 228.

The audio codec 228 converts the audio data that was supplied from the A/D conversion circuit 227 into data of a predetermined format suitable for data transmission via the network 11, and outputs the data to a network interface 234 via an internal bus 229.

The internal bus 229 is also connected with an SDRAM (Synchronous Dynamic Random Access Memory) 230, a flash memory 231, the CPU 232, a USB (Universal Serial Bus) interface 233, and the network interface 234.

The SDRAM 230 stores diverse data needed by the CPU 232 in performing its processing.

The flash memory 231 stores the programs to be executed by the CPU 232. The programs stored in the flash memory 231 are read out by the CPU 232 in a suitably timed manner such as when the television receiver 14 is turned on. The flash memory 231 also stores EPG data acquired through digital broadcasts as well as the data acquired from specific servers via the network 11.

The CPU 232 executes the programs stored in the flash memory 231 and controls the overall workings of the television receiver 14 in accordance with control codes or the like supplied from a light reception unit 237. The CPU 232 and the components of the television receiver 14 are connected via paths not shown.

The USB interface 233 permits data exchanges between the television receiver 14 and an external device connected via a USB cable attached to a USB terminal 236. The network interface 234 allows the television receiver 14 to access the network 11 through a cable attached to a network terminal 235 and to exchange data with various devices connected to the network 11.

The light reception unit 237 receives infrared rays from a remote controller 251, and outputs to the CPU 232 a control code which is acquired through demodulation of the received infrared rays and which represents what is designated by the user's operations.

Figure 8:
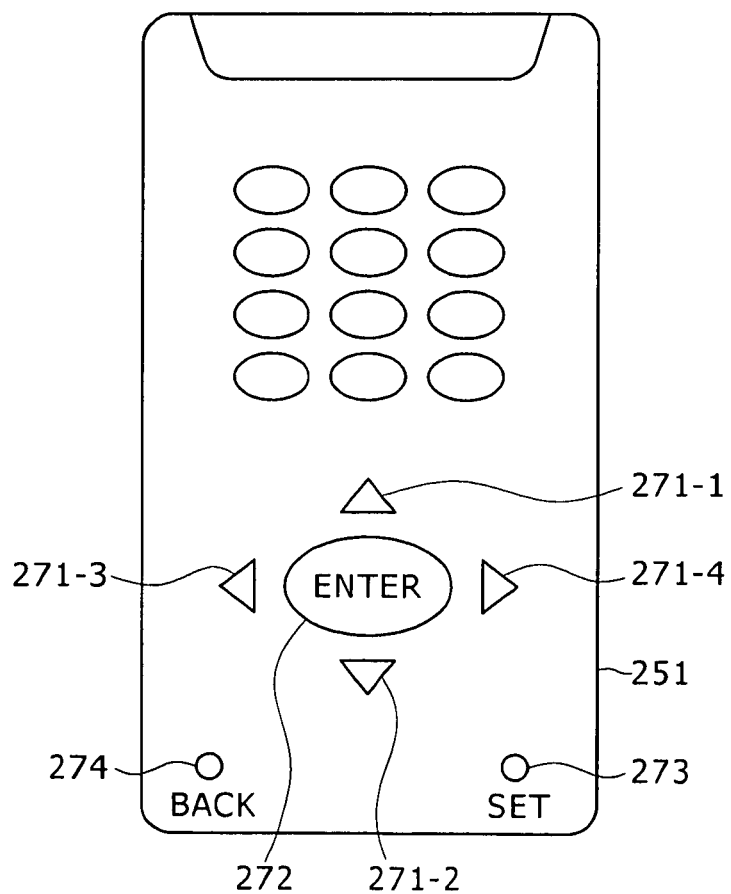
FIG. 8 is a view showing a typical external structure of a remote controller.

FIG. 8 is a view showing a typical external structure of the remote controller 251. The remote controller 251 is structured to contain an up direction button 271-1 operated to move a cursor upward on the display of the television receiver 14, a down direction button 271-2 operated to move the cursor downward, a left direction button 271-3 operated to move the cursor leftward, a right direction button 271-4 operated to move the cursor rightward, an enter button 272 operated to select an item of destination and enter a decision, a set button 273 operated to make predetermined settings, and a back button 274 operated typically to go back to the preceding screen.

These buttons are operated illustratively upon selection of an application 72.

In addition to the buttons shown in FIG. 8, the remote controller 251 is furnished on its top side with buttons (shown, but not designated by reference numeral) operated to select a television broadcast program and to select the sound volume. That is, the remote controller 251 has two groups of buttons provided separately, one group of buttons being used to perform operations related to television broadcasts, the other group of buttons being used to perform operations regarding the applications 72. Some of the furnished buttons may be shared between the two kinds of operations.

Where the buttons for performing the operations about television broadcasts are made different from those for performing the operations regarding the applications 72, the user need only operate corresponding buttons in one of the two groups of buttons furnished on the remote controller 251 in order to address either the television broadcast program or the picture or texts targeted for the operations based on the application 72, the targeted programs, pictures and texts being displayed on the same screen as will be discussed later.

Suppose that the button for moving the channel number up as a button for selecting the program is the same as the button for moving the cursor in the upward direction to select an application. In such a case, when the user operates the button in question with the intention of advancing the program channel, there is a possibility that the cursor is moved upward instead. And this possibility needs to be circumvented illustratively by furnishing a changeover button or the like and by operating that button.

However, when the buttons for performing operations about television broadcasts are made distinct from the button for performing operations regarding the applications 72 as described above, inadvertent operations will no be committed. And the user can get desired processes done using the remote controller 251 without having to do such chores as operating the changeover button.

[Outline of the Processing]

Figure 9:
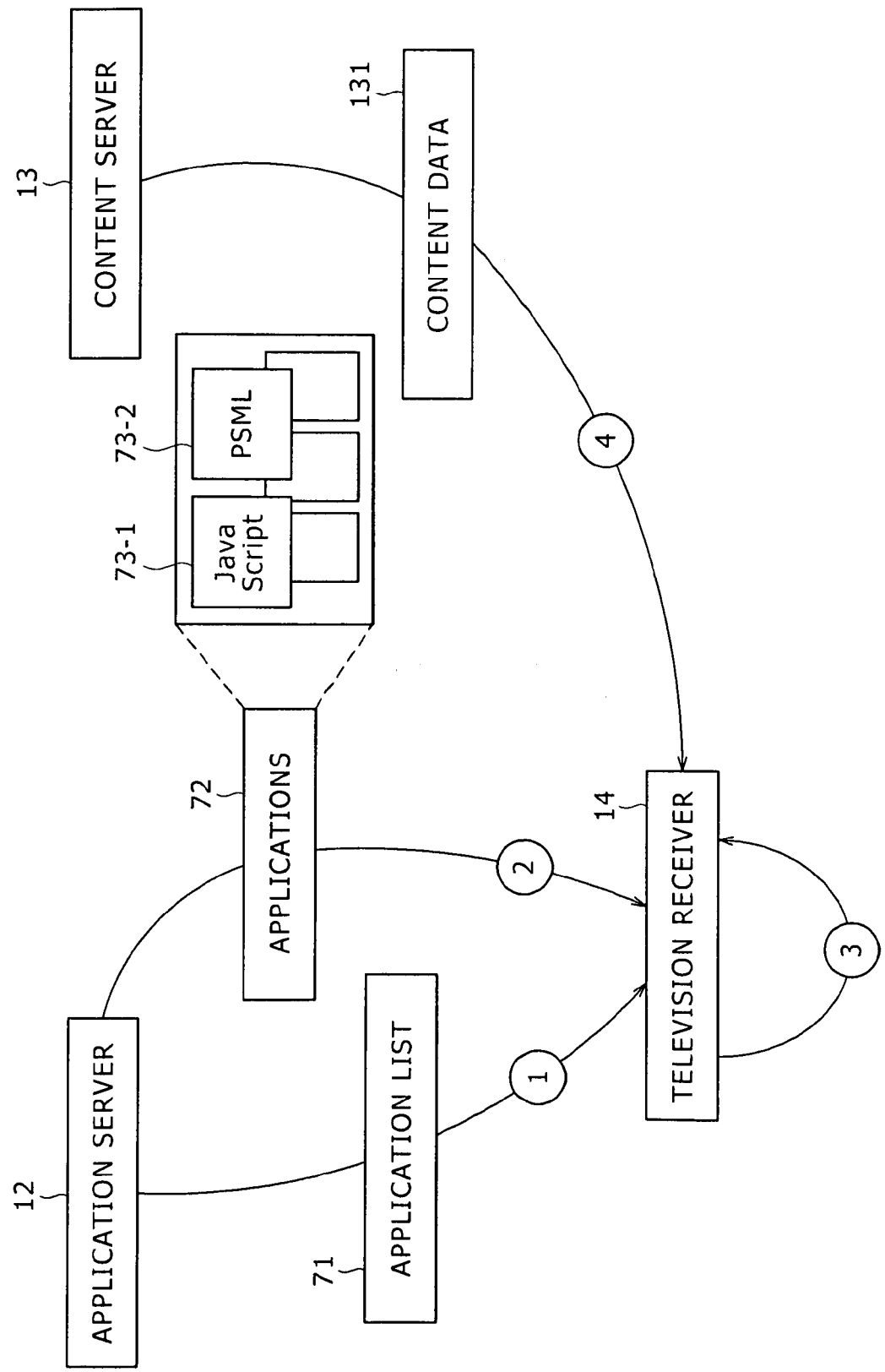
FIG. 9 is a view explanatory of data flows.

An outline of the processing performed by the system shown in FIG. 1 is explained below by referring to FIG. 9. The application server 12 supplies the application list 71 to the television receiver 14. Thereafter, the application server 12 provides the application 72 to the television receiver 14. The application 72 is structured illustratively to include Java (registered trademark) Script 73-1 and PSML (Page Structure and Macro description Language) 73-2.

After receiving the application list 71 and the application 72 followed illustratively by the user's instruction, the television receiver 14 side performs the process based on the received application 72. Depending on the application 72 (i.e., on the script described in Java (registered trademark) Script 73-1 makes up the application 72), the television receiver 14 also accesses the content server 13 to acquire content data 131 therefrom and performs the process based on the acquired content data 131.

[Screen Change]

Explained next are the screens displayed on the television receiver 14 structured as described above. For purpose of explanation, the ensuing description will cite the screens on which are displayed the pictures based on the application 72 or the like.

Figure 10:
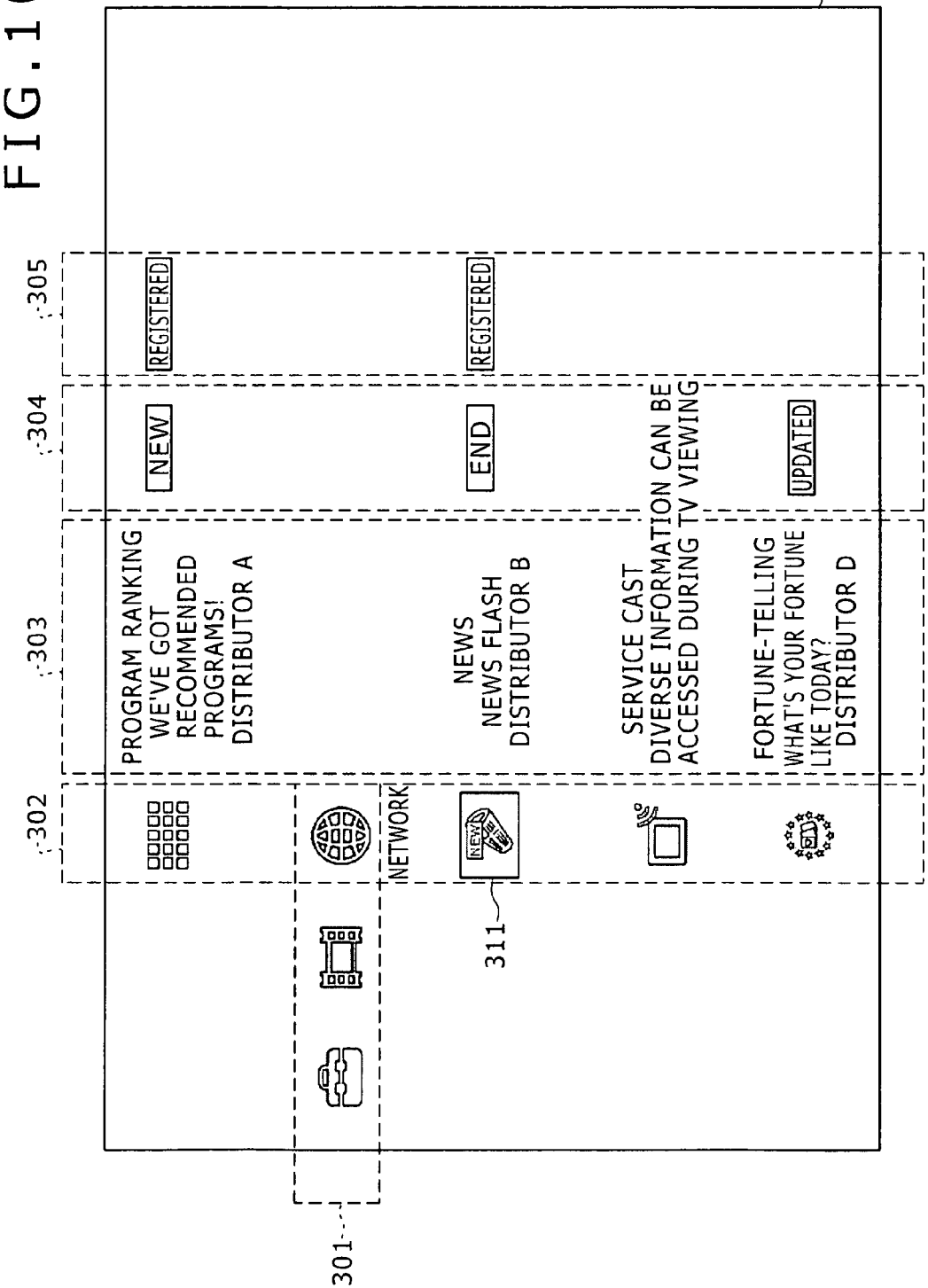
FIG. 10 is a view showing a typical screen displayed on a display panel.

FIG. 10 shows a typical screen displayed on the display panel 221 when the user wants to start the application 72. The screen shown in FIG. 10 will be referred to as the initial screen in the description that follows. The user can select desired processes from the initial screen. Illustratively, the desired processes may include a process for referencing a list of programs recorded on a HDD recorder (not shown) connected to the television receiver 14 and for selecting a program therefrom, and a process for referencing a list of terrestrial digital broadcast programs for viewing purposes. The initial screen is a menu screen for selecting processes and settings.

On the initial screen shown in FIG. 10, broken lines are added for purpose of explanation and are not lines actually displayed on the screen.

An icon display section 301 displays a plurality of icons arrayed in the horizontal direction, each of the icons being a picture intended to let the user intuitively recognize what can be processed or what can be set using the icon in question. For example, the icon display section 301 displays an icon allowing the user to recognize the availability of the process for handling pictures (e.g., process for displaying a list of the programs recorded on the HDD recorder) when the pictures are desired to be processed.

One of the icons displayed in the icon display section 301 is focused. Under the focused icon appears a text indicating what this icon is about. In the example shown in FIG. 10, the icon representative of the network is being focused, so that the text "NETWORK" is displayed under the icon. The focused icon is displayed in a color different from that of the other icons to make distinction therebetween.

And the icons displayed in the icon display section 301 are arranged to slide horizontally in keeping with the user's instructions. For example, if the user operates the left direction button 271-3 (FIG. 10) on the remote controller 251, the icons displayed in the icon display area 301 are moved leftward collectively and the focus is shifted to the next icon.

An icon display section 302 established in the vertical direction of the focused icon displays icons indicative of the options regarding the process or settings represented by the focused icon. In the example shown in FIG. 10, the icon "NETWORK" is focused, so that the icon display section 302 displays in the vertical direction an array of icons indicative of the options regarding the processes or settings about the network.

In the case above, the options regarding the icon "NETWORK" are the options for selecting applications 72.

And a cursor 311 is positioned to one of the icons in the icon display section 302. It is assumed here for purpose of explanation that the cursor 311 is positioned to the icon just below the focused icon. In other words, the cursor 311 is assumed to be positioned fixedly to the icon under the focused icon. When the user gives an instruction to move (i.e., slide) the icons displayed in the icon display section 302, the icons are slid in the vertical direction for icon displacement.

Of the icons displayed in the icon display section 302, the one displayed in the icon display section 301 is excluded from explanations displayed in an explanation display section 303 with regard to the remaining icons (in this case, the icon "NETWORK" is excluded). In reference to FIG. 10, for example, the top of the explanation display section 303 displays a text saying "PROGRAM RANKING" indicating that the corresponding icon (i.e., application) is for displaying program ranking.

To the right of the explanation display section 303 is a status icon display section 304. The status icon display section 304 displays an icon "NEW" when a new application 72 is added, an icon "UPDATE" when the corresponding application 72 has been updated, and an icon "END" when the service offered by the corresponding application 72 has ended.

To the right of the status icon display section 304 is a registration status display section 305. When an icon displayed in the icon display section 302 is selected, the application 72 of the selected icon is started, and the information about the started application 72 is provided to the user side along with the television broadcast program. The registration status display section 305 is arranged so that a predetermined number of applications 72 to be started other than the selected application 72 may be registered beforehand. That is, the user is allowed to register his or her favorite applications 72.

The layout of, and the information displayed on, the initial screen as described above are only examples; the layout of the initial screen and the information displayed thereon as shown in FIG. 10 are not limitative of the invention. The same holds for the screens to be explained hereunder. These screens are not limitative but merely illustrative of the invention and may be modified as needed.

The initial screen such as one shown in FIG. 10 is displayed when connection is established with the application server 12 and the application list 71 is acquired therefrom by the user selecting (i.e., focusing) the icon "NETWORK." The application list 71 may be acquired in this manner when an icon is focused. However, there is a possibility that the initial screen is not displayed instantaneously when an icon is focused depending on the communication speed on the network. This possibility may be circumvented by periodically acquiring the application list 71 and holding it.

The application list 71 contains the information to be displayed in the icon display section 302, explanation display section 303, and status icon display section 304. The information to be described in the registration status display section 305 is stored on the side of the television receiver 14. Upon acquisition of the application list 71, a check is made to determine which of the applications 72 have already been registered. The icons corresponding to the registered applications are each associated with the display of an icon "REGISTERED."

Figure 11:
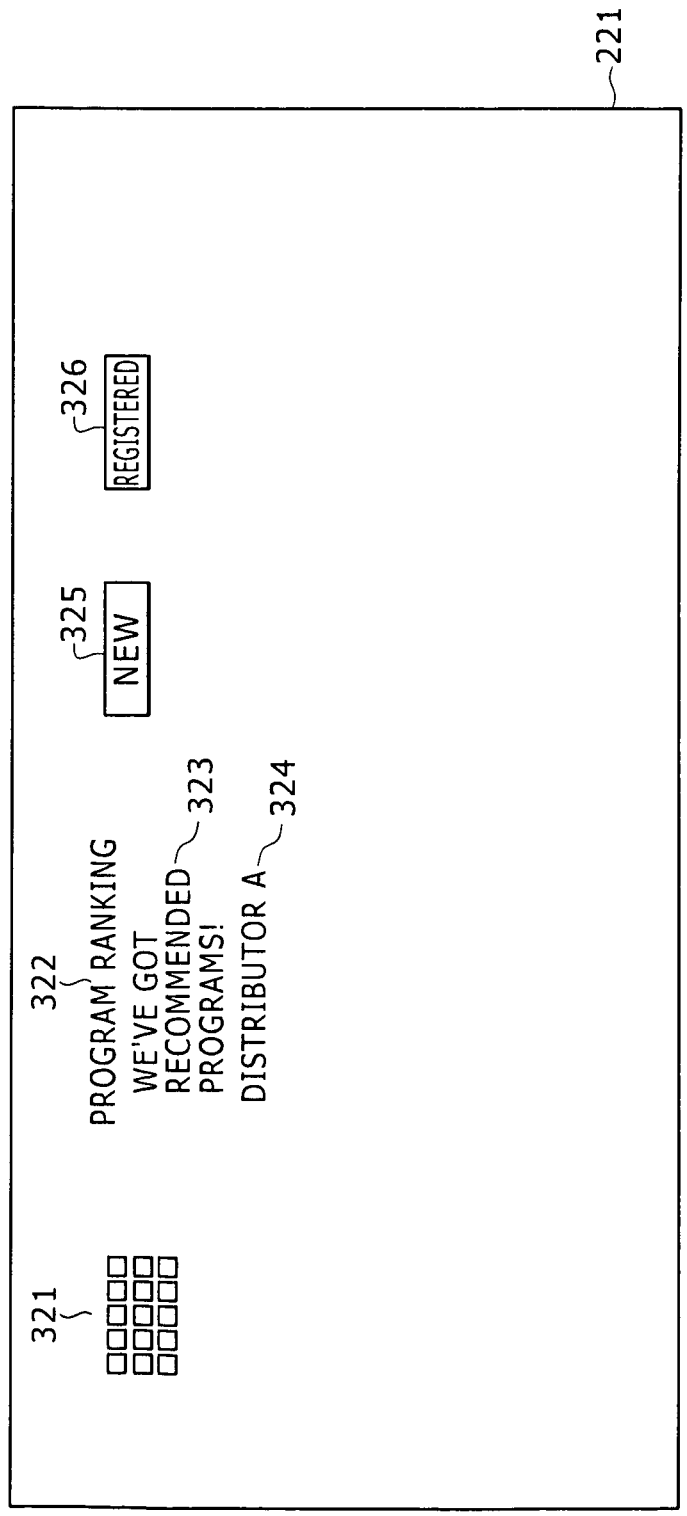
FIG. 11 is a view showing a typical screen displayed on the display panel.

Referring to FIG. 11, one of the displayed icons is picked up as an example from the icon display section 302. The selected icon will be explained further below regarding the information to be displayed correspondingly in the explanation display section 303, status icon display section 304, and registration status display section 305.

Icons 321 displayed in the icon display section 302 are each made up of a picture that prompts the user to have an image of what is contained in the corresponding application 72. The icon data for displaying a given icon 321 is described in the application list 71. Alternatively, the application list 71 may describe a URL at which given icon data is held. Gaining access to the URL allows the icon data to be acquired.

The explanation display section 303 is made up of a name display section 322 that displays the name of the application 72, an explanation display section 322 that displays an explanation of the application 72, and a provider display section 324 that indicates the provider of the application 72.

For example, in reference to FIG. 11, the name of the application 72 corresponding to the icon 321 is "PROGRAM RANKING," so that the name display section 322 displays "PROGRAM RANKING." Also, the application 72 corresponding to the icon 321 is a television broadcast program and has the function of providing audience rating ranking information and of recommending programs, so that the explanation display section 323 displays a text such as "THERE ARE RECOMMENDED PROGRAMS!" Where a distributor A distributes the application 72 corresponding to the icon 321, the provider display section 324 displays "DISTRIBUTOR A." The distributor A signifies an application provider 22.

The status icon display section 304 displays status icons 325 when the status of the applications 72 is changed. As described above, the status icons 325 include an icon "NEW" displayed when a new application 72 is added, an icon "UPDATE" displayed when the corresponding application 72 has been updated, and an icon "END" displayed when the service offered by the corresponding application 72 has ended. In the status icon display section 304, no status icon 325 is displayed with regard to the application 72 whose status remains unchanged.

The registration status display section 305 displays a registered status icon 326 with regard to a registered application 72. The user may register favorite applications 72. Where the favorite applications 72 are registered, these applications 72 can be displayed along with a predetermined application 72 when the latter application is selected, as will be discussed later. And as will be explained later in detail, when an icon named "SERVICE CAST" is selected in order to reference again the initial screen shown in FIG. 10, the registered applications 72 are displayed.

The registered applications 72 are started simultaneously and processed individually. However, depending on the number of processes performed by a plurality of applications 72 mainly for access to the content server 13 via the network 11 for acquisition and display of the content data 131, the television receiver 14 could be overburdened. In particular, because of a limited capacity of the SDRAM 230 (FIG. 6) or the like that temporarily stores the content data 131, it is impossible to store an unlimited quantity of content data 131 for the multiple applications 72.

Thus, the number of applications 72 that can be registered may be limited. For example, up to five applications 72 may be arranged to be registered. When the user attempts to register a sixth application 72, an error message may be caused to be displayed. Also, where the number of applications 72 that can be registered is limited illustratively to five, up to five registered status icons 326 are displayed in the registered status display section 305.

Whether or not applications have been registered varies depending on the television receiver 14. For this reason, the information about the registered applications 72 such as IDs for identifying the registered applications 72 is stored on the side of the television receiver 14. When the application list 71 is acquired by the television receiver 14, reference is made to the information stored in the television receiver 14 as well as to the information described in the application list 71 so that the registered applications 72 may be determined and that the registered status icons 326 may be displayed accordingly in the registered status display section 305.

Figure 12:
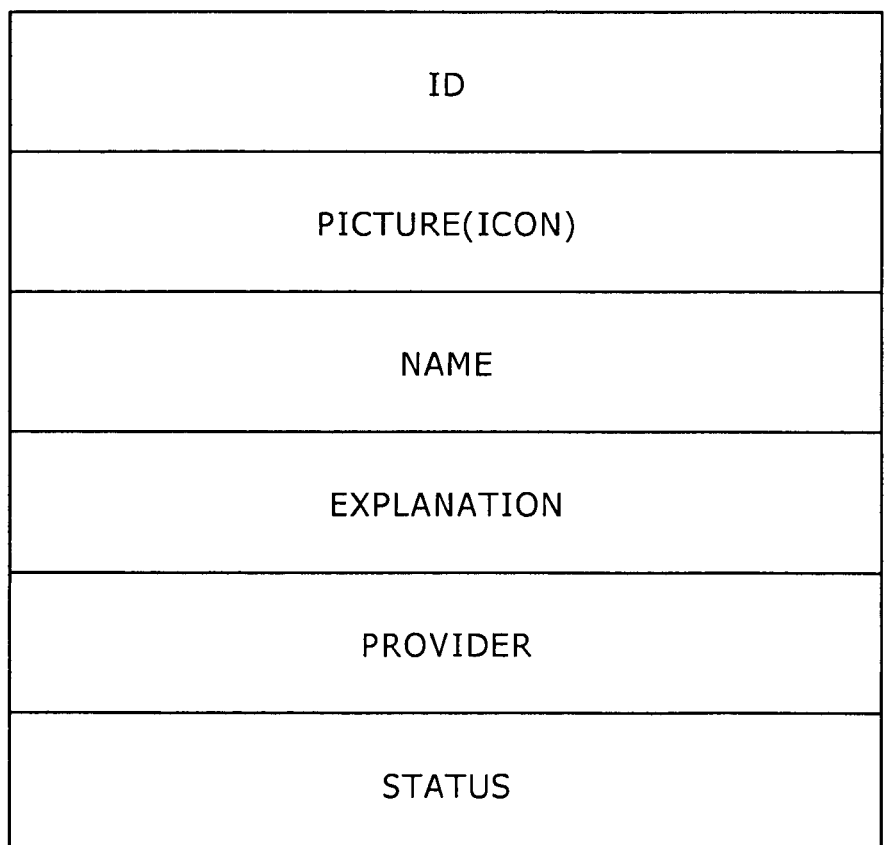
FIG. 12 is a view explanatory of an application list.

Of the information explained in reference to FIG. 11, the information displayed in the display sections other than the registered status display section 305 is listed in the application list 71. FIG. 12 shows typical information listed in the application list 71 with regard to a single application 72.

The application list 71 contains, for each application 72, an "ID" for identifying the application 72 in question, a "PIC-TURE" of the icon to be displayed in the icon display section 302, a "NAME" of the application 72, an "EXPLANATION" of the service offered by the application 72, a "PROVIDER" of the application 72, and information (data) about "STATUS" of the application 72.

The "ID" for identifying the application 72 may be the URL at which the application 72 in question is managed. And when the television receiver 14 determines whether a given application 72 has been registered, the ID managed by the television receiver 14 should be found in the application list 71.

The "PICTURE" of the icon displayed on the icon display section 302 may be the picture data proper of the icon or the URL at which the icon picture data is managed. In the case of the URL, the icon picture data is acquired when the application list 71 has been obtained and connection has been established with the URL listed in the application list 71.

Such management of the above-described application list 71 by the application server 12 side provides the following effects: when a new application 72 is registered in the application list 71, the administrator who manages the application server 12 (i.e., service provider 21 in FIG. 2) may examine the application in question. This makes it possible to prevent a malicious application 72 illustratively containing viruses from getting registered. This in turn helps enhance the security of the applications 72 to be provided to the user 24 (i.e., to the side of the television receiver 14).

Also, the application list 71 is supplied to the television receiver 14 which in turn presents the user side with solely the applications 72 listed in the supplied application list 71. Thus when the application list 71 is updated, the television receiver 14 can perform processes based on the updated application list 71. For example, where a new application 72 is registered, the television receiver 14 can provide the user with the newly registered application 72 without troubling the user (e.g., without prompting the user to perform an update process).

In other words, it becomes possible for the administrator side freely to determine the applications 72 to be provided to the user side. Illustratively, questionable applications 72 can be deleted from the application list 71. Thus it is possible to provide the applications 72 to the user side under the administrator's appropriate management. In addition, the service provider 21 side can freely set the application providers 22. Illustratively, the contract with any questionable application provider 22 may be canceled and the information about the application 72 provided by that application provider 22 may be deleted from the application list 71. In this manner, the applications 72 can be provided to the user 24 under appropriate management of the service provider 21.

The television receiver 14 holds the URL at which the application server 12 is accessed for acquisition of the application list 71.

Returning to the explanation of the initial screen shown in FIG. 10, the user may operate the down direction button 271-2 (FIG. 10) of the remote controller 251 when the initial screen such as one in FIG. 10 is being displayed on the display panel 221. The operation of the button changes the screen to what is shown in FIG. 13.

Figure 13:
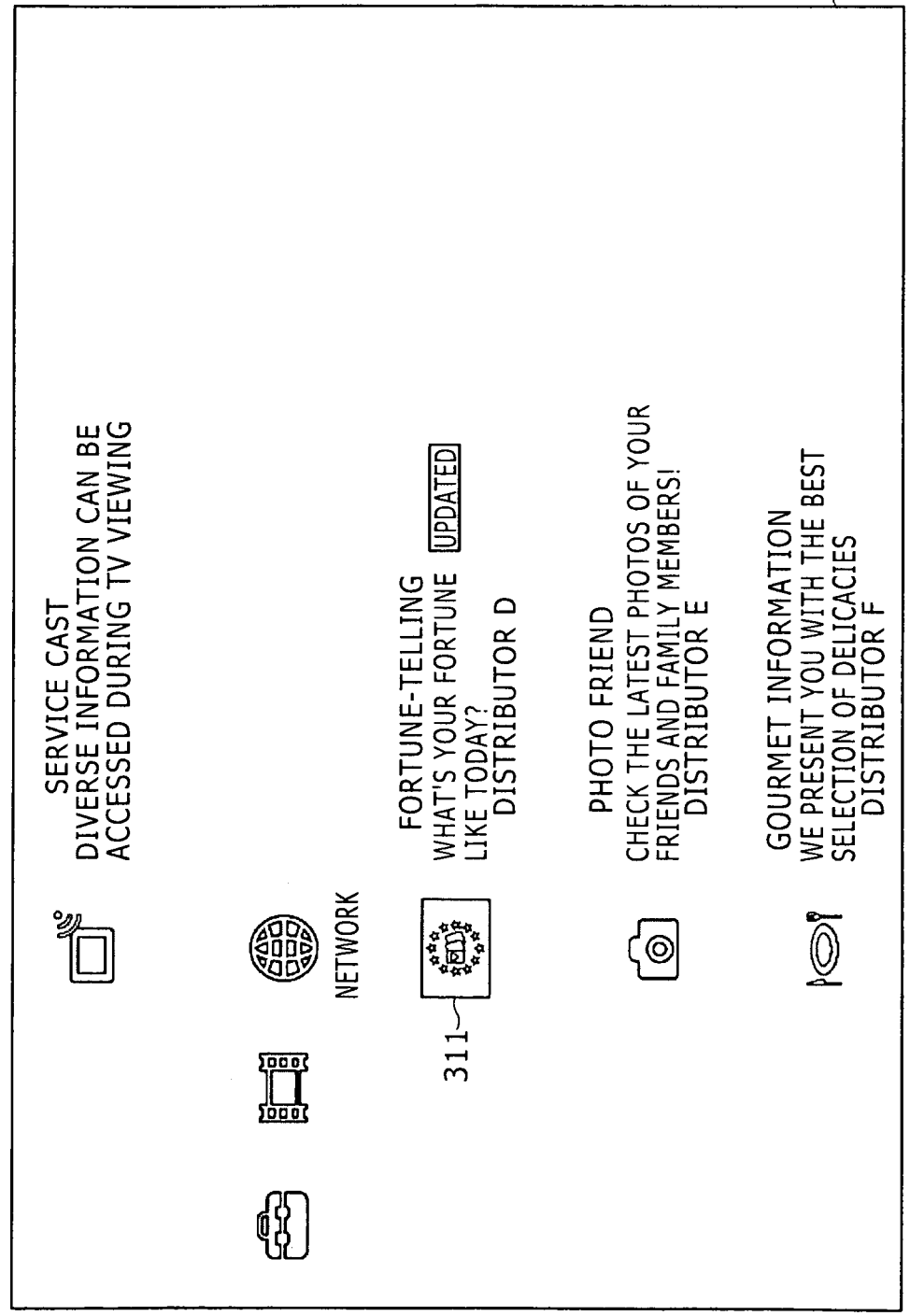
FIG. 13 is a view showing a typical screen displayed on the display panel.

A comparison between the typical screen shown in FIG. 13 and the typical screen indicated in FIG. 10 reveals that on the screen of FIG. 10 (i.e., initial screen), the cursor 311 is positioned on the icon indicative of the application 72 named "NEWS" and that on the screen of FIG. 13, the cursor 311 is positioned on the icon representative of the application 72 named "FORTUNE-TELLING."

Referring to FIG. 10, the icon of the application 72 named "FORTUNE-TELLING" is positioned two places below the icon of the application 72 named "NEWS." When the user operates twice the down direction button 271-2 of the remote controller 251 or keeps pressing the down direction button 271-2 until the cursor 311 moves down two places, the cursor 311 is moved in the downward direction to the icon two places below.

In this case, the position of the cursor 311 is fixed so that the icons displayed in the icon display section 302 are in fact moved up by two places. This provides the process corresponding to the case where the down direction button 271-2 of the remote controller is operated twice.

Figure 14:
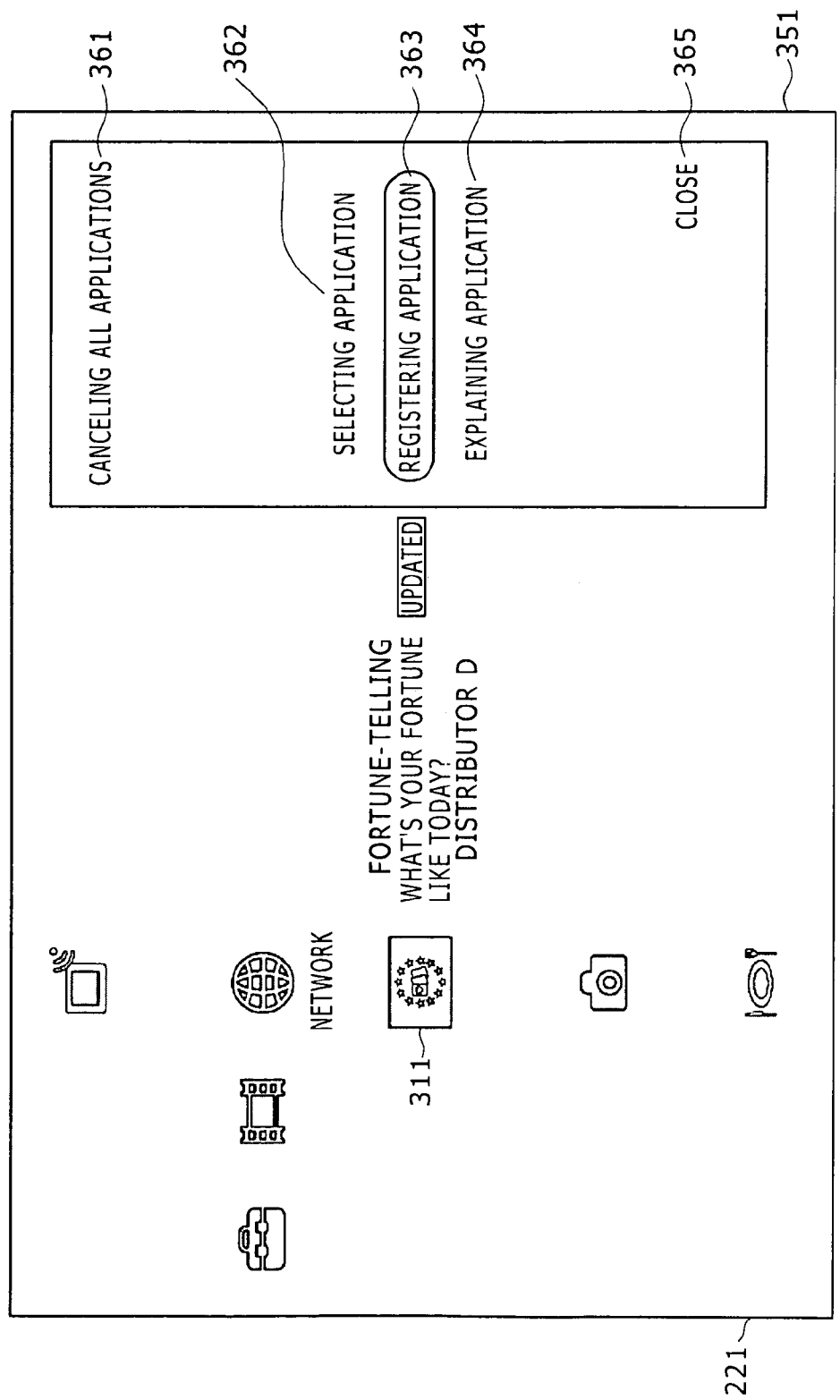
FIG. 14 is a view showing a typical screen displayed on the display panel.

If the set button 273 of the remote controller 251 is operated while the cursor 311 is positioned on the icon of the application 72 named "FORTUNE-TELLING" as shown in FIG. 13, then the screen shown in FIG. 14 appears.

The screen shown in FIG. 14 will now be explained. The screen of FIG. 14 is formed by the screen of FIG. 13 being overlaid with a setting screen 351. The setting screen 351 displays selection items made up of an item 361 called "CANCELING ALL APPLICATIONS" operated to cancel all registered applications 72, an item 362 called "SELECTING APPLICATION" operated to activate the selected application 72, an item 363 called "REGISTERING APPLICATION" operated to register the selected application 72, an item 364 called "EXPLAINING APPLICATION" operated to view the explanation of the application 72 illustratively about the specifics of the process carried out by this application, and an item 365 called "CLOSE" operated to close the selection screen 351.

In this context, "the selected application 72" signifies the application 72 corresponding to the icon on which the cursor 311 is positioned. On the typical screen shown in FIG. 14, the selected application 72 is the application 72 named "FORTUNE-TELLING."

Referring again to the typical screen of FIG. 13, the application 72 named "FORTUNE-TELLING" has yet to be registered, so that an icon indicative of registered status is not displayed in the registration status display section 305. If a selection is made of the item 363 called "REGISTER APPLICATION" (FIG. 14) while such an unregistered application 72 is being selected, then that application 72 is registered.

When the registration has been done, the icon indicative of registered status will appear next time the initial screen is displayed. And following the registration, the ID of the registered application 72 is stored in the television receiver 14. Also, if the predetermined number of applications 72 have already been registered upon registration of an additional application 72, then an error message or the like is displayed and the registration is not accomplished.

When registration is to be carried out, a screen, not shown, designed to prompt the user to confirm the execution of registration may be displayed.

Figure 15:
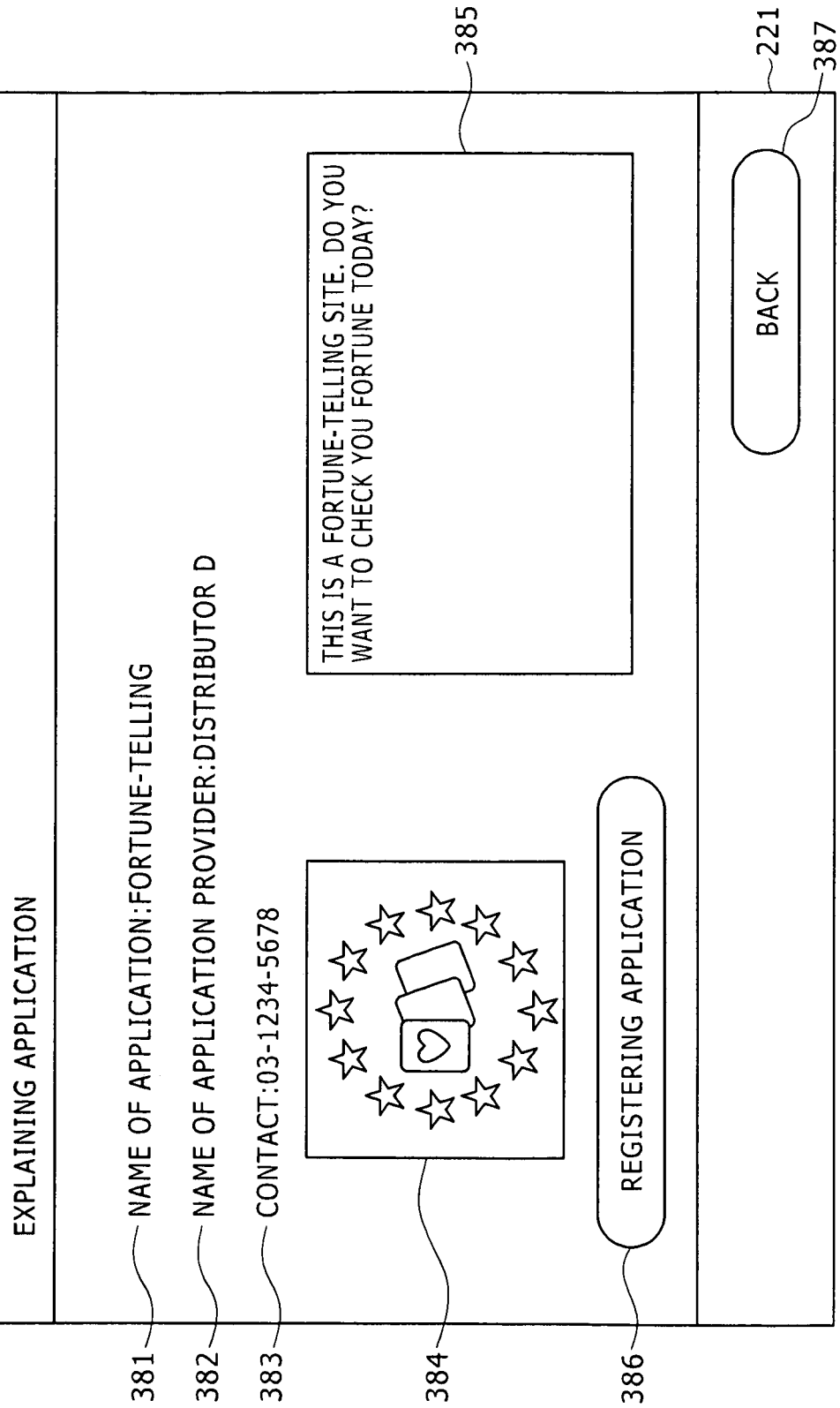
FIG. 15 is a view showing a typical screen displayed on the display panel.

Returning to the explanation of the typical screen in FIG. 14, selecting the item 364 called "EXPLAINING APPLICATION" changes the screen of the display panel 221 to an application explanation screen 371 such as one shown in FIG. 15. The application explanation screen 371 includes an area 381 for displaying the name of the application 72, an area 382 for displaying the name of the provider providing the application 72, and an area 383 for displaying the telephone number to call upon inquiry about the application 72.

Also, the application explanation screen 371 includes an area 384 for displaying a picture allowing the user to image the service offered by the process of the application 72, such as an enlarged picture of the icon displayed in the icon display section 302, and an area 385 for displaying a text that explains the specifics of the service offered to the user by the process of the application 72.

The application explanation screen 371 is furnished with a button 386 operated to display the contact at which to inquire about the application 72 as well as support information about the application 72 after a Web browser is activated, and a button 387 operated to go back to the screen shown in FIG. 14, i.e., the screen displaying the setting screen 351.

By viewing the application explanation screen 371 described above, the user can recognize illustratively the specifics of the service provided by the application 72.

Explained next are the screens brought up when the application 72 is started from the screen shown in FIG. 13 or 14. The screen shown in FIG. 13 is one on which the cursor 311 is positioned on the icon indicative of the application 72 named "FORTUNE-TELLING." If the enter button 272 (FIG. 10) of the remote controller 251 is operated while the cursor 311 is being positioned on the icon indicating a particular application 72, the screen of the display panel 221 is changed to the screen such as one shown in FIG. 16.

Alternatively, the item 362 called "SELECTING APPLICATION" may be operated when the cursor 311 is positioned on the icon indicative of the application 72 named "FORTUNE-TELLING" as shown in FIG. 14 while the setting screen 351 is being displayed. In this case, the screen of the display panel 221 is changed to the screen shown in FIG. 16.

When the application 72 is started, the data of the body of the application 72 is acquired from the application server 12. That is, when an instruction is given to start the application 72 in the case above, the application server 12 is accessed and the data of the body (e.g., program) of the application 72 is acquired therefrom. Upon data acquisition, the data of the application 72 of which the start was designated based on the ID of the application 72 listed in the application list 71 is acquired.

Figure 16:
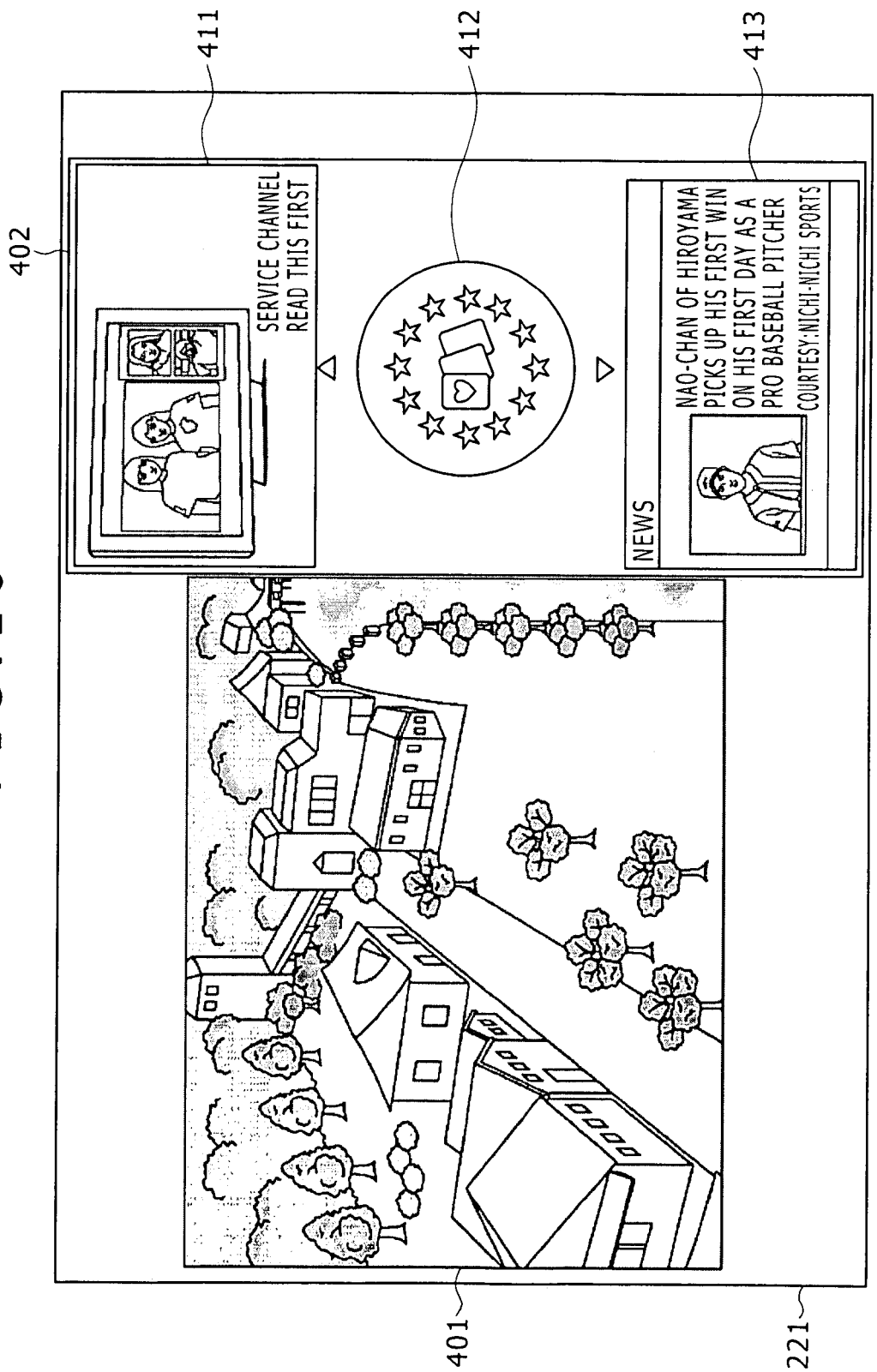
FIG. 16 is a view showing a typical screen displayed on the display panel.

The screen shown in FIG. 16 will now be explained. The screen in FIG. 16 is constituted by the left-hand portion making up a program display area 401 for displaying a television broadcast program and by the right-hand portion making up an application display area 402 for displaying the services of a plurality of applications 72. In this manner, both the television broadcast program and the information offered by the applications 72 are provided to the user simultaneously. The user can view desired information offered by the applications 72 while enjoying the television broadcast program.

On the typical screen shown in FIG. 16, the application display area 402 displays the information offered by three applications 72. A top area 411 of the application display area 402 displays the information offered by the application 72 named service channel (in the ensuing description, the application 72 named "SERVICE CHANNEL" will be described as corresponding to the application 72-1); a middle area 412 displays the information offered by the application 72 named fortune-telling (in the ensuing description, the application 72 named "FORTUNE-TELLING" will be described as corresponding to the application 72-2); and a bottom area 413 displays the information offered by the application named news (in the ensuing description, the application 72 named "NEWS" will be described as corresponding to the application 72-3).

The applications 72 having their information displayed in the application display area 402 are the registered applications 72 and the selected application 72. As mentioned above, the user is allowed to register a predetermined number of applications beforehand. The applications 72 registered by the user are displayed in the application display area 402 along with the application 72 that has been selected but has yet to be registered.

For example, on the screen shown in FIG. 16, the application 72-2 called fortune-telling is an unregistered application 72, determined as such upon reference to FIG. 13. When the unregistered application 72-2 is selected, the registered applications 72-1 and 72-3 are also displayed together with the application 72-2 in the application display area 402.

The applications 72 displayed in the application display area 402 are in operation each. For example, the application 72-3 offering the service of displaying news connects to the content server 13 in keeping with the timing set by the application 72-3, acquires new content data 131 therefrom, and updates the news (text) accordingly that is displayed in the area 413.

Not only the applications 72-1 through 72-3 displayed in the application display area 402 are operating but also the applications 72 that are not displayed but have been registered are in operation. For example, if five applications 72 have been registered, then either the five registered applications 72 or these five applications 72 plus the selected but unregistered application 72 are performing their processes whether they are displayed or not in the application display area 402. Illustratively, the above-mentioned application 72-3 connects to the content server 13 and acquires news therefrom whether the application is displayed or not in the application display area 402.

In this manner, the information provided by an application 72 displayed in the application display area 402 is updated regardless of the user's instructions if the application 72 in question is designed to update its information in suitable fashion. This enables the user to acquire new information without performing bothersome operations.

In this manner, when an instruction is given to start a single operation 72, both the application 72 of which the start was designated and the registered applications 72 are started simultaneously. In this context, simultaneous starting signifies that each application accesses the application server 12 to acquire its body of data, that processes are performed based on each acquired application 72, and that during the processing, each application 72 accesses the content server 13 as needed in order to acquire the content data 131.

In this manner, according to this embodiment of the invention, when an instruction is given to start an application 72, the data about that application 72 is acquired. Thus there is no need for the data about the application 72 to stay resident in the television receiver 14. This makes it possible to reduce the size of storage allocated to the data regarding the application 72, such as the storage capacity of the SDRAM 230 (FIG. 7).

Figure 17:
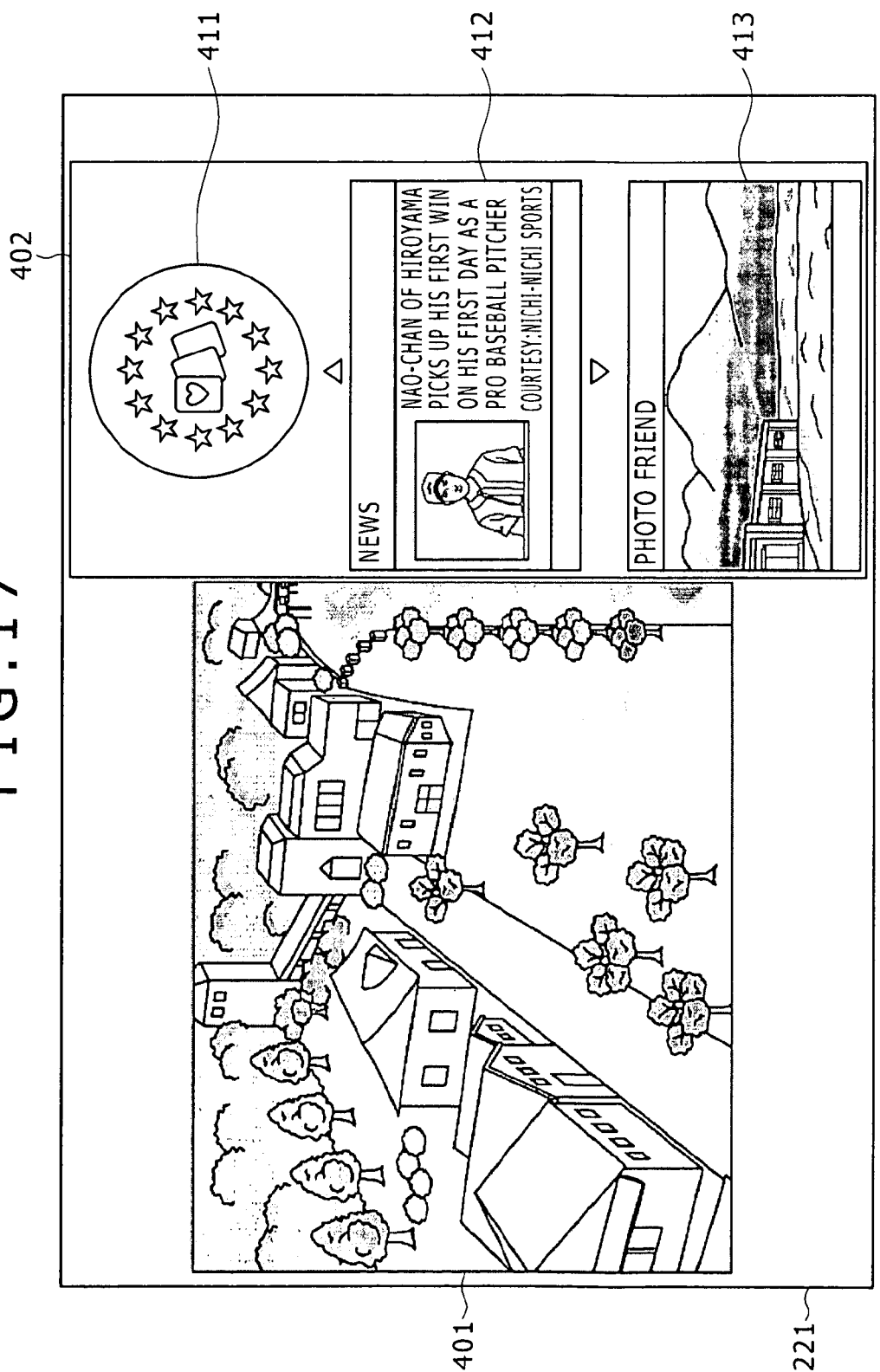
FIG. 17 is a view showing a typical screen displayed on the display panel.

Referring again to FIG. 16, the applications 72-1 through 72-3 displayed in the application display area 402 are moved up when the up direction button 271-1 of the remote controller 251 is operated. This makes way for another application 72 to appear from outside the application display area 402, the application 72 being an application 72-4 virtually positioned just below the application 72-3. Consequently, as shown in FIG. 17, the area 411 displays the information offered by the application 72-2; the area 412 displays the information offered by the application 72-3; and the area 413 displays the information offered by the application 72-4. In the ensuing description, the application 72-4 will be explained as an application 72 corresponding to the name "PHOTO FRIEND."

Figure 18:
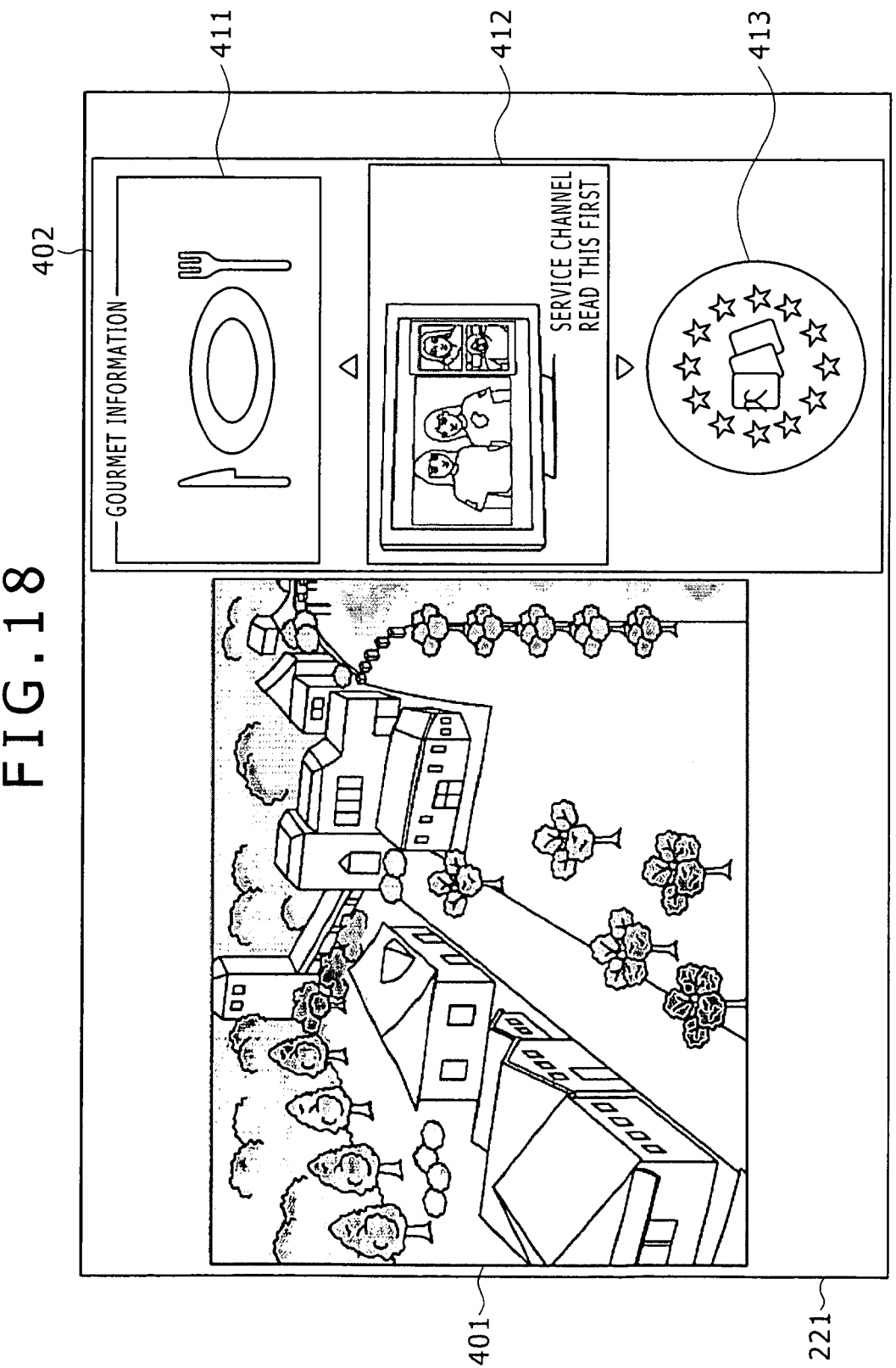
FIG. 18 is a view showing a typical screen displayed on the display panel.

And when the down direction button 271-2 of the remote controller 251 is operated, the applications 72-1 through 72-3 are moved down to make way for another application 72 to appear from outside the application display area 402, the application 72 being an application 72-5 virtually positioned just above the application 72-1. Consequently, as shown in FIG. 18, the area 411 displays the information offered by the application 72-5; the area 412 displays the information offered by the application 72-1; and the area 413 displays the information offered by the application 72-2. In the ensuing description, the application 72-5 will be explained as an application 72 corresponding to the name "GOURMET INFORMATION."

In this manner, the parallelly operating applications 72 are virtually arrayed in the vertical direction. When the up direction button 271-1 or down direction button 271-2 of the remote controller 251 is operated, the applications 72 displayed in the application display area 402 are changed.

The screens shown in FIGS. 16 through 18 are described as those in normal mode. If the enter button 272 of the remote controller 251 is operated while normal mode is in effect, that mode is replaced by focus mode in which the application 72 currently positioned in the middle area (i.e., application 72 of which the information is being displayed in the area 412) is focused.

Illustratively, on the screen shown in FIG. 16, the application 72-2 named "FORTUNE-TELLING" has its information displayed in the area 412 of the application display area 402. In such a state, operating the enter button 272 of the remote controller 251 brings up a focus mode screen on which the application 72-2 is focused.

Figure 19:
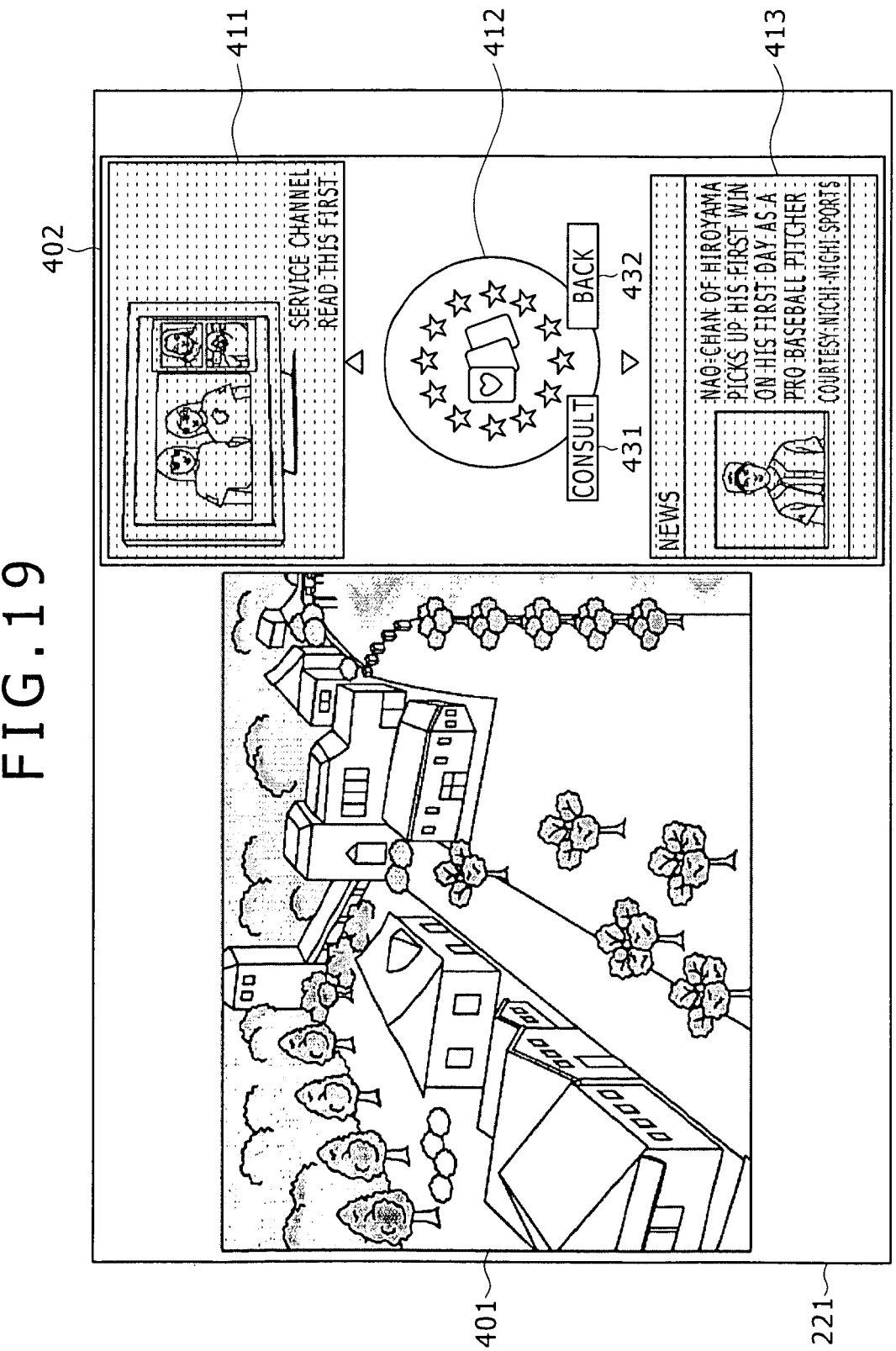
FIG. 19 is a view showing a typical screen displayed on the display panel.

FIG. 19 shows a typical screen in focus mode. When focus mode is in effect, the areas 411 and 413 of the application display area 402 are dimmed. In other words, the middle area 412 alone of the application display area 402 is displayed more brightly than the other areas. In focus mode, too, the registered applications 72 and the selected application 72 are operating in parallel whether they are displayed or not in the application display area 402.

In focus mode, as in normal mode, when the up direction button 271-1 or down-direction button 271-2 of the remote controller 251 is operated, the applications 72 displayed in the application display area 402 are slid in the upward or downward direction. The sliding changes the application 72 displayed in the area 412, so that the application to be focused can be changed. Thus, the user can focus a desired application 72 also in focus mode.

When focus mode is selected, the buttons based on the focused application 72 may be displayed anew. For example, in FIG. 19 where the application 72-2 of "FORTUNE-TELLING" is displayed in the area 412, a button 431 named "CONSULT" is displayed in focus mode. Also displayed is a button 432 named "BACK" which is operated to go back to normal mode.

The user can select the button 431 or 432 by operating the left direction button 271-3 or the right direction button 271-4 of the remote controller 251. Operating the enter button 272 following selection of the button 431 or 432 carries out the process corresponding to the selected button. If the button 431 named "CONSULT" is selected followed by operation of the enter button, active mode is selected; if the button 432 named "BACK" is selected followed by operation of the enter button, normal mode is selected.

Figure 20:
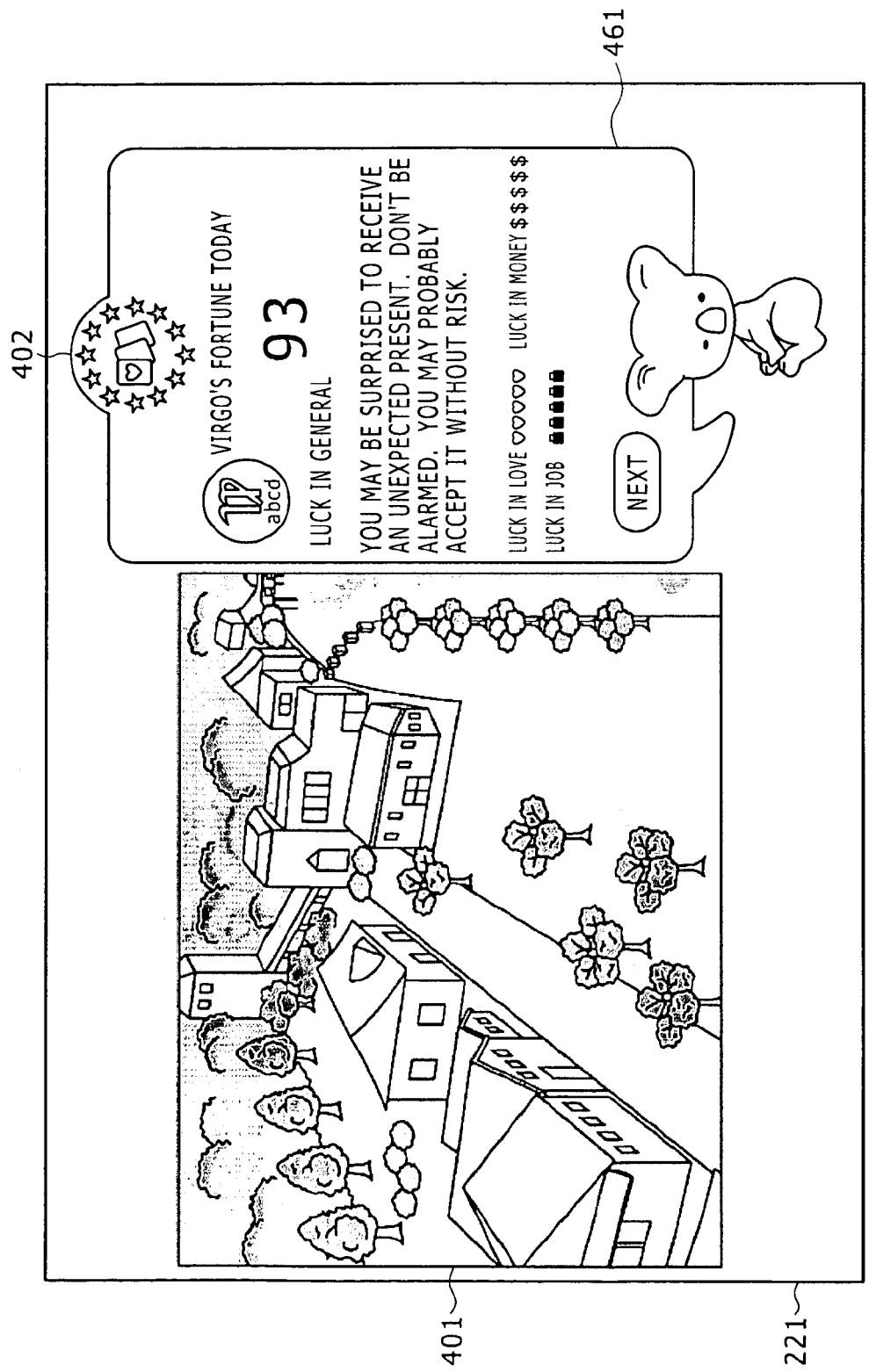
FIG. 20 is a view showing a typical screen displayed on the display panel.

Active mode is a mode in which only the information provided by a single application 72 is displayed. FIG. 20 shows a typical screen displayed on the display panel 221 in active mode. The application display area 402 displays an active screen 461 indicating only the information provided by a single application 72, which is the application 72-2 named "FORTUNE-TELLING" in this case.

In active mode, the information provided by one application 72 is displayed and the operations of the other applications 72 are stopped. In normal mode or in focus mode, as mentioned above, the registered applications 72 and the selected application 72 operate in parallel whether they are displayed or not. In active mode, only the displayed application 72 is in operation.

When active mode is selected, the activated application 72 accesses the content server 13 to acquire the content data 131 therefrom. When the process based on the acquired content data 131 is carried out, the active screen 461 is displayed.

Where the information provided by, for example, the application 72-2 named "FORTUNE-TELLING" is displayed as shown in FIG. 20, the active screen 461 displays a text indicating the specifics of the fortune. And the information about the fortune shown in FIG. 20 is provided for each constellation. If it is desired to view the information about the fortune of any constellation other than the displayed constellation (Virgo in FIG. 20), then a button named "NEXT" furnished at the bottom of the active screen 461 is operated. By operating the "NEXT" button, the user can view the information about the fortune of the desired constellation.

Meanwhile, where the information about the fortune is provided for each constellation, the user might wish to view the fortune information about his or her constellation without operating the "NEXT" button. In such a case, the user's constellation is registered so that the information about the registered constellation may be displayed first whenever active mode is selected.

Figure 21:
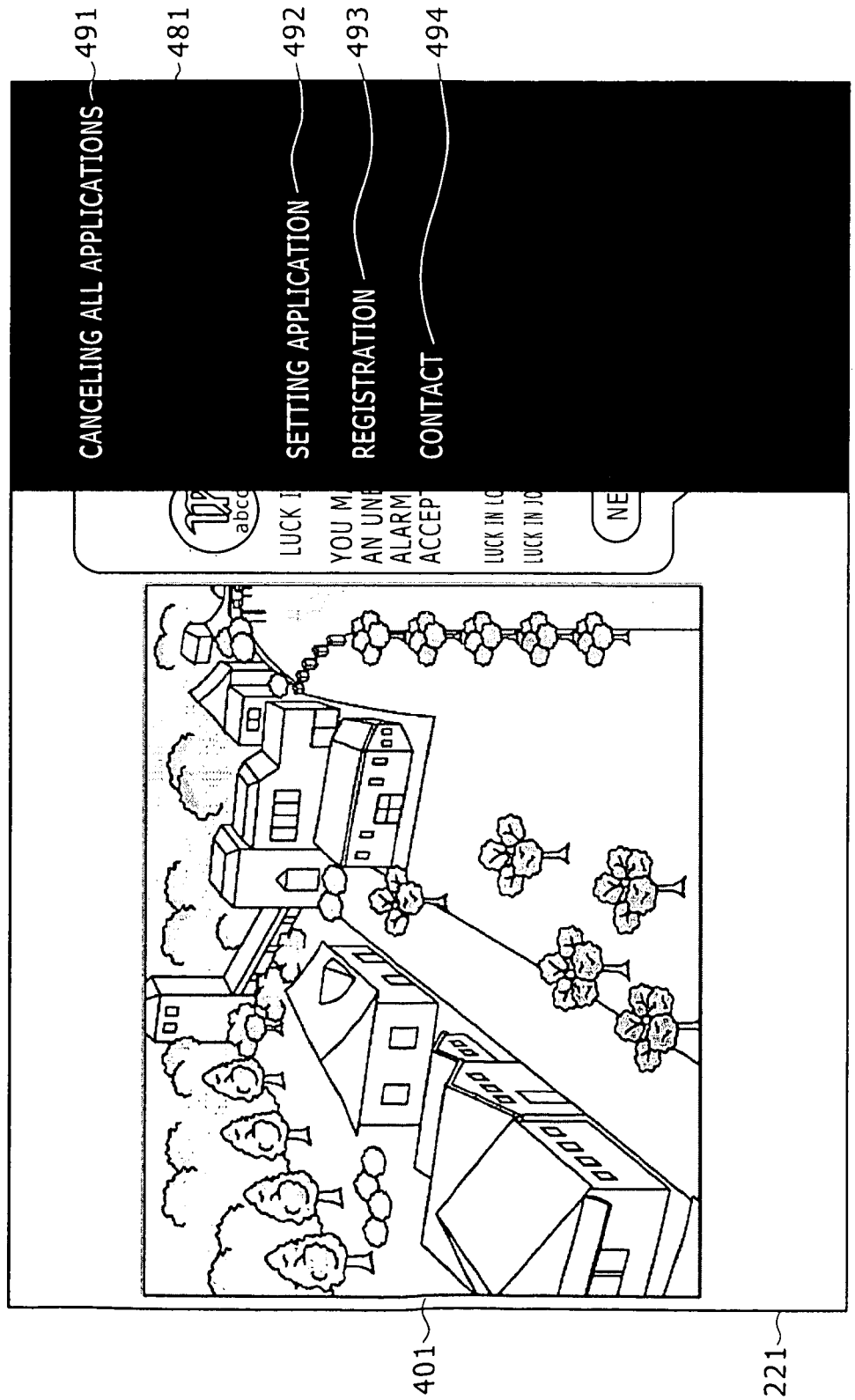
FIG. 21 is a view showing a typical screen displayed on the display panel.

For example, if the user operates the set button 273 of the remote controller 251 when the active mode screen of FIG. 20 is in effect, then an option menu screen on which to set (i.e., register) a constellation, etc., is displayed. FIG. 21 shows a typical option menu screen corresponding to the application 72-2 named "FORTUNE-TELLING." An option menu screen 481 appears superposed on the normal mode screen (such as one in FIG. 16) or on the focus mode screen (such as one in FIG. 19) in the same manner as in active mode when the set button 273 is operated while any of these screens is displayed.

Referring to FIG. 21, the option menu screen 481 displays a button 491 named "CANCELING ALL APPLICATIONS," a button 492 named "SETTING APPLICATION," a button 493 named "REGISTRATION," and a button 494 named "CONTACT." Of these buttons, the button 493 named "REGISTRATION" appears on the option menu screen 481 if an unregistered application 72 is targeted for processing; a button 493 named "CANCELING REGISTRATION" appears if a registered application 72 is targeted for processing.

The button 491 named "CANCELING ALL APPLICATIONS" is operated to cancel all registered applications 72. The button 492 named "SETTING APPLICATION" is operated to set information that is dependent on the application 72, such as constellation information if the application 72 relates to fortune-telling by constellation.

The button 493 named "REGISTRATION" is displayed when an unregistered application is targeted for processing and is operated to register the targeted application 72. If a registered application 72 is targeted for processing, then the button 493 named "CANCELING REGISTRATION" is displayed. The button 493 named "CANCELING REGISTRATION" is operated to cancel the registered application 72.

The button 494 named "CONTACT" is operated to display information illustratively about the provider of the application 72.

Figure 22:
FIG. 22 is a view showing a typical screen displayed on the display panel.

Operating the button 492 named "SETTING APPLICATION" brings up the screen such as one shown in FIG. 22.

The setting screen shown in FIG. 22 will now be described. The setting screen 501 of FIG. 22 is a screen on which make the settings of the application 72-2 named "FORTUNE-TELLING." The setting screen 501 regarding fortune-telling has a field 511 for selecting a constellation, a field 512 to which to input a name, and a field 513 for selecting favorite foods.

The field 511 for constellation selection is designed to select one constellation. The desired constellation is selected by operating the up direction button 271-1 or the down direction button 271-2 of the remote controller 251.

The field 512 for name input is designed to let the user input and set his or her name, nickname or other desired text by operating the remote controller 251. Although the field 512 here has been described as admitting the name, a user ID or a password may alternatively be set in this field depending on the application 72.

The field 513 for selecting favorite foods has the names of a plurality of foods arrayed in list form, each food name being prefixed with a check box. The user is allowed to select the names of multiple foods and put a check mark into each of their check boxes.

As described, the items to be set on the setting screen 501 include an item to be set by the user inputting the desired text or the like, an item to be set by the user selecting one of predetermined item options, and an item to be set by the user selecting a plurality of predetermined item options.

The items set as described on the setting screen 501 are stored in the television receiver 14 side. And when, for example, the application 72-2 of "FORTUNE-TELLING" is placed in active mode, then the constellation, which is one of the set items in the television receiver 14, is referenced, and the content corresponding to the referenced constellation is acquired from the content server 13 and displayed.

Thus when focus mode or active mode is selected, the user can first view the fortune of his or her constellation once that constellation has been set.

Figure 23:
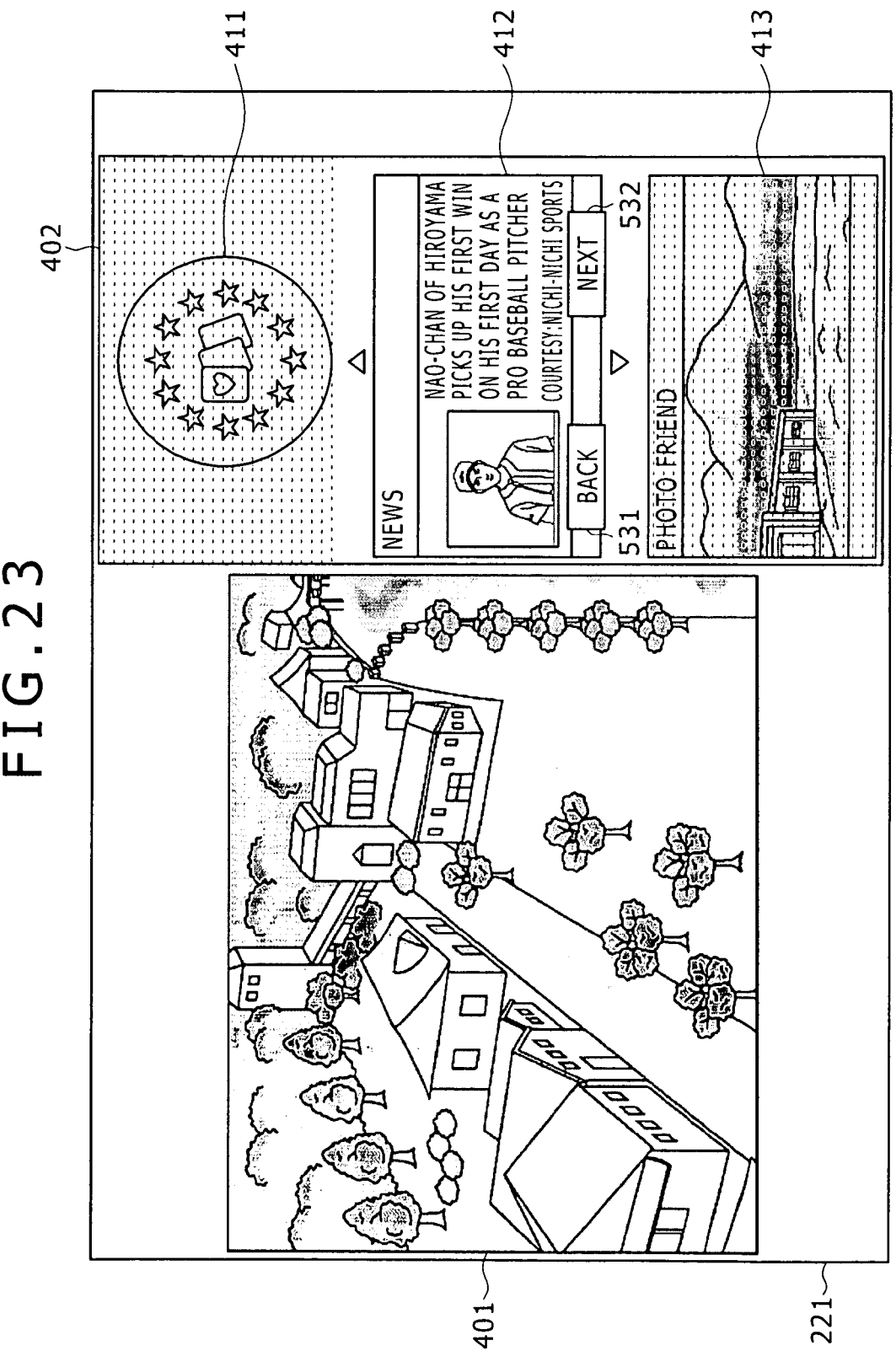
FIG. 23 is a view showing a typical screen displayed on the display panel.

The foregoing example was explained primarily in connection with the application 72-2 named "FORTUNE-TELLING." The application 72-3 named "NEWS" will be explained below as another example.

Where the normal mode screen such as one shown in FIG. 17 is in effect, i.e., where the information based on the application 72-3 named "NEWS" is displayed in the area 412 in the middle of the application display area 402, operating the enter button 272 of the remote controller 251 brings up the focus mode screen such as one shown in FIG. 23.

FIG. 23 shows a typical screen in focus mode in which the application 72-3 named "NEWS" is focused. In the application display area 402, only the area 412 in which the news from the process performed by the application 72-3 is displayed appears brighter than the other areas. In such focus mode, the registered applications 72 and the selected application 72 operate in parallel whether they are displayed or not in the application display area 402.

In the example shown in FIG. 23, a button 531 named "BACK" and a button 532 named "NEXT" are displayed on the basis of the application 72-3 named "NEWS." The "BACK" button 531 is operated to go back to the preceding article of the news; the "NEXT" button 532 is operated to go to the next article of the news.

Arrangements are made so that operation of the left direction button 271-3 of the remote controller 251 corresponds to operating the "BACK" button 531, and that operation of the right direction button 271-4 corresponds to operating the "NEXT" button 532. The user can view desired news articles by operating the left direction button 271-3 or the right direction button 271-4.

In focus mode shown in FIG. 23, operating the enter button 272 of the remote controller 251 effects transition to active mode and changes screens. Active mode is a mode in which only the information provided by one application 72-3 is displayed as explained above. In the application display area 402, the active screen 461 indicating only the information provided by the application named "NEWS" is displayed as shown in FIG. 24.

When active mode is selected, the activated application 72-3 accesses the content server 13 to acquire the content data 131 about the news. When the process based on the acquired content data 131 is carried out, the news article is displayed in the form of the active screen 461. The news article displayed on the active screen 461 is updated at intervals set by the application 72-3. The content data 131 is acquired when an update is carried out.

Figure 24:
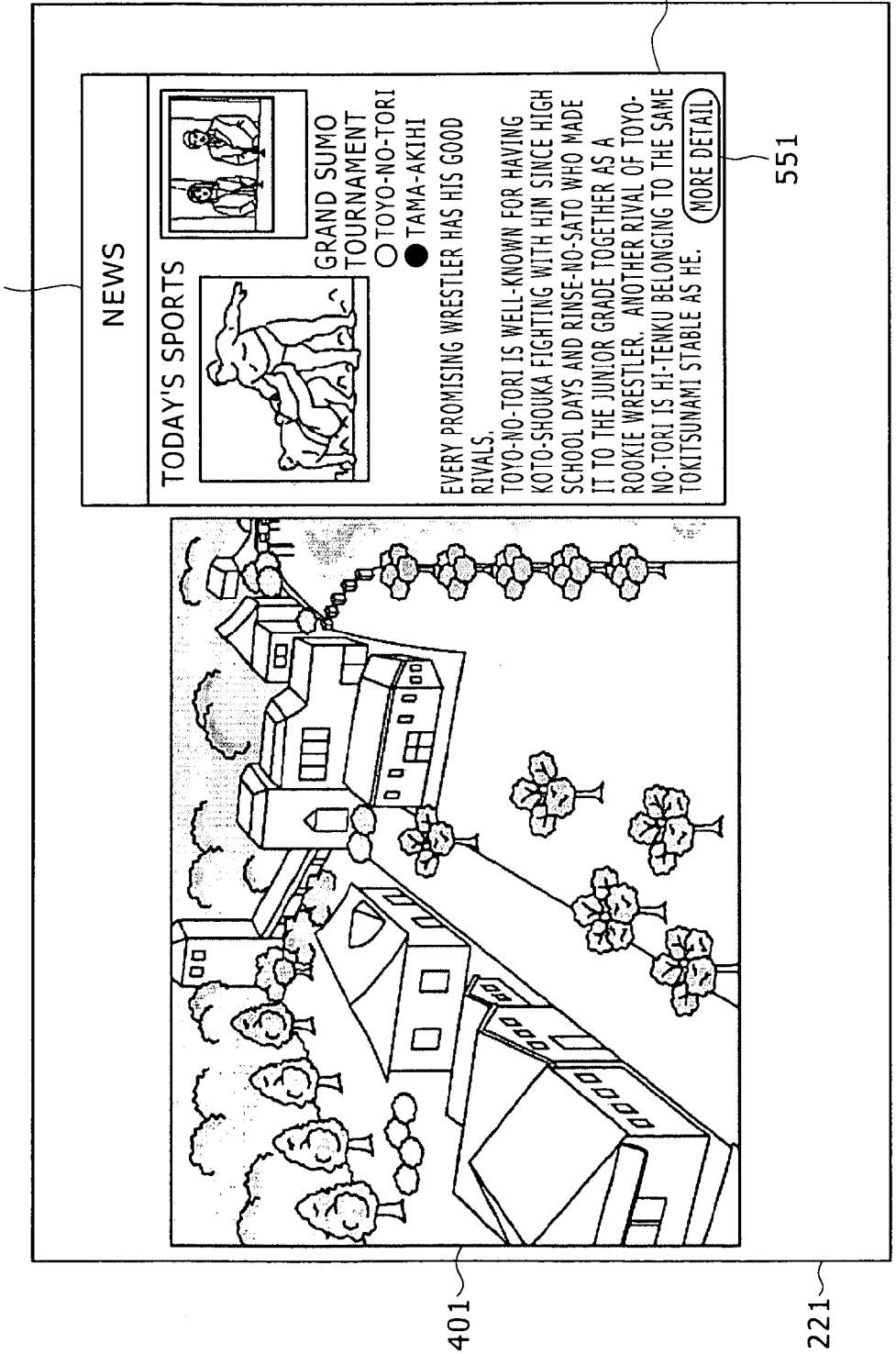
FIG. 24 is a view showing a typical screen displayed on the display panel.

The active screen 461 shown in FIG. 24 is furnished with a button 551 named "MORE DETAIL" which is operated to know more details about the news article being displayed. Thus the buttons provided on the active screen 461 are the ones suitable for the activated application 72.

When the button 551 named "MORE DETAIL" is operated, the content server 13 is accessed and more detailed data about the news article is acquired from the server. Alternatively, a suitable browser may be started by operation of the button 551 for access to a suitable server on the Internet, and the data acquired from the accessed server may be used to provide a more detailed article through a suitable process performed by the browser.

The active screen 461 displays illustratively a news article provided by the application 72-3 named "NEWS" as shown in FIG. 24. However, since different users are interested in different news, each user may set (i.e., register) the genre of his or her interest so that news articles of the preferred genre will be provided in preference to news articles of the other genres.

Figure 25:
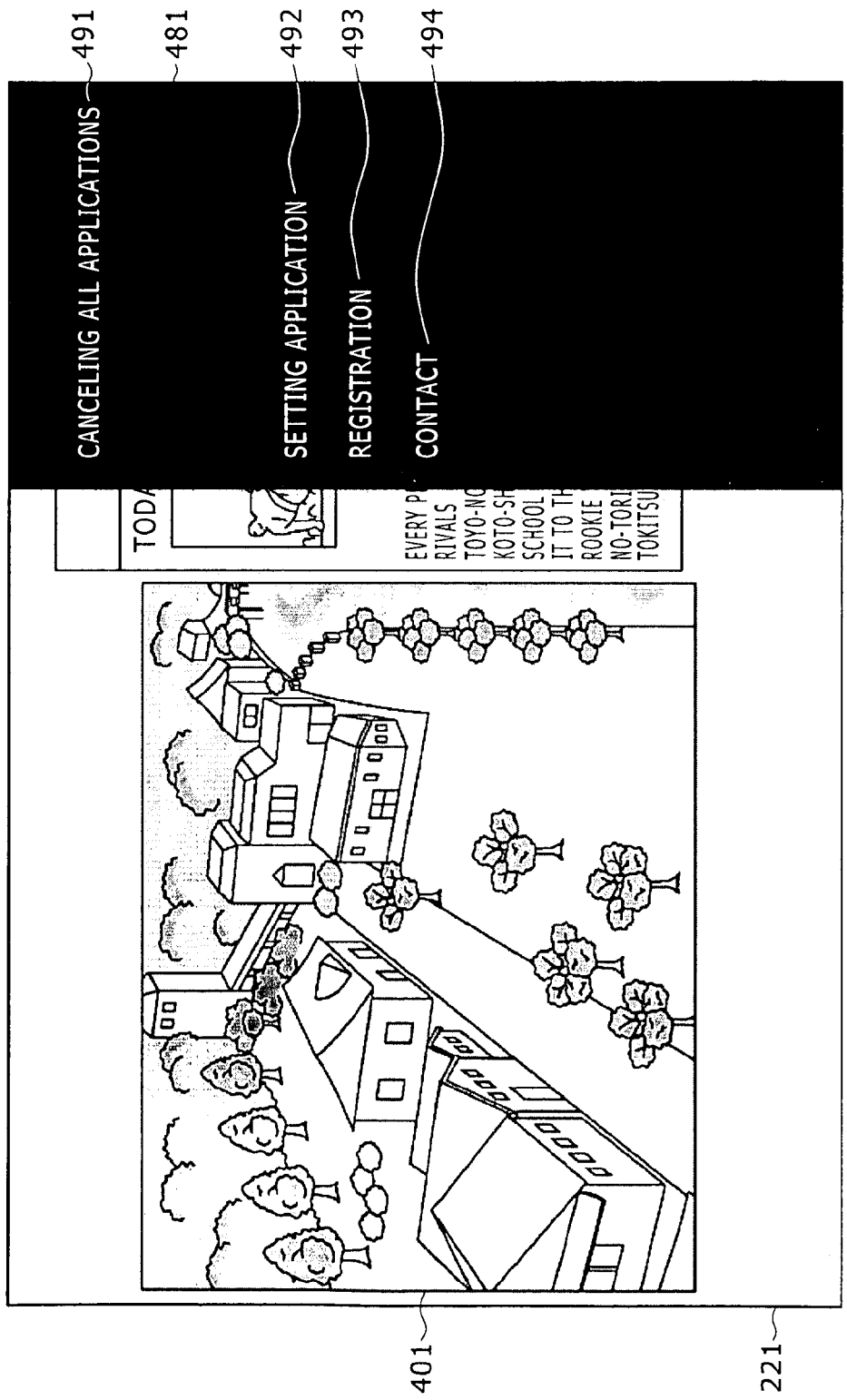
FIG. 25 is a view showing a typical screen displayed on the display panel.

When the user operates the set button 273 of the remote controller 251 while the active mode screen of FIG. 24 is in effect, the option menu screen 481 appears as shown in FIG. 25. This option menu screen 481 displays the same items as those of the option menu screen 481 (FIG. 21) displayed when the above-described application 72-2 named "FORTUNE-TELLING" is in active mode. The example shown in FIG. 25 is different from the example in FIG. 21 in that the option menu screen 481 is displayed on the active screen 461 of the news application 72-3.

Figure 26:
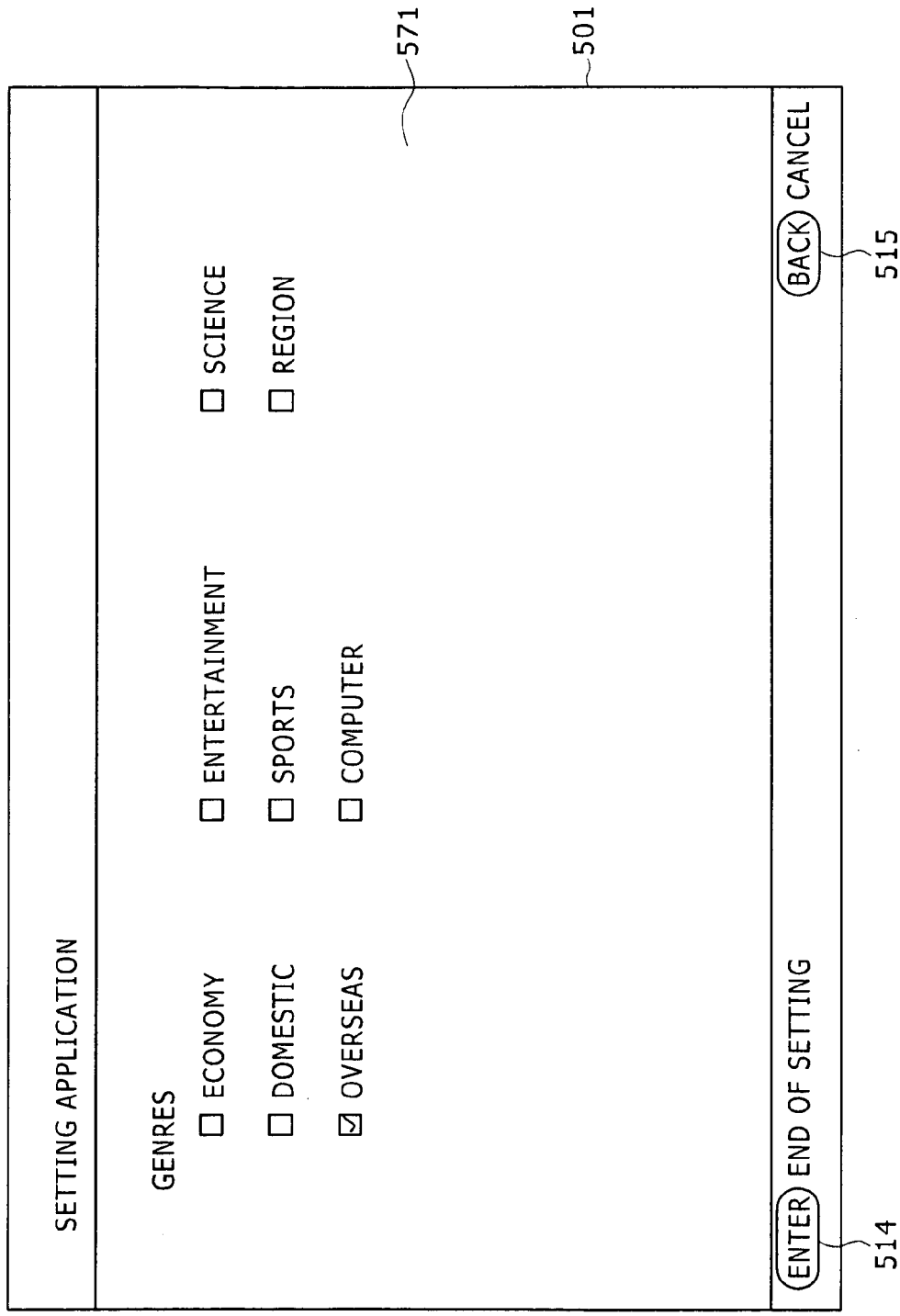
FIG. 26 is a view showing a typical screen displayed on the display panel.

The screen such as one shown in FIG. 26 is brought up when the button 492 corresponding to the item "SETTING APPLICATION" among the items displayed on the option menu screen 481 is operated. The setting screen shown in FIG. 26 will now be explained. The setting screen 501 of FIG. 22 is a screen on which make the settings of the application 72-3 named "NEWS." The setting screen 501 regarding news has an area 571 for selecting desired genres.

The area 571 for selecting desired genres has the names of a plurality of genres arrayed in list form, each genre name being prefixed with a check box. The user is allowed to select the names of multiple genres and put a check mark into each of their check boxes.

The items displayed on the setting screen 501 for the application 72-2 named "FORTUNE-TELLING" shown in FIG. 20 are different from the items displayed on the setting screen 501 for the application 72-3 named "NEWS" indicated in FIG. 26. These items are specific to the respective applications 72. In this manner, the items displayed on the setting screen 501 are dependent on the application 72.

The items set on the setting screen 501 are stored in the television receiver 14 side. And if the application 72-3 of "NEWS" is put in active mode, the genre name from among the items set in the television receiver 14 is referenced, and the content data 131 corresponding to the news belonging to that genre is acquired from the content server 13 and displayed. Thus the user can first view, when active mode is selected, the news belonging to the desired genre that has been set once by the user.

The application 72 named news operates in parallel with other applications 72 in normal mode as well as in focus mode as described above. News articles are updated as a result of the operation. Thus arrangements may be made so that the set genre is referenced not only in active mode but also in normal or focus mode and that the content data 131 of the news articles belonging to the referenced genre is acquired.

If the back button 274 of the remote controller 251 is operated in active mode, a normal mode screen is brought up.

As described, normal mode, focus mode, and active mode are provided. The user can acquire information easily in a desired mode while enjoying a television broadcast program.

Figure 27:
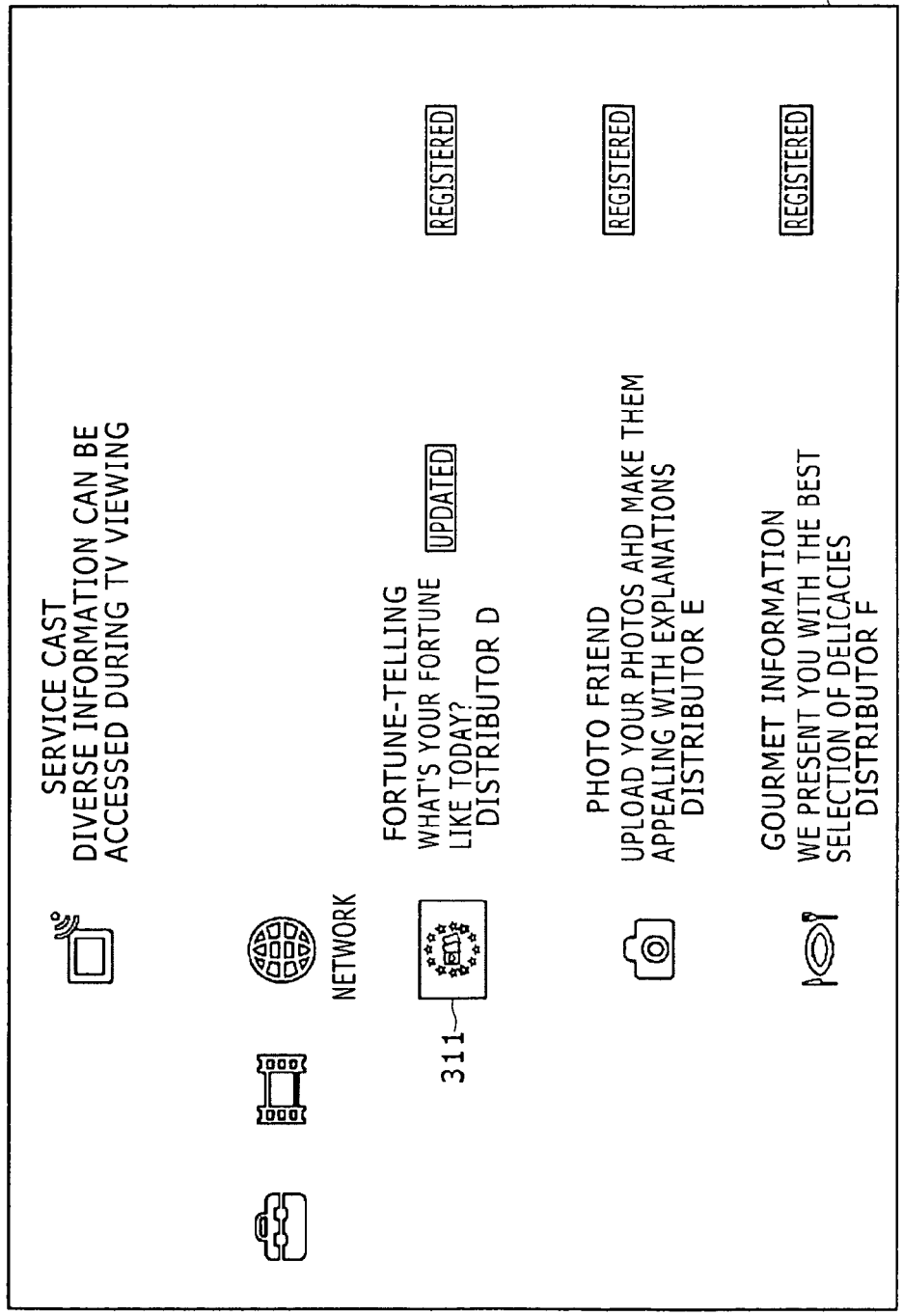
FIG. 27 is a view showing a typical screen displayed on the display panel.

An explanation will be made again hereunder in reference to the initial screen. The initial screen shown in FIG. 27 is referenced. An icon named "SERVICE CAST," an icon named "FORTUNE-TELLING," an icon named "PHOTO FRIEND," and an icon named "GOURMET INFORMATION" are displayed. Of these applications, the application 72-2 named "FORTUNE-TELLING," the application 72-4 named "PHOTO FRIEND," and the application 72-5 named "GOURMET INFORMATION" are registered applications, so that their "registered" icons are displayed in the registration status display section 305.

Where the three applications "FORTUNE-TELLING," "PHOTO FRIEND" and "GOURMET INFORMATION" are registered, selection of the icon named "SERVICE CAST" starts up the three registered applications 72-2, 72-4 and 72-5. When these three applications 72-2, 72-4 and 72-5 are started, the normal mode screen such as one shown in FIG. 28 is brought up.

Here, the icon to be operated to start only the registered applications 72 is named "SERVICE CAST" for purpose of explanation. However, any other icon name may be adopted provided the name prompts the user readily to recognize the specifics of the service.

Figure 28:
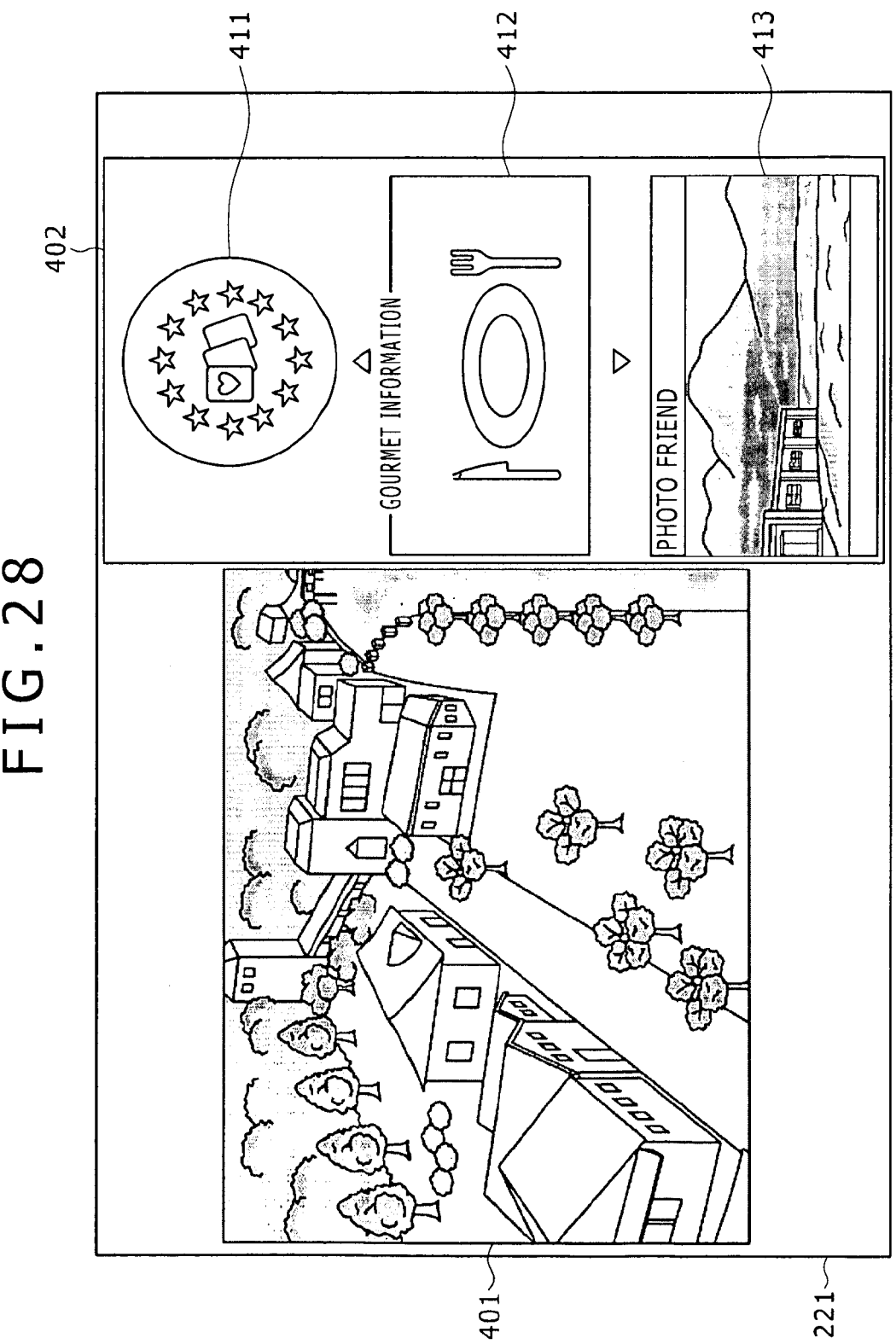
FIG. 28 is a view showing a typical screen displayed on the display panel.

The normal mode screen shown in FIG. 28 displays, in the application display area 402, the information to be provided by three registered applications 72-2, 72-4 and 72-5 named "FORTUNE-TELLING," "GOURMET INFORMATION" and "PHOTO FRIEND" respectively. The areas 411, 412 and 413 may be arranged to display the information from the applications 72-2, 72-4 and 72-5 in a suitable order, such as in the order in which the applications were registered or in the order in which they appear on the initial screen.

As described, the icon named "SERVICE CAST" is an icon that is operated to start the registered applications 72. This is a utility for starting a plurality of registered applications 72. Such an icon is also provided on the initial screen.

When the icon of the utility above is provided on the initial screen, the user can start up the registered applications all at once without having to search the list for the registered applications 72. Thus the user can acquire the information provided by the desired applications 72 by performing simple operations.

As described, when the initial screen is displayed, the application list 71 is acquired from the application server 12 and stored in the television receiver 14 side. When the initial screen is replaced by the normal mode screen, one or a plurality of applications 72 (i.e., proper programs of the applications 72) started at that point are acquired from the application server 12 and stored into the television receiver 14 side.

In normal mode or in focus mode, the content server 13 is accessed as needed based on the application 72 so that the content data 131 is acquired and stored into the television receiver 14 side. In this case, the connected content server 13 varies depending on the application 72, and the acquired content data 131 also varies accordingly. In active mode, the content server 13 or other server, not shown, is accessed based solely on the activated application 72 so that the content data 131 or other data is acquired and stored into the television receiver 14 side.

When the normal mode screen, focus mode screen, or active mode screen is replaced by the initial screen, the applications 72 and the content data 131 (other data) stored in the television receiver 14 side are deleted. In this manner, the applications 72 and content data 131 are stored as needed and are deleted whey they are no longer necessary. This makes it possible to reduce the storage area of the television receiver 14 side for accommodating the applications 72 and content data 131.

And because the television receiver 14 side acquires an application 72 as needed, the application, illustratively when it has been updated, can be provided in the updated version to the television receiver 14 side. This makes it possible always to provide the television receiver 14 side with the latest applications 72.

And because the television receiver 13 acquires only the applications 72 listed in the application list 71, appropriate management of the application list 71 prevents malicious applications 72 from getting downloaded to the television receiver 14. And if the period during which to list the applications 72 in the application list 71 is limited, then it is possible to provide the applications 72 to the user only during that period, which can enlarge the scope of the provided services.

Furthermore, since the television receiver 14 side acquires the content data 131 as needed and deletes the stored content data 131 when it is no longer necessary, frequently updated information such as news articles can be provided to the television receiver 14 side in the most recent versions, and the stored information in old versions is prevented from being offered to the user.

[Other Applications]

Although the examples above were explained with primary emphasis on the application 72-2 named "FORTUNE-TELLING," the basic flow of processing is the same with the other applications 72 as well. That is, as with the application 72-2 named "FORTUNE-TELLING," each of the other applications 72 is arranged to effect transition from normal mode to focus mode and from focus mode to active mode given the user's instructions and to let relevant settings be made in each mode.

Although their basic flow of processing is the same, the applications 72 other than that of "FORTUNE-TELLING" will be again explained below with regard to screen transition and other aspects. The registered applications 72 will be discussed first.

Figure 29:
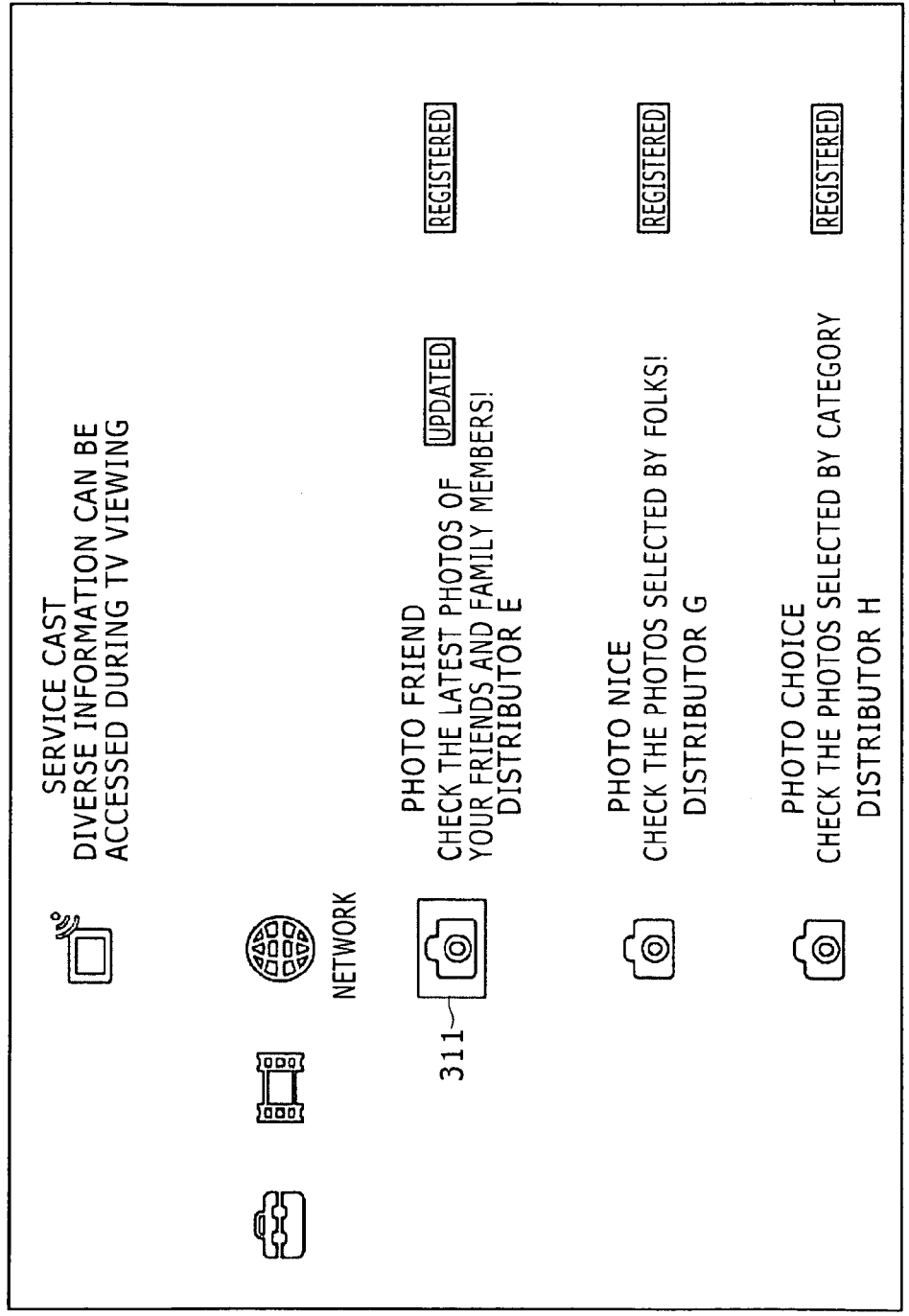
FIG. 29 is a view showing a typical screen displayed on the display panel.

An explanation will be made again in reference to the initial screen. The initial screen shown in FIG. 29 is referenced. An icon named "SERVICE CAST," an icon named "PHOTO FRIEND," an icon named "PHOTO NICE," and an icon named "PHOTO CHOICE" are displayed. Of these applications, the application 72-4 named "PHOTO FRIEND," the application 72-5 named "PHOTO NICE," and the application 72-6 named "PHOTO CHOICE" are registered applications, so that their "registered" icons are displayed in the registration status display section 305.

Where the three applications "PHOTO FRIEND," "PHOTO NICE" and "PHOTO CHOICE" are registered, selection of the icon named "SERVICE CAST" starts up the three registered applications 72-4, 72-5 and 72-6. When these three applications 72-4, 72-5 and 72-6 are started, the normal mode screen such as one shown in FIG. 30 is brought up.

Here, the icon to be operated to start only the registered applications 72 is named "SERVICE CAST" for purpose of explanation. However, any other icon name may be adopted provided the name prompts the user readily to recognize the specifics of the service.

Figure 30:
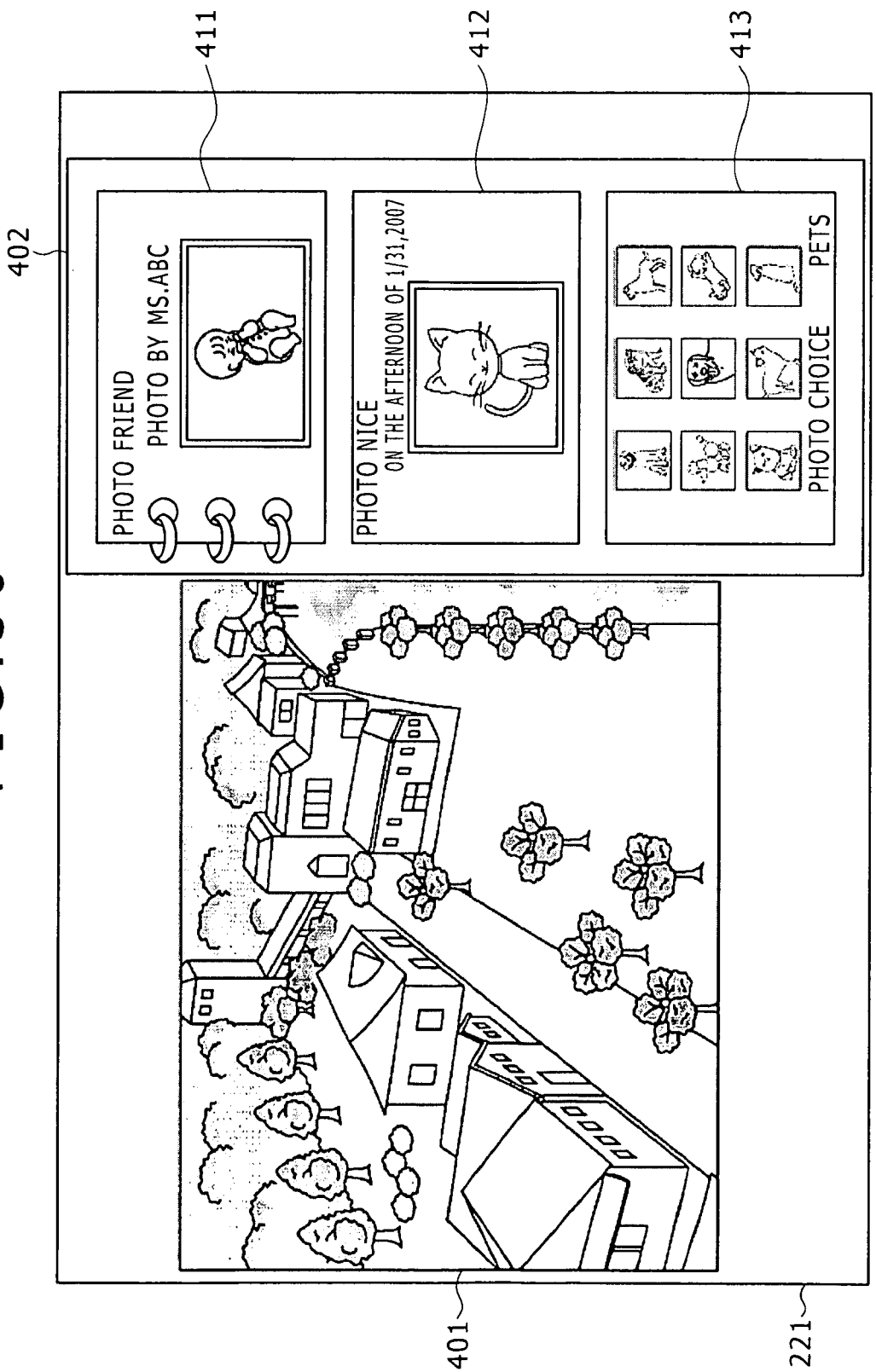
FIG. 30 is a view showing a typical screen displayed on the display panel.

The normal mode screen shown in FIG. 30 displays, in the application display area 402, the information to be provided by three registered applications 72-4, 72-5 and 72-6 named "PHOTO FRIEND," "PHOTO NICE" and "PHOTO CHOICE" respectively. The areas 411, 412 and 413 may be arranged to display the information from the applications 72-4, 72-5 and 72-6 in a suitable order, such as in the order in which the applications were registered or in the order in which they appear on the initial screen.

As described, the icon named "SERVICE CAST" is an icon that is operated to start the registered applications 72. This is a utility for starting a plurality of registered applications 72. Such an icon is also provided on the initial screen.

When the icon of the utility above is provided on the initial screen, the user can start up the registered applications all at once without having to search the list for the registered applications 72. Thus the user can acquire the information provided by the desired applications 72 by performing simple operations.

What follows is an explanation of the transitions and settings of the screens displayed by the applications 72-4 named "PHOTO FRIEND," the application 72-5 named "PHOTO NICE," and the application 72-6 named "PHOTO CHOICE" in normal mode as shown in FIG. 30.

"PHOTO FRIEND," "PHOTO NICE" and "PHOTO CHOICE" are each an application related to photos (still photos). These applications, each of which will be discussed later in more detail, are outlined as follows: "PHOTO FRIEND" is an application that allows friends who know a predetermined ID to share their photos; "PHOTO NICE" is an application that allows many users to view the photos chosen by them as nice photos from among the photos managed by a predetermined server (content server 13-1 in this case); and "PHOTO CHOICE" is an application that permits viewing of the suitably categorized photos from among the photos managed by the content server 13-1.

[Photo Friend]

The application 72-4 named "PHOTO FRIEND" will now be explained.

Figure 31:
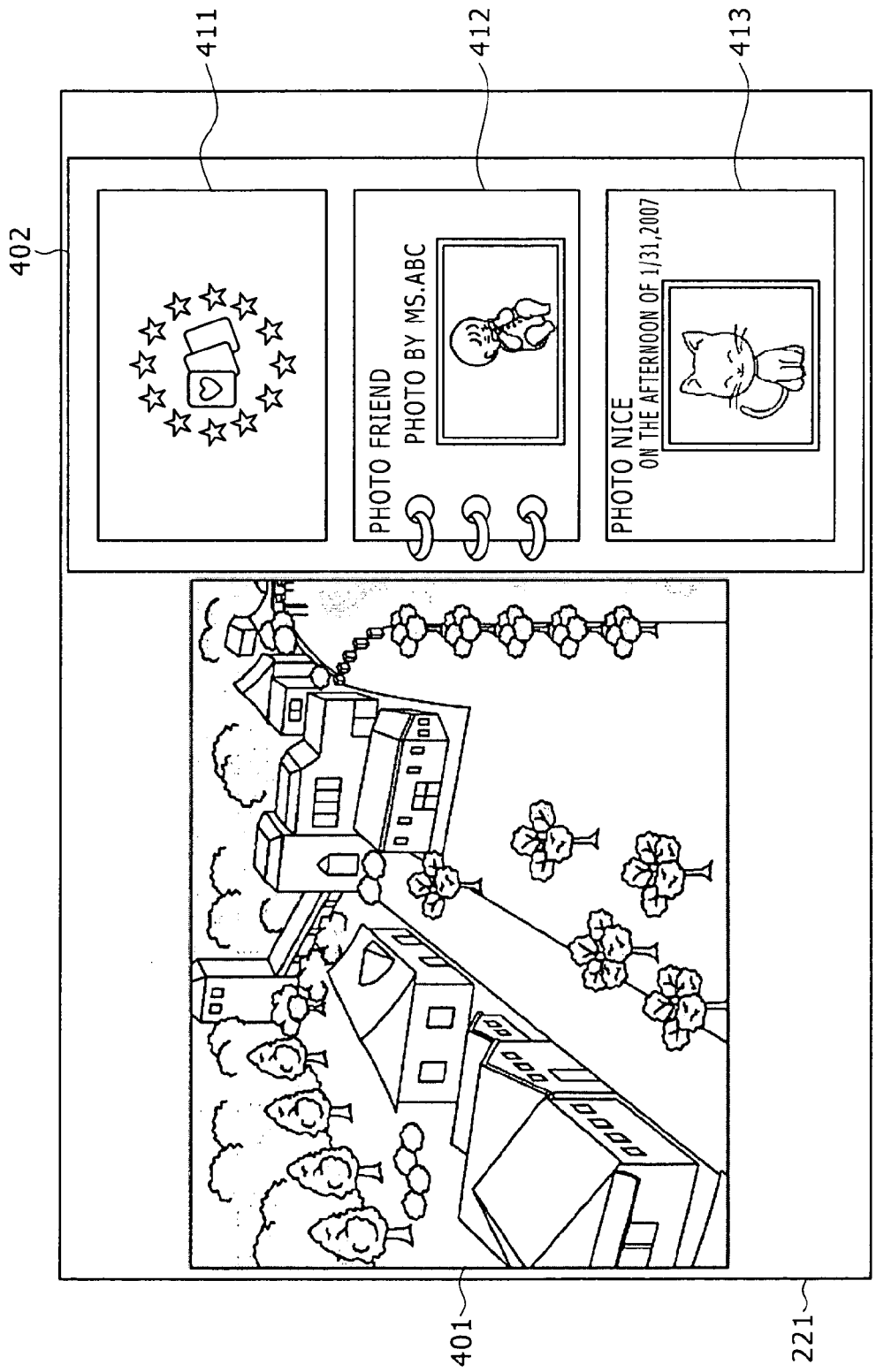
FIG. 31 is a view showing a typical screen displayed on the display panel.

When the normal mode screen shown in FIG. 30 is being displayed, i.e., when the area 412 in the middle of the application display area 402 is displaying the information provided by the application 72-5 named "PHOTO NICE," operation of the down direction button 271-2 of the remote controller 251 brings up a normal mode screen shown in FIG. 31. That is, in the area 412 positioned in the middle of the application display area 402, a normal mode screen on which is displayed the information provided by the application 72-4 named "PHOTO FRIEND" is brought up.

Below is an explanation of the normal mode screen shown in FIG. 30 or 31 with the name "PHOTO FRIEND." The screen named "PHOTO FRIEND" is a screen with its background imitating a page out of a paper-based album as shown in FIG. 31, the background displaying a photo. The photo is replaced by another photo at predetermined intervals. That is, the display is changed as if the pages of the album are turned (changed) one by one (photo by photo). In other words, photos are displayed on the screen named "PHOTO FRIEND" in slide show fashion.

Whereas photos are changed at predetermined intervals, the interval-related information is described illustratively in Java (registered trademark) Script included in the application 72-4. When photos are changed, the picture data is acquired from the content server 13 (content server 13-1 in this case) that manages the picture data. The picture data of the background is included in the application 72-4. When the normal mode screen is displayed, the background is displayed earlier than any photo. When the background is displayed first, the user is reminded of the transition effected to the normal mode screen. Also, while the absence of any display can make the user uneasy and prompt him or her to be worried about possible inadvertent operations having been committed, the background display initially appearing can have a reassuring effect on the user.

The picture data acquired from the content server 13-1 is identified by a predetermined ID. The predetermined ID is illustratively an ID that identifies the user 24 (FIG. 1). This ID is used by the user 24 when registering picture data with the content server 13-1. In other words, this ID is designed to let the user 24 register with the content server 13-1 the picture data of the photos that the user 24 took; the ID is used to authorize the user 24 to register the picture data.

The content server 13-1 is designed to identify a plurality of registered picture data using IDs. The picture data is given a tag when registered by the user. The tag designates the category of the photo. For example, a baby's photo is grouped under the category "BABIES" and is given a tag indicative of that category. The application 72-6 named "PHOTO CHOICE," to be discussed later, selects the photos by the tag.

Returning to the explanation of the screen named "PHOTO FRIEND" shown in FIG. 31, a white frame is illustratively displayed around the photo. The white frame thus provided can absorb various photo sizes (i.e., aspect ratios) that are expected to be adopted for the picture data managed by the content server 13. When a photo is to be displayed inside the screen named "PHOTO FRIEND," the photo based on the acquired picture data is processed and is given a white frame displayed in a manner matching the size of the processed photo.

On the screen named "PHOTO FRIEND" such as one shown in FIG. 31, a text saying "PHOTO BY MS. ABC" is displayed. In the displayed text, the part "ABC" is a nickname. The nicknames are managed by the content server 13-1 in relation to the above-mentioned IDs.

As discussed above, the screen named "PHOTO FRIEND" displays the photo of the picture data managed with a relevant ID. Before such display can take place, however, the ID needs to have been set. Without an ID having been established, it is impossible to acquire from the content server 13-1 the picture data that should be managed using that ID.

Figure 32:
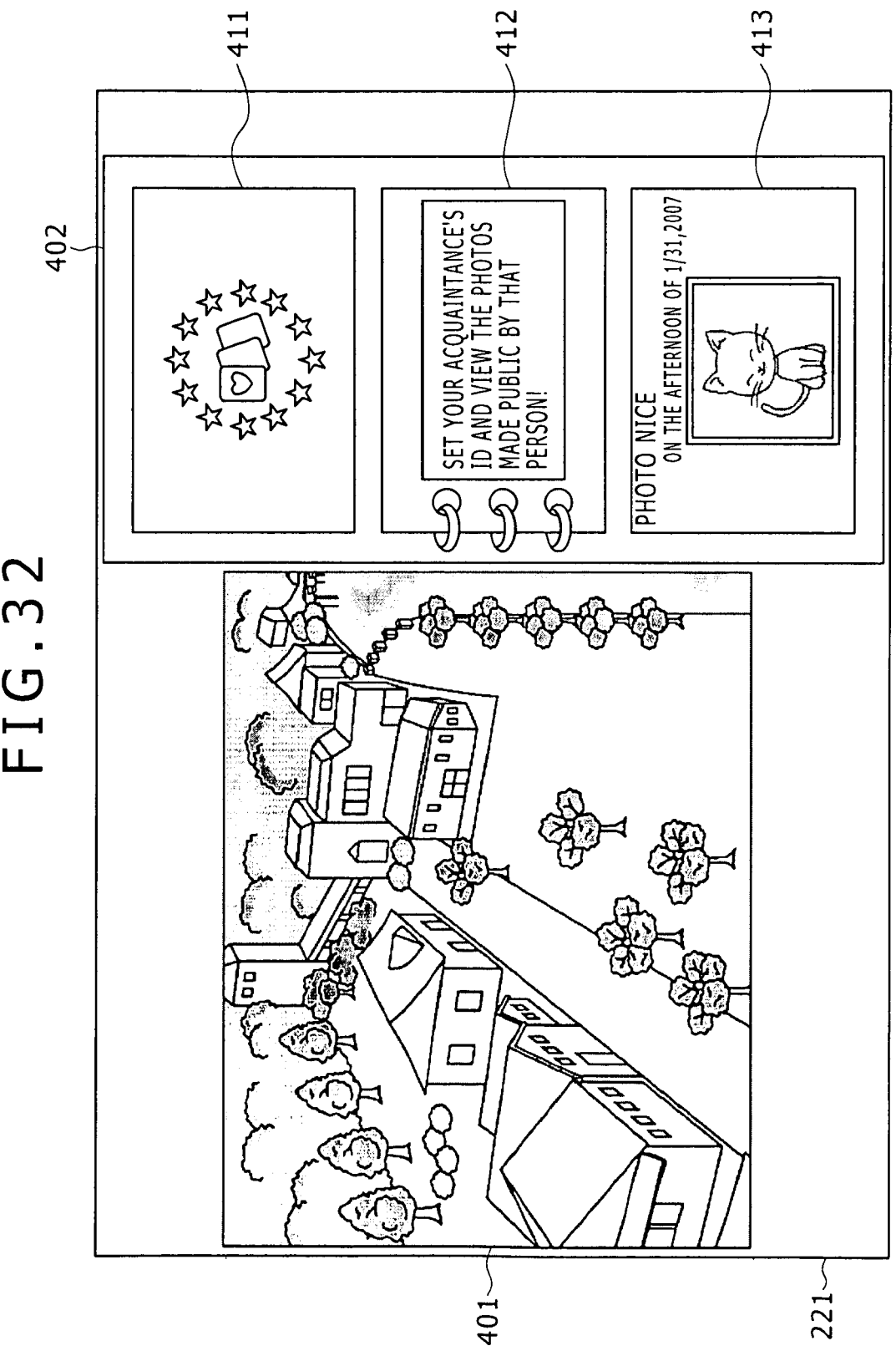
FIG. 32 is a view showing a typical screen displayed on the display panel.

If no ID is found to be set, then the screen shown in FIG. 32 appears in place of the screen named "PHOTO FRIEND" shown in FIG. 31. Referring to FIG. 32, the screen named "PHOTO FRIEND" displays a text that says "SET YOUR ACQUAINTANCE'S ID AND VIEW THE PHOTOS MADE PUBLIC BY THAT PERSON!" The display of the text allows the user to recognize that an ID has yet to be set and that because of the absence of an ID, no photo can be viewed even if the application 72-4 is started.

And the display of that text enables the user to recognize that the application 72-4 named "PHOTO FRIEND" is an application for viewing the photos made public by acquaintances.

After reading the text and realizing that an ID has yet to be set, the user may set the relevant ID. This can be done on the normal mode screen shown in FIG. 32 or in FIG. 31. The user operates the set button 273 of the remote controller 251 when making the settings of the application 72-4 named "PHOTO FRIEND."

Figure 33:
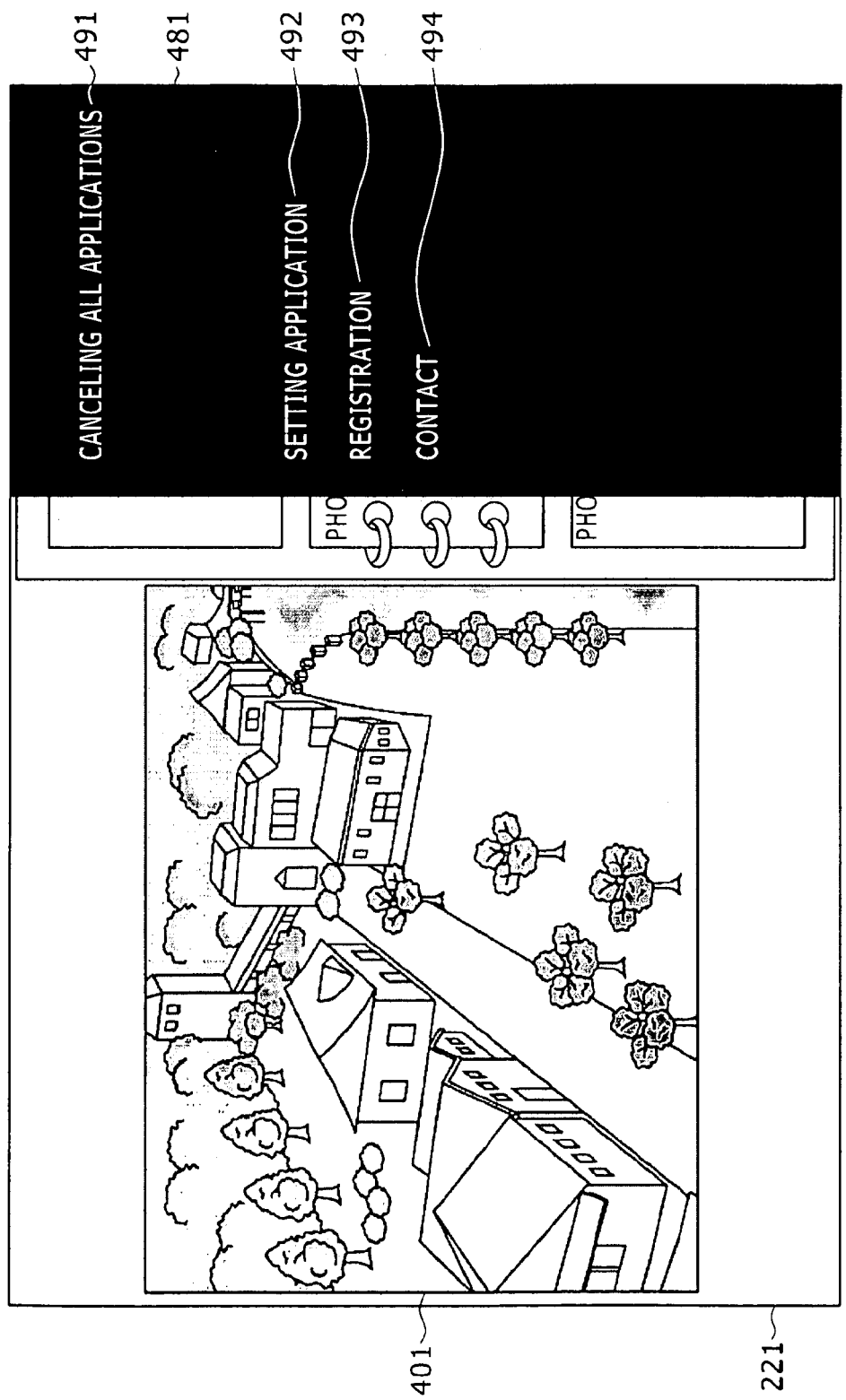
FIG. 33 is a view showing a typical screen displayed on the display panel.

When the set button 273 of the remote controller 251 is operated, an option menu in which to set an ID is displayed. FIG. 33 shows a typical option menu screen corresponding to the application 72-4 named "PHOTO FRIEND." The option menu screen 481 appears superposed similarly on the normal mode screen (e.g., FIG. 31), on a focus mode screen to be discussed later (e.g., FIG. 36), or on an active mode screen (e.g., FIG. 37) when the set button 273 of the remote controller 251 is operated.

However, the application 72-4 named "PHOTO FRIEND" is controlled not to effect transition to focus mode or to active mode unless an ID is set. It follows that when focus mode or active mode is in effect, the ID has already been set. In this case, the already set ID may be changed.

The option menu screen 481 displays the same items as those of the option menu screen 481 (FIG. 21) displayed when the above-described application 72-2 named "FORTUNE-TELLING" is in active mode. The example shown in FIG. 33 is different from the example of FIG. 21 in that the option menu screen 481 appears superposed on the normal mode screen of the photo friend application 72-4.

Figure 34:
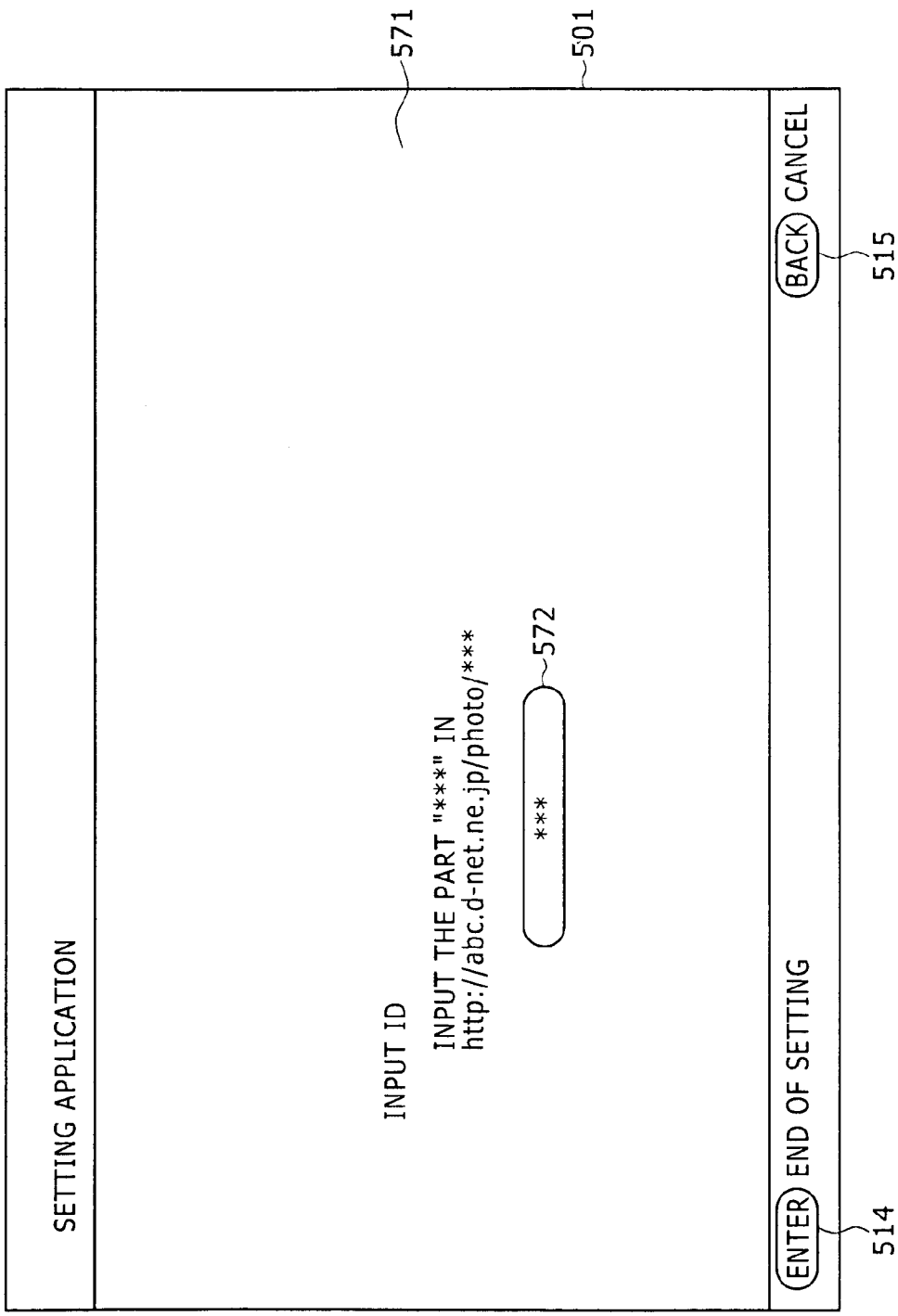
FIG. 34 is a view showing a typical screen displayed on the display panel.

The screen shown in FIG. 34 is brought up when the button 492 of the item "SETTING APPLICATION" is selected from among the items displayed on the option menu screen 481.

The setting screen shown in FIG. 34 will now be explained. The setting screen 501 shown in FIG. 34 is a screen for making the settings of the application 72-4 named "PHOTO FRIEND." The photo friend-related setting screen 501 has an area 571 which shows a text prompting the user to recognize what kind of ID needs to be input, and an area 572 displaying the already set ID.

The area 571 shows a text saying "INPUT ID" and a text saying "INPUT THE PART "*" IN http://abc.d-net.ne.jp/photo/*." From these texts, the user can recognize that characters corresponding to the part "*" need only be input. The address "http://abc.d-net.ne.jp/photo/*" is an address at which the content server 13-1 manages the picture data of the photo.

The user 24 registering a photo with the content server 13-1 using an ID is assumed to have made a contract beforehand for the registration of photos with the content provider 23 managing the content server 13-1 or with the application provider 22 managing the content server 13-1. Thus there exists an ID agreed on when the contract was made. This ID is input to the setting screen shown in FIG. 34.

In the area 572 of the setting screen shown in FIG. 34, the already set ID, if there is one, appears instead of the part "***".

Figure 35:
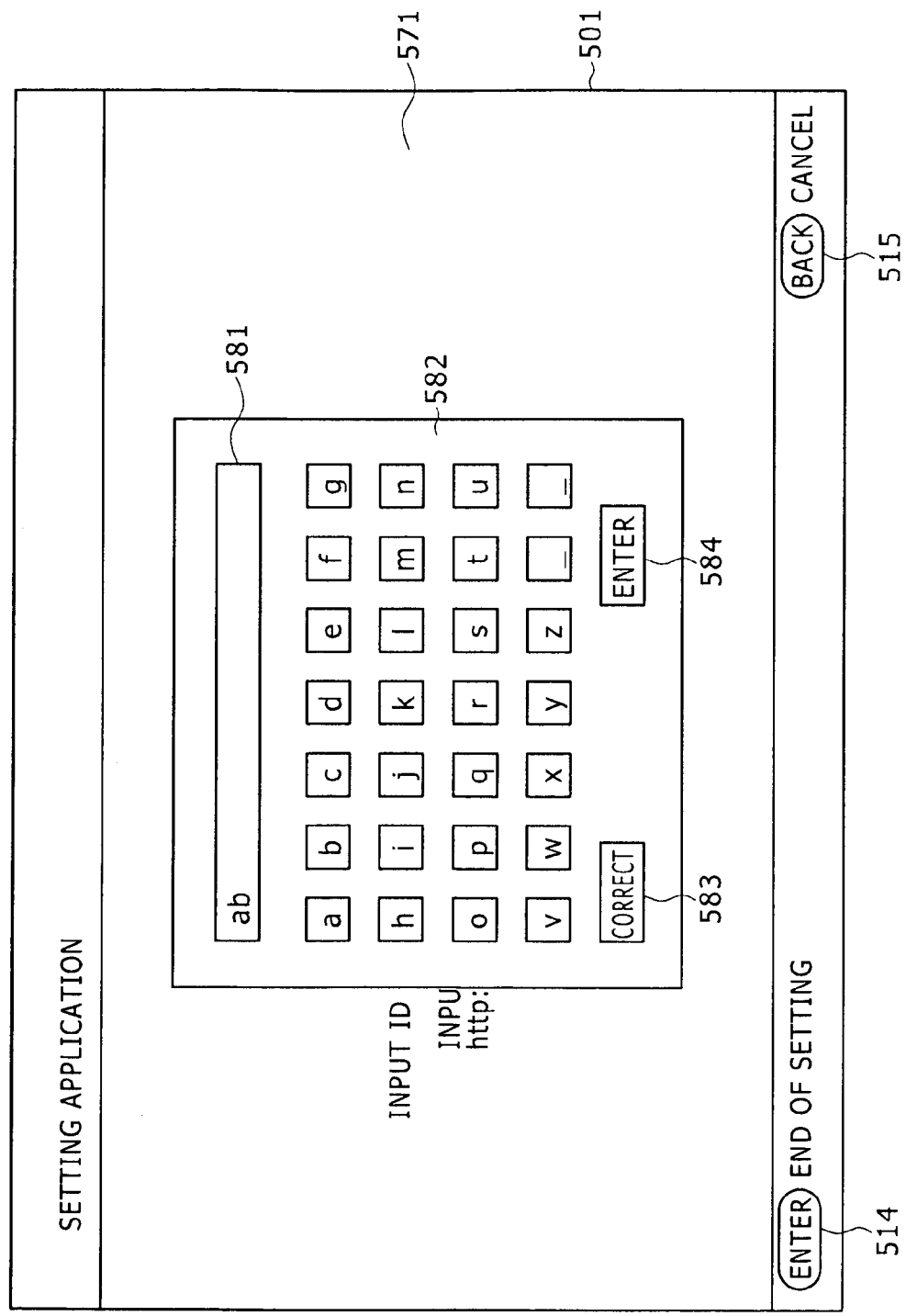
FIG. 35 is a view showing a typical screen displayed on the display panel.

While the setting screen shown in FIG. 34 is being displayed, operating the enter button 272 of the remote controller 251 displays a screen typically called a soft keyboard for supporting the input of characters as shown in FIG. 35. Illustratively, the character input screen shown in FIG. 35 displays an area 581 for displaying input characters, an area 582 indicating a table of buttons indicative of the characters that may be input, a button 583 called "CORRECT" operated to correct the input characters, and a button 584 called "ENTER" operated to finalize the input characters (ID).

The character buttons displayed in the area 582 represent lowercase alphabetic characters in the example of FIG. 35. Movements between the buttons for character selection are effected by operation of the up direction button 271-1, down direction button 271-2, left direction button 271-3, and right direction button 271-4 of the remote controller 251. A selected character is input by operating the enter button 272 of the remote controller 251.

When such operations of the remote controller 251 are repeated, the characters making up the ID are input to the area 581. When all characters constituting the ID have been input, the button 584 named "ENTER" is operated. Operating the button 584 brings back the screen shown in FIG. 34. And the area 572 is then seen displaying the set ID.

Such ID input is considered to be simpler than the input operation involving the keyboard of a personal computer. And since the types of characters making up the ID are limited to alphanumeric characters, the search for necessary characters on the screen shown in FIG. 35 is not considered difficult, nor are the operations of the remote controller 251 for inputting the selected characters considered complicated. Furthermore, because the number of characters making up an ID is not very large, the ID may be input by simply performing several button operations on the remote controller 251.

Because the ID can be input simply as described, diverse people from the elderly to children can set the ID to enjoy viewing the photos processed by the application 72-4.

For example, if a user A has told parents A his or her ID, then not only the user A but also the parents A can, through the simple setting of the ID described above, view the photo registered by the user A. In such a case, if the user A has registered a photo of his or her child (i.e., grandchild of the parents A), then the parents A can readily view their grandchild's photo any time they want. Furthermore, the photo can be viewed when a television broadcast is being watched on the television receiver 14. The parents A can enjoy their lovely grandchild's photo while watching their favorite television broadcast program. Furthermore, as explained above, the photo displayed on the normal mode screen can be changed one after another, so that the parents can enjoy various photos of their grandchild with various expressions.

In this manner, photos can be shared merely through simple settings (i.e., setting of an ID, in this case).

The photo displayed on the normal mode screen is enlarged upon transition to the active mode screen, as will be discussed later. This makes it possible, when a favorite photo is being displayed, simply to view the photo in enlarged form.

The items displayed on the setting screen 501 corresponding to the application 72-2 named "FORTUNE-TELLING" shown in FIG. 22 are different from the items displayed on the setting screen 501 corresponding to the application 72-4 named "PHOTO FRIEND" shown in FIG. 34. These items are specific to the respective applications 72. In this manner, the items displayed on the setting screen 501 are dependent on the application 72.

The items set on the setting screen 501 are stored in the television receiver 14 side. And if the application 72-4 of "PHOTO FRIEND" is being activated, the ID set in the television receiver 14 is referenced, and the picture data (content data 131) corresponding to the photo belonging to the ID is acquired from the content server 13-1 and displayed.

Here, the focus mode screen named "PHOTO FRIEND" and the active mode screen will be explained further.

Figure 36:
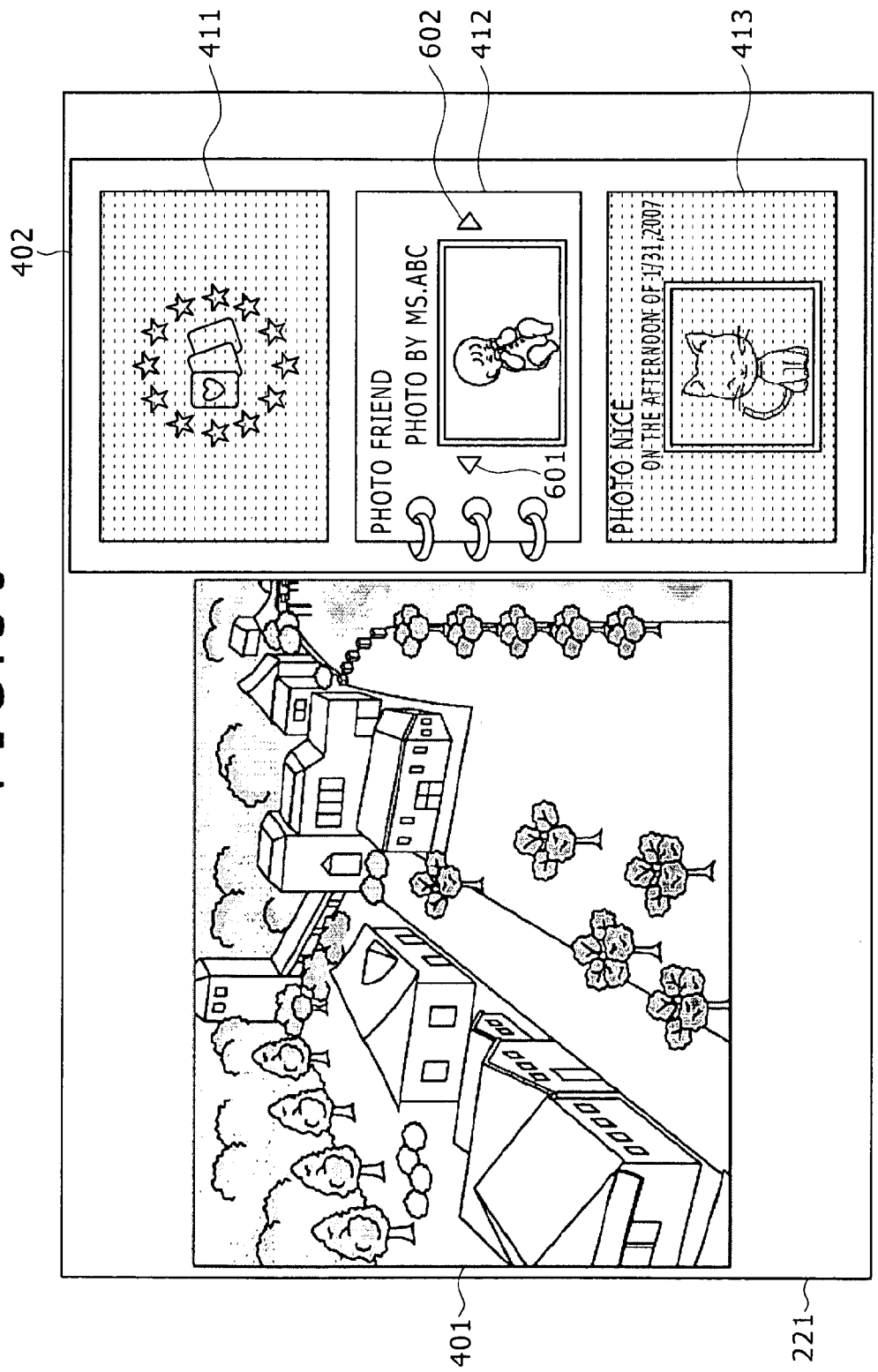
FIG. 36 is a view showing a typical screen displayed on the display panel.

When the normal mode screen such as one shown in FIG. 31 is in effect, operating the enter button 272 of the remote controller 251 brings up the focus mode screen such as one shown in FIG. 36.

Where the normal mode screen such as one shown in FIG. 32 is in effect, i.e., where no ID is being set, operating the enter button 272 of the remote controller 251 does not effect transition to focus mode; no focus mode screen is brought up.

FIG. 36 shows a typical focus mode screen in effect when the application 72-4 named "PHOTO FRIEND" is focused. In the application display area 402, only the area 412 in which the photo from the process performed by the application 72-4 is displayed appears brighter than the other areas. In such focus mode, the registered applications 72 and the selected application 72 operate in parallel whether they are displayed or not in the application display area 402.

As buttons based on the application 72-4 named "PHOTO FRIEND," the example shown in FIG. 32 displays a button 601 operated to display the photo updated one interval earlier and a button 602 operated to display the photo updated one interval later.

Operation of the left direction button 271-3 of the remote controller 251 corresponds to operating the button 601, and operation of the right direction button 271-4 corresponds to operating the button 602. The user can view desired photos by operating the left direction button 271-3 or the right direction button 271-4.

In focus mode, the frame shown white around the photo in normal mode may be changed to another color such as yellow. The changed display enables the user to recognize more clearly that focus mode is in effect and provides more beautiful display.

In focus mode shown in FIG. 36, operating the enter button 272 of the remote controller 251 effects transition to active mode and changes screens. Active mode is a mode in which only the information provided by one application 72-4 is displayed as explained above. In the application display area 402, an active screen 621 indicating only the information provided by the application 72-4 named "PHOTO FRIEND" is displayed as shown in FIG. 37.

When active mode is selected, the activated application 72-4 accesses the content server 13-1 to acquire the content data 131 about the photo friend. When the process based on the acquired content data 131 is carried out, a photo is displayed in the form of the active screen 621.

Figure 37:
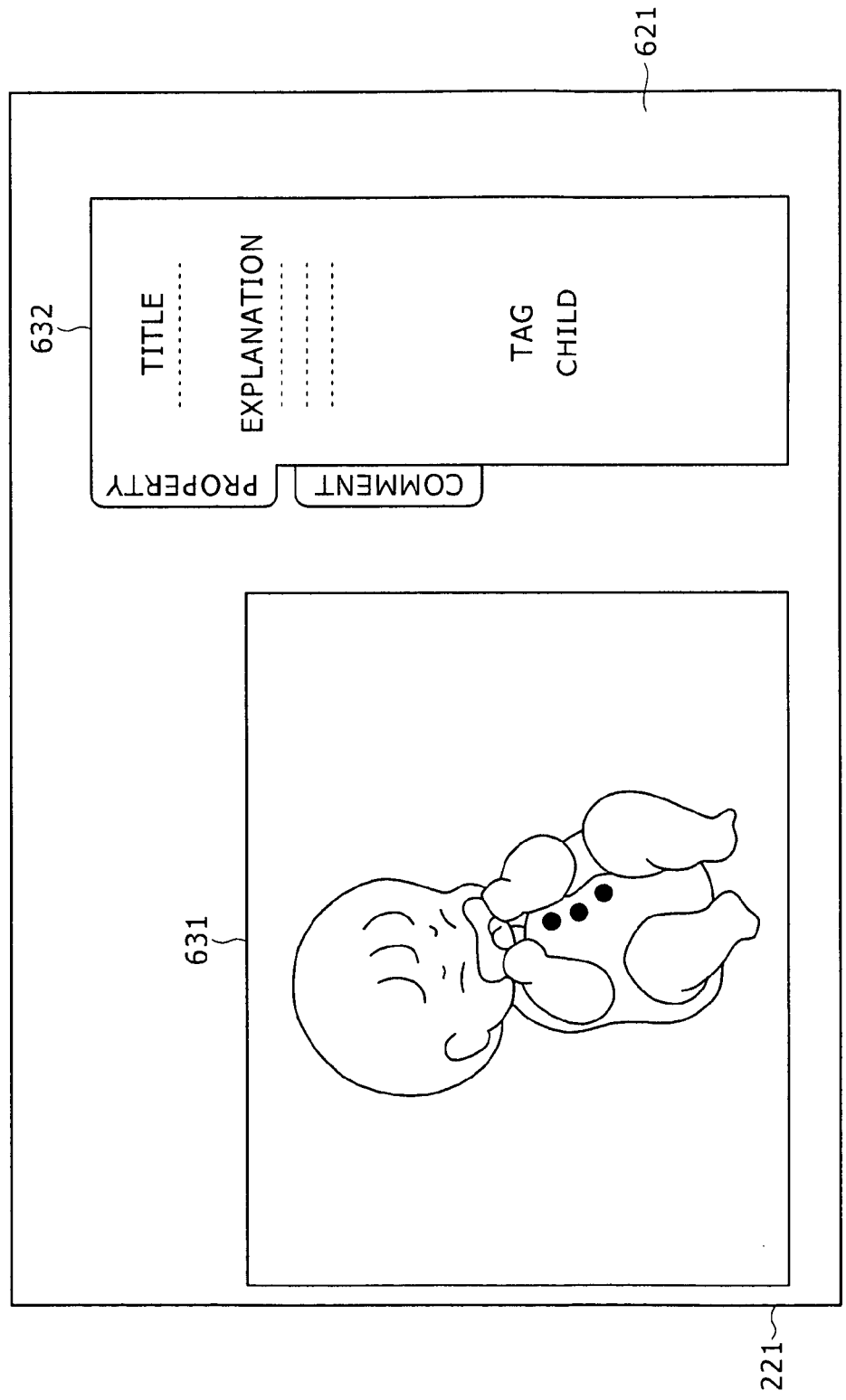
FIG. 37 is a view showing a typical screen displayed on the display panel.

The active screen 621 shown in FIG. 37 has an area 631 for displaying an enlarged photo and an area 632 for displaying information about the photo. The photo displayed in the area 631 is the same as that displayed in focus mode prior to the transition to active mode. The area 632 displays the title of the photo being displayed, an explanation of the photo, and tag-related information. And the area 632 is arranged to let the tabs be changed so that illustratively a comment on this photo by another user may be displayed.

That active screen 621 may be displayed only inside the application display area 402 or over the entire screen of the display panel 221.

When the active screen 621 is displayed only inside the application display area 402, the screen is structured substantially the same as when the application 72-2 named "FORTUNE-TELLING" is put in active mode. Illustratively, the screen is structured as shown in FIG. 20, in such a manner that the active screen is displayed together with the television broadcast screen. On the other hand, if the active screen 621 is displayed all over the display panel 221, the television broadcast screen does not appear.

Meanwhile, the application 72-4 named "PHOTO FRIEND" accesses the content server 13-1 and acquires the picture data of the photo therefrom. The pictures registered with the content server 13-1 may also be viewed from the personal computer. When the personal computer is to acquire picture data by accessing the content server 13-1, an application typically called a Web browser is utilized. The television receiver 14 may incorporate a Web browser that may be activated when transition is effected to active mode as a process of the application 72-4, whereby the active screen 621 shown in FIG. 37 may be displayed.

That is, when transition is effected to active mode, the Web browser may be activated. Control may then be passed from the process performed by the application 72-4 to the process of the activated Web browser, whereby the active screen 621 may be displayed on the display panel 221. In this manner, it is possible to change from the mode in which to view television broadcasts to the mode in which to view photos or the like using the Web browser without the user becoming aware of the change.

The television receiver 14 side can change from the state in which the information about television broadcast programs is received from broadcast waves, to the state in which to acquire particular information through communication over the network 11 (FIG. 1), without causing the user to become aware of the change. That is, the mode of communication can be changed without the user becoming aware of it.

The act of viewing television broadcast programs is extremely widespread. The communication through the use of the Web browser is conducted generally using the personal computer that gains access to relevant servers to browse Web pages. However, such browsing is not as widespread as the act of viewing television broadcast programs. In other words, there exist users who view television broadcast programs but who may not (very often) browse information using the personal computer.

As discussed above, when a series of operations starting from the viewing of a television broadcast program results in the transition to the browsing of information by the Web browser, it is possible for those users who are not familiar with the browsing of information by the Web browser to receive the information provided by the Web browser. And this can provide a chance to acquire information using the Web browser, i.e., a chance in this case to view the photos managed by the content server 13-1 through the use of the personal computer.

Furthermore, it is possible for the content provider 23 or the application provider 22 managing the content server 13-1 that manages the photos, to advertise that the photos can be viewed using the personal computer and to solicit people to sign a contract to take advantage of the viewing.

As described, the application 72-4 named "PHOTO FRIEND" also provides normal mode, focus mode, and active mode. The user can easily acquire information while enjoying a television broadcast program in a desired mode.

[Photo Nice]

The application 72-5 named "PHOTO NICE" will now be explained.

On the normal mode screen such as one shown in FIG. 30, the area 412 in the middle of the application display area 402 displays information from the application 72-5 named "PHOTO NICE." The screen of the application 72-5 named "PHOTO NICE" in normal mode is explained below.

The screen named "PHOTO NICE," like the above-described screen named "PHOTO FRIEND," may be divided into the background and the photo. The picture data of the background is included in the application 72-5. When the normal mode screen is displayed, the background is displayed earlier than any photo.

The photo is replaced by another photo at predetermined intervals. In other words, the photo is displayed on the screen named "PHOTO NICE" in slide show fashion just like the photo displayed on the screen named "PHOTO FRIEND."

Whereas photos are changed at predetermined intervals, the interval-related information is described illustratively in Java (registered trademark) Script included in the application 72-5. When photos are changed, the picture data is acquired from the content server 13 (content server 13-1 in this case) that manages the picture data.

The picture data acquired from the content server 13-1 is that of the photos evaluated as "nice" by a plurality of users having viewed multiple photos registered with the content server 13-1. The photos registered with the content server 13-1 are allowed to be viewed by a plurality of users provided the users who registered the photos authorize the viewing. And the users who have viewed photos are allowed to evaluate these photos.

The application 72-5 named "PHOTO NICE" illustratively acquires from the content server 13-1 the picture data of the photos of which the total sum of "nice" evaluations is large. These photos with their total sum of "nice" evaluations being large are displayed in slide show fashion on the screen named "PHOTO NICE."

It has been shown above that the application 72-5 named "PHOTO NICE" acquires and displays the picture data of the photos of which the total sum of "nice" evaluations is large. Alternatively, newly arrived photos may be displayed in a slide show manner. The slide show display of the newly arrived photos can also be processed basically by the application 72-5 named "PHOTO NICE."

However, the newly arrived photos are merely characterized to have been registered recently with the content server 13-1; these photos have not been checked by any other filtering criteria. Thus some photos not suitable for being made public could have been registered and be displayed in slide show fashion.

On the other hand, the photos of which the total sum of "nice" evaluations is large have been viewed and evaluated as "nice" by a plurality of users. Therefore the possibility that these photos are not suitable for being made public is very low. That is, the photos with their total sum of "nice" evaluations being large are selected pictures having undergone the filtering of viewing by the multiple users. Thus there will be little problem with disclosing such photos and having them displayed in slide show fashion.

In this manner, it is possible to filter the information (photos in this case) offered to the user 24 side of the television receiver 14 and thereby provide secure information to the user side as in the case of the application 72. And there is no need for the service provider 21 (FIG. 2) to manage the information to be offered, which reduces the processing load for the service provider 21.

Returning to the explanation of the screen named "PHOTO NICE" shown in FIG. 30, a white frame is illustratively displayed around the photo. This white frame can absorb various photo sizes (i.e., aspect ratios) that are expected to be adopted for the photos.

Also, the screen named "PHOTO NICE" illustratively displays a text such as "ON THE AFTERNOON OF Jan. 30, 2007" as shown in the example of FIG. 30. The displayed text illustratively refers to the date on which the photo was registered or the title of the photo.

Figure 38:
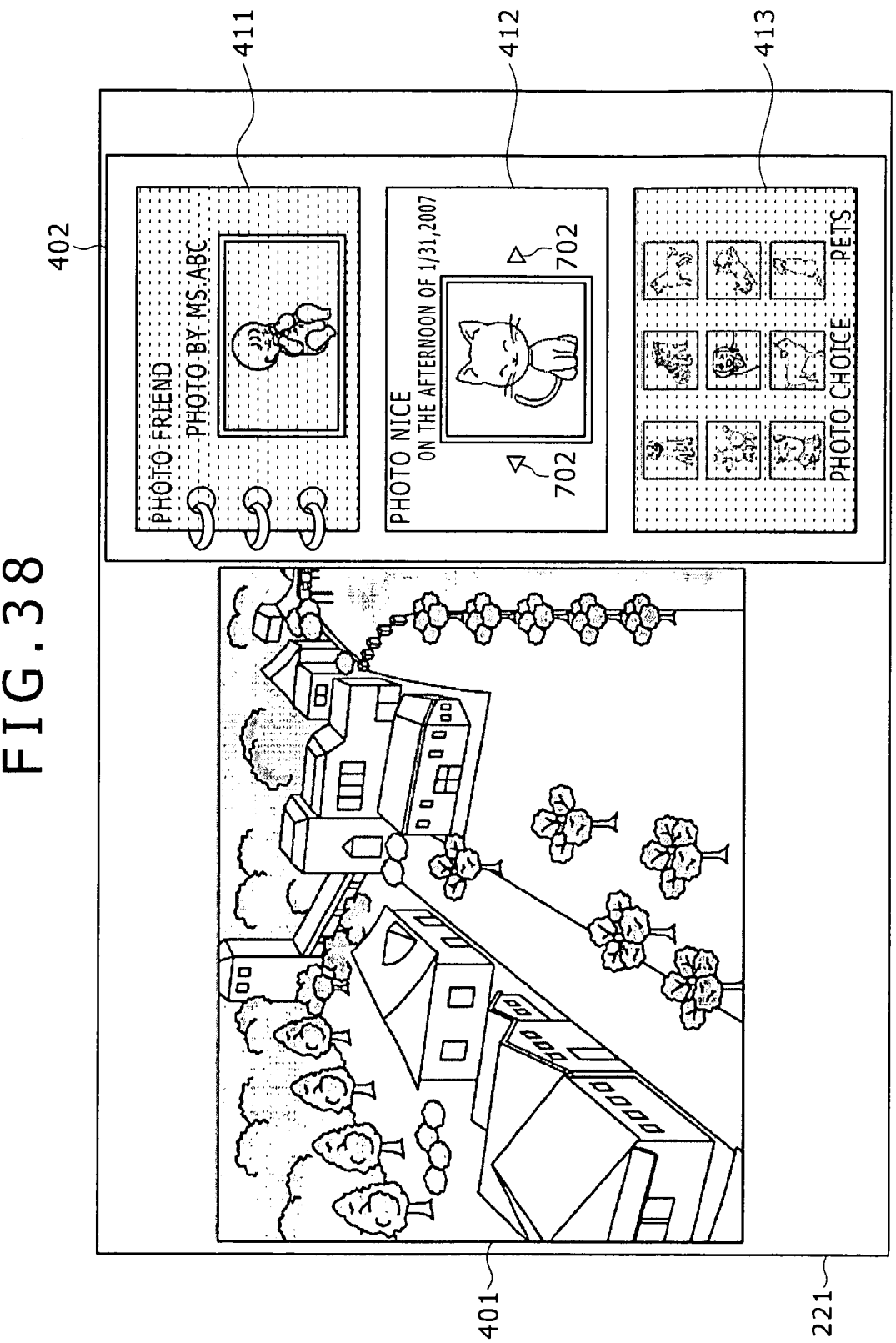
FIG. 38 is a view showing a typical screen displayed on the display panel.

When the normal mode screen such as one shown in FIG. 30 is in effect, i.e., when the information from the application 72-5 named "PHOTO NICE" is displayed in the area 412 in the middle of the application display area 402, operating the enter button 272 of the remote controller 251 effects transition to the focus mode screen such as one shown in FIG. 38.

FIG. 38 gives a typical focus mode screen in effect when the application 72-5 named "PHOTO NICE" is focused. In the application display area 402, only the area 412 in which the photo nice from the process by the application 72-5 is displayed appears brighter than the other areas.

As buttons based on the application 72-5 named "PHOTO NICE," the example shown in FIG. 38 displays a button 701 operated to display the photo updated one interval earlier and a button 702 operated to display the photo updated one interval later.

Operation of the left direction button 271-3 of the remote controller 251 corresponds to operating the button 701, and operation of the right direction button 271-4 corresponds to operating the button 702. The user can view desired photos by operating the left direction button 271-3 or the right direction button 271-4.

In focus mode, the frame shown white around the photo in normal mode may be changed to another color such as yellow. The changed display enables the user to recognize more clearly that focus mode is in effect and provides more beautiful display.

In focus mode shown in FIG. 38, operating the enter button 272 of the remote controller 251 effects transition of active mode and changes screens. Active mode is a mode in which only the information provided by one application 72-5 is displayed as explained above. In the application display area 402, an active screen 621 indicating only the information provided by the application 72-4 named "PHOTO NICE" is displayed as shown in FIG. 37.

When active mode is selected, the activated application 72-5 accesses the content server 13-1 to acquire the content data 131 about the photo nice. When the process based on the acquired content data 131 is carried out, a photo is displayed in the form of the active screen 621.

The active screen 621 shown in FIG. 37 was explained earlier and thus will not be discussed further in detail. The application 72-5 named "PHOTO NICE," as with the application 72-4 named "PHOTO FRIEND," effects transition to the screen displaying an enlarged photo when placed in active mode. At this point, the Web browser is (or may be) started.

As described, normal mode, focus mode, and active mode are provided. The user can acquire information easily in a desired mode while enjoying a television broadcast program.

[Photo Choice]

The application 72-6 named "PHOTO CHOICE" will now be explained.

When the normal mode screen such as one shown in FIG. 30 is in effect, i.e., when the information from the application 72-5 named "PHOTO NICE" is displayed in the area 412 in the middle of the application display area 402, operating the up direction button 271-1 of the remote controller 251 brings up the normal mode screen such as one shown in FIG. 30. That is, transition is effected to the normal mode screen on which the information from the application 72-6 named "PHOTO CHOICE" is displayed in the area 412 in the middle of the application display area 402.

Figure 39:
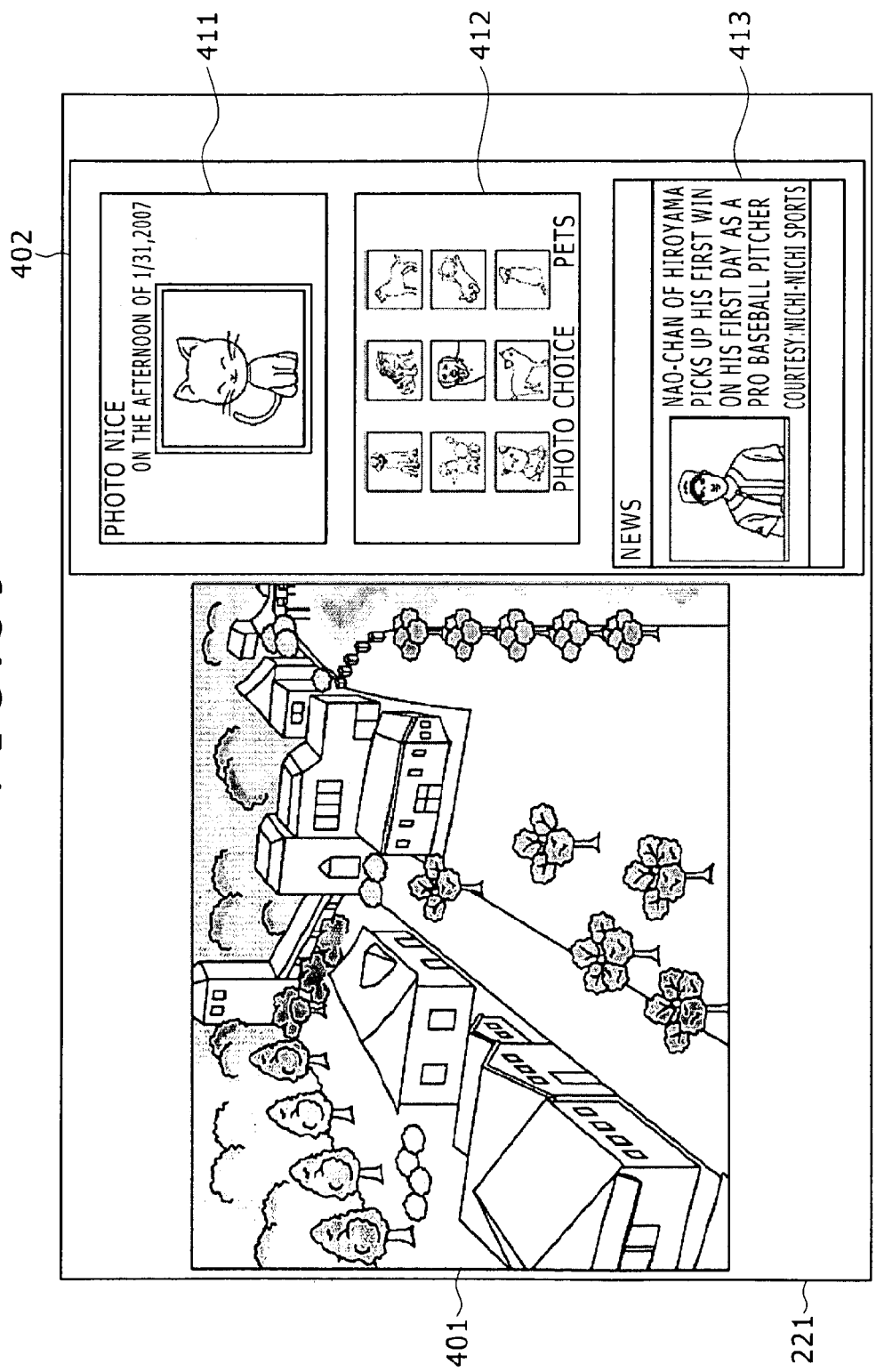
FIG. 39 is a view showing a typical screen displayed on the display panel.

The screen of "PHOTO CHOICE" on the normal mode screen shown in FIG. 30 or FIG. 39 will now be explained. The screen named "PHOTO CHOICE" illustratively displays a plurality of photos (nine photos in the example of FIG. 39) as shown in FIG. 39. These photos are changed by other photos at predetermined intervals. In other words, the photos appearing inside the screen named "PHOTO CHOICE" are displayed in slide show fashion. The multiple photos may be updated either all at once, or one after another starting from the top left photo down to the bottom right photo.

Whereas photos are changed at predetermined intervals, the interval-related information is described illustratively in Java (registered trademark) Script included in the application 72-6. When photos are changed, the picture data is acquired from the content server 13 (content server 13-1 in this case) that manages the picture data.

The picture data acquired from the content server 13-1 is identified by a predetermined tag. A given tag illustratively constitutes information about a category to which the photos belong. When registering a photo with the content server 13-1, the user determines which category the photo belongs to and sets tag information accordingly. For example, if the photo to be registered shows a dog, that photo is classified under the category of "PETS" according to the user's judgment and is assigned the tag indicative of the category in question.

The tag-related information is also displayed within the screen named "PHOTO CHOICE." For example, on the screen named "PHOTO CHOICE" shown in FIG. 39, characters "PETS" are indicated in the bottom right corner. That is, in the example shown in FIG. 39, a plurality of photos displayed on the screen named "PHOTO CHOICE" are applicable to the tag "PETS."

As described above, the screen named "PHOTO CHOICE" displays the photos based on the picture data managed by applicable tags. The user can determine the tag to which the photos to be displayed on the screen named "PHOTO CHOICE" apply.

The user operates the set button 273 of the remote controller 251 when making the settings of the application 72-6 named "PHOTO CHOICE." Operating the set button 273 of the remote controller 251 displays an option menu in which the tag applicable to the photos to be displayed may be set.

Figure 40:
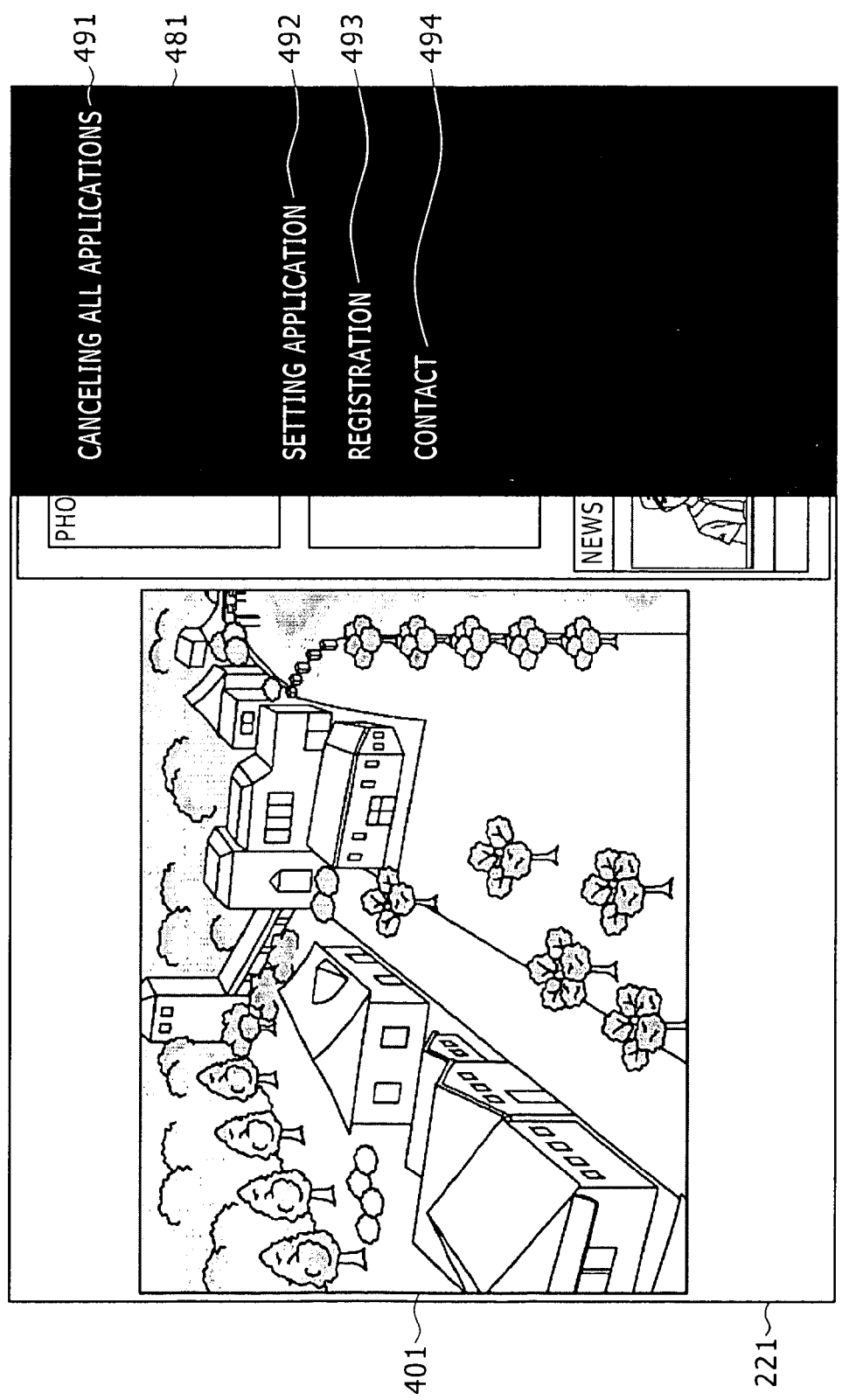
FIG. 40 is a view showing a typical screen displayed on the display panel.

FIG. 40 shows a typical option menu screen corresponding to the application 72-4 named "PHOTO CHOICE." The option menu screen 481 appears superposed similarly on the normal mode screen (e.g., FIG. 39), on a focus mode screen to be discussed later (e.g., FIG. 42), or on the active mode screen (e.g., FIG. 37) when the set button 274 of the remote controller 251 is operated.

The option menu screen 481 displays the same items as those of the option menu screen 481 (FIG. 21) displayed when the above-described application 72-2 named "FORTUNE-TELLING" is in active mode. The example shown in FIG. 40 is different from the example in FIG. 21 in that the option menu screen 481 is displayed on the normal mode screen of the photo choice application 72-6.

Figure 41:
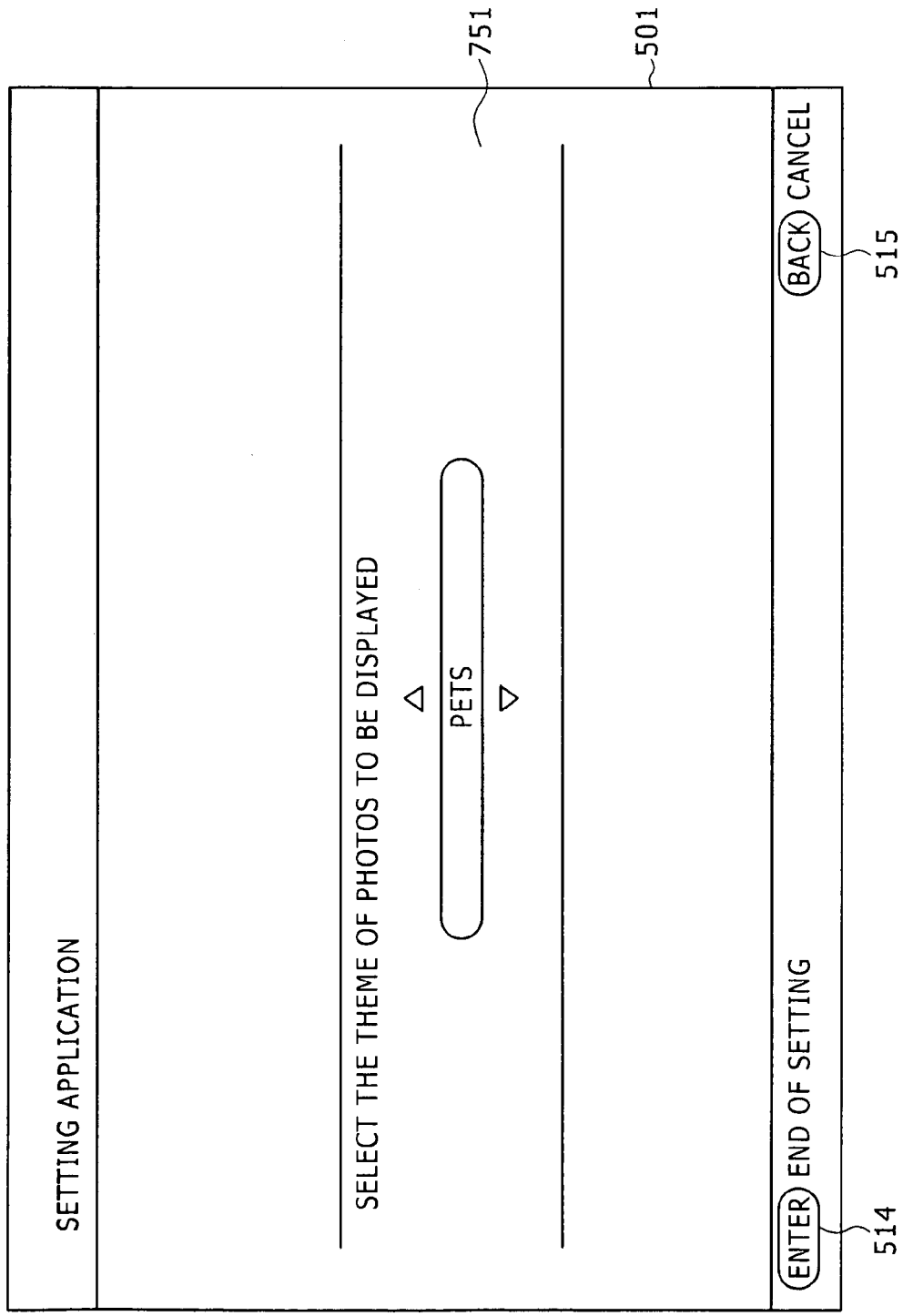
FIG. 41 is a view showing a typical screen displayed on the display panel.

A transition is effected to the screen shown in FIG. 41 when the button 492 corresponding to the item "SETTING APPLICATION" is operated from among the items displayed on the option menu screen 481.

The setting screen shown in FIG. 41 will now be explained. The setting screen 501 shown in FIG. 41 is a screen for making the settings of the application 72-6 named "PHOTO CHOICE." The setting screen 501 regarding the photo choice is a screen on which to set the tag applicable to the photos to be displayed through the process performed by the application 72-6 of "PHOTO CHOICE."

The setting screen 501 has an area 751 where tags can be selected. The area 751 displays a text such as "SELECT THE THEME OF PHOTOS TO BE DISPLAYED" indicating that this is a screen on which to set the tag of the photos to be displayed on the photo choice screen. Also, in the example shown in FIG. 41, the area 751 is arranged to have a field that allows one tag to be selected.

The user can select the desired tag by operating the up direction button 271-1 or down direction button 721-2 of the remote controller 251. Illustratively, in the example shown in FIG. 41, the area 721 displays the tag "PETS" (a name indicative of a category). In such a state, operating the up direction button 271-1 of the remote controller 251 displays the tag virtually furnished next to the tag "PETS."

The tags illustratively include "PETS," "TRAVEL," "NIGHT VIEWS," and "ART." These tags are displayed one after another in the area 751 when the buttons of the remote controller 251 are successively operated. When the tag currently displayed in the area 751 is desired to be set, a button 514 named "ENTER" is operated. Operating the button 514 displays the photos applicable to the set tag inside the screen named "PHOTO CHOICE."

Whereas the setting screen 501 shown in FIG. 41 gives an example in which a single tag is selected and set, a plurality of tags may alternatively be presented as shown in the field 513 of FIG. 22 for selecting favorite foods. The presented tags may be furnished with check boxes, a plurality of which may be checked to select multiple tags.

Whereas the user can set a tag on the setting screen 510, the application 72-6 named "PHOTO CHOICE" may be started while no tag has yet to be set by the user (i.e., with no setting on the screen). In that case, the photos applicable to the tag set by default are displayed within the screen named "PHOTO CHOICE."

The items set on the setting screen 501 are stored in the television receiver 14 side. And if the application 72-6 of "PHOTO CHOICE" is being active, the tag set in the television receiver 14 is referenced, and the picture data (content data 131) corresponding to the pictures applicable to the tag is acquired from the content server 13-1 and displayed.

A focus mode screen and an active mode screen with regard to the screen named "PHOTO CHOICE" will be further explained hereunder.

Figure 42:
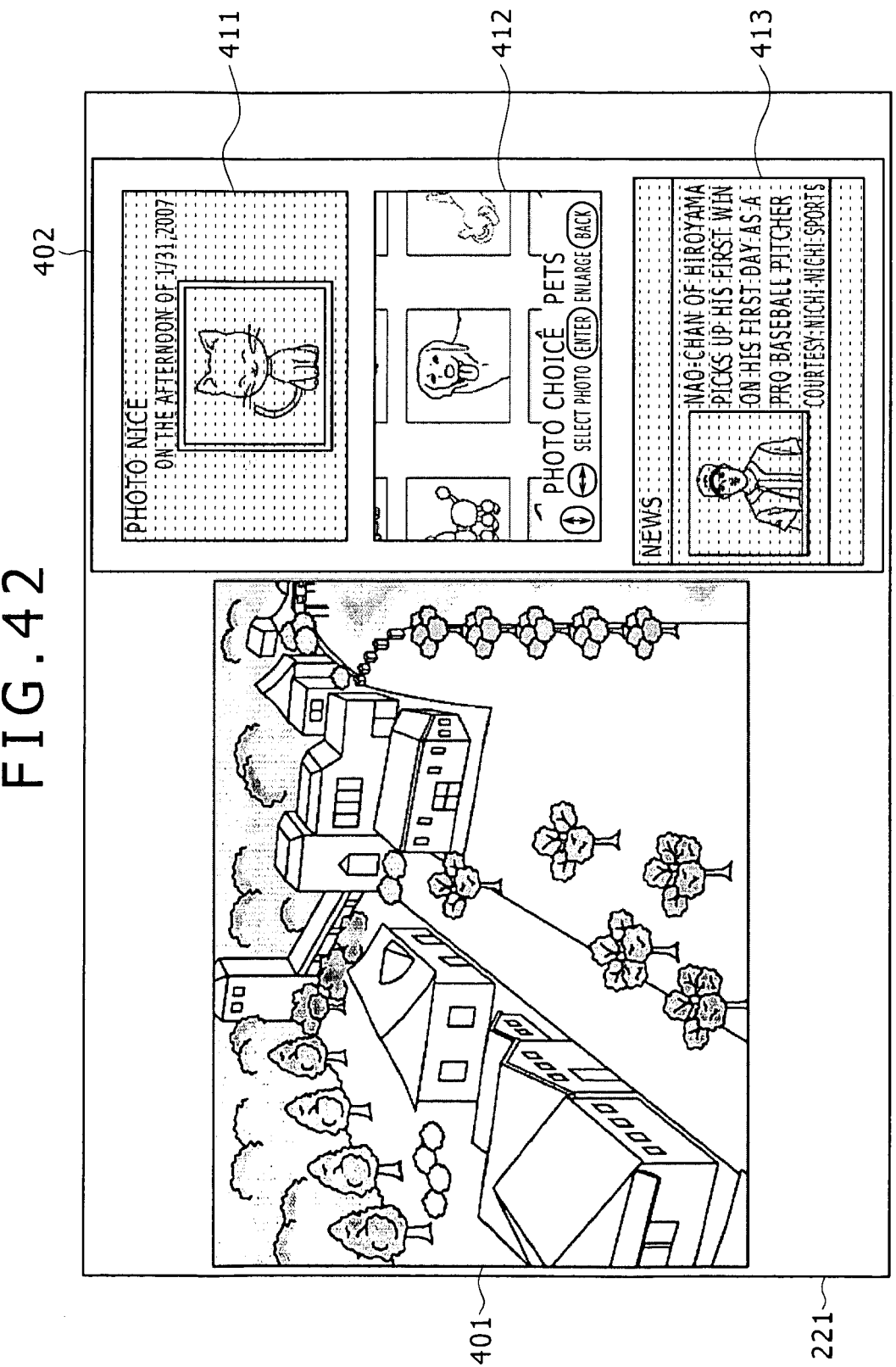
FIG. 42 is a view showing a typical screen displayed on the display panel.
Figure 43:
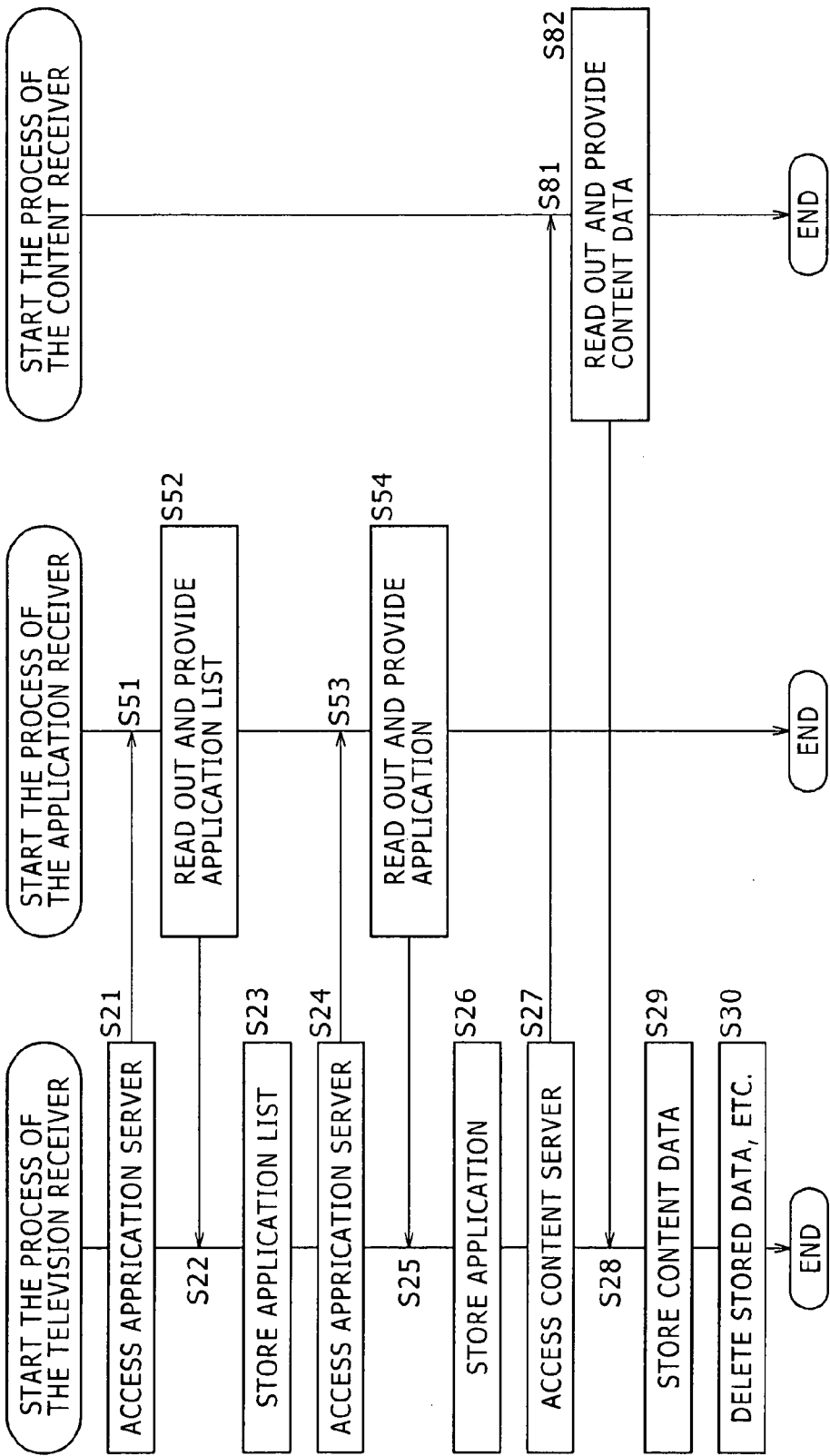
FIG. 43 is a flowchart explanatory of the operations of the system.

When the normal mode screen shown in FIG. 39 is in effect, operating the enter button 272 of the remote controller 251 effects transition to the focus mode screen shown in FIG. 42.

FIG. 42 gives a typical focus mode screen in effect when the application 72-6 named "PHOTO CHOICE" is focused. In the application display area 402, only the area 412 in which the photos from the process performed by the application 72-6 are displayed appears brighter than the other areas.

On the screen named "PHOTO CHOICE" in focus mode, the photo displayed at the center of the normal mode screen upon transition to focus mode appears enlarged, and the photos around the centrally positioned photo are also displayed in enlarged form. Whereas the photo displayed at the center can be seen in its entirety when enlarged, the surrounding photos in enlarged form are only partially displayed.

When the up direction button 271-1 of the remote controller 251 is operated, the application 72-6 exercises control so that the photo positioned just above the photo centrally displayed at that point is displayed in enlarged form at the center. And when the down direction button 271-2 of the remote controller 251 is operated, the application 72-6 exercises control so that the photo positioned just below the photo centrally displayed at that point is displayed in enlarged form at the center.

Also, when the left direction button 271-3 of the remote controller 251 is operated, the application 72-6 exercises control so that the photo positioned on the left of the photo centrally displayed at that point is displayed in enlarged form at the center. And when the right direction button 271-4 of the remote controller 251 is operated, the application 72-6 exercises control so that the photo positioned on the right of the photo centrally displayed at that point is displayed in enlarged form at the center.

Under suitable control, not only the centrally displayed photo but also another photo away from the photo at the center may be displayed when transition is effected to the other photo. At that point, the picture data of the other photo is acquired as needed from the content server 13-1.

Where such control is exercised, with "PHOTO CHOICE" placed in focus mode, the user can get a desired photo displayed at the center in enlarged form by operating the remote controller 251.

In focus mode, the centrally displayed photo may be framed illustratively in yellow, thereby prompting the user to better recognize focus mode in effect and giving a more distinct display of the selected photo.

When focus mode is in effect as shown in FIG. 42, operating the enter button 272 of the remote controller 251 effects transition to active mode and changes screens. Active mode is a mode in which only the information provided by one application 72-6 is displayed as explained above. In the application display area 402, an active screen 621 indicating only the information provided by the application 72-6 named "PHOTO CHOICE" is displayed as shown in FIG. 37.

When active mode is selected, the activated application 72-6 accesses the content server 13-1 to acquire the content data 131 about the photo choice. When the process based on the acquired content data 131 is carried out, a photo is displayed in the form of the active screen 621.

The active screen 621 shown in FIG. 37 was already explained and thus will not be discussed further in detail. The application 72-6 named "PHOTO CHOICE," as with the application 72-4 named "PHOTO FRIEND," effects transition to the screen displaying an enlarged photo when placed in active mode. At this point, the Web browser is (or may be) started.

As described, normal mode, focus mode, and active mode are provided. The user can acquire information easily in a desired mode while enjoying a television broadcast program.

[Server that Manages the Picture Data of Photos]

As discussed above, the three applications 72-4 through 72-6 named "PHOTO FRIEND," "PHOTO NICE" and "PHOTO CHOICE" each control the display of photos. With regard to the above-described embodiment of the invention, these applications 72-4 through 72-6 for controlling photo display were described as acquiring picture data from the content server 13-1.

The content server 13-1 is structured to relate the ID identifying each user to each photo registered by the user for management purposes so that the application 72-4 named "PHOTO FRIEND" may acquire picture data based on a given ID.

Also, the content server 13-1 is structured to disclose registered photos and to let users evaluate the disclosed photos typically for purpose of ranking management based on these evaluations so that the application 72-5 named "PHOTO NICE" may acquire picture data based on the evaluation ranking.

Also, the content server 13-1 is structured to let each user attach an applicable tag to each photo to be registered by that user for tag-related photo management so that the application 72-6 named "PHOTO CHOICE" may acquire picture data based on a given tag.

Illustratively, the personal computer is used by the user to perform the process of attaching tags to the photos to be registered. The television receiver 14 may also be used for the process. And the photos managed by the content server 13-1 may be viewed on the television receiver 14 through the processes performed by the applications 72-4 through 72-6 as discussed above. These photos may also be viewed on the personal computer.

That is, photos can be registered with the content server 13-1 using the personal computer, and the registered photos may be viewed on the personal computer as well as on the television receiver 14. The content server 13-1 may store the same photo differently at different resolutions for use on the personal computer and on the television receiver 14, or may store the same photo at the same resolution to be used commonly on the personal computer and on the television receiver 14.

People unfamiliar with the personal computer but familiar with the television receiver 14 can easily view the photos registered with the content server 13-1. This is what can be accomplished by this embodiment of the invention. Some television receivers 14 have the capability to capture photos. That type of television receiver 14 can be used to register photos with the content server 13-1. As in the case of viewing, people unfamiliar with the personal computer but familiar with the television receiver 14 can easily register photos with the content server 13-1.

The personal computer and the content server 13-1 generally conduct language-based communications with each other involving the Web browser or the like.

As with the above-described embodiment of the invention, the registered applications 72 and the selected application 72 continuously perform their processes in normal mode or in focus mode even if they do not provide information to the user, i.e., even when they do not display any information on the display panel 221. That is, where normal mode or focus mode is in effect, a plurality of applications 72 perform their processes in parallel. In active mode, all applications 72 except for the activated application 72 stop their processes.

In normal mode or in focus mode, a plurality of applications 72 store data illustratively into the SDRAM 230 for processing purposes. But in active mode, only the activated application 72 is allowed to store necessary data into the memory.

With the above-described circumstances taken into consideration, applications 72 of relatively small sizes typically known as widgets are used in normal mode or in focus mode. And in active mode, a language-based program such as the Web browser is started in place of some applications 72.

The Web browser, as discussed above, is a language commonly used for communications between the personal computer and the content server 13-1. For that reason, starting up the Web browser enables the television receiver 14 to carry out processes similar to those of the personal computer. For example, as shown in FIG. 37, an enlarged photo may be displayed and information accompanying the enlarged photo may be indicated.

With this embodiment of the invention, as described, the applications 72 for performing processes can be changed depending on the mode in effect.

[System Operations]

When the initial screen is displayed as described above, the application list 71 is acquired from the application server 12 and stored into the television receiver 14 side. When display is changed from the initial screen to the normal mode screen, one or a plurality of applications 72 (proper programs of the applications 72) to be started at that point are acquired from the application server 12 and stored into the television receiver 14 side.

Where normal mode or focus mode is in effect, the content server 13 is accessed by the application 72, and the content data 131 is acquired from there and stored into the television receiver 14 side. At this point, the connected content server 13 varies depending on the application 72, and so does the acquired content data 131. And in active mode, the content server 13 and other servers, not shown, are accessed solely by the activated application 72, and the content data 131 and other data are acquired from there and stored into the television receiver 14 side.

Upon transition from the normal mode screen, focus mode screen or active mode screen to the initial screen, the applications 72 and the content data 131 (and other data) are deleted from the television receiver 14 side where they were stored. In this manner, the applications 72 and content data 131 are stored as needed and deleted when they are no longer needed. This makes it possible to reduce the storage area of the television receiver 14 for storing the applications 72 and content data 131.

And because the television receiver 14 side acquires an application 72 as needed, the application, illustratively when it has been updated, can be provided in the updated version to the television receiver 14 side. This makes it possible always to provide the television receiver 14 side with the latest applications 72.

And because the television receiver 14 acquires only the applications 72 listed in the application list 71, appropriate management of the application list 71 prevents malicious applications 72 from getting downloaded to the television receiver 14. And if the period during which to list the applications 72 in the application list 71 is limited, then it is possible to provide the applications 72 to the user side only during that period, which can enlarge the scope of the provided services.

Furthermore, since the television receiver 14 side acquires the content data 131 as needed and deletes the stored content data 131 when it is no longer necessary, frequently updated information such as news articles can be provided to the television receiver 14 in the most recent versions, and the stored information in old versions is prevented from being offered to the user.

Explained below in reference to the flowchart of FIG. 37 are the operations performed by the system shown in FIG. 1 when display screens are changed as discussed above on the television receiver 14. The explanation in reference to the flowchart of FIG. 37 will center on the flow of data through the system shown in FIG. 1.

In step S21, the television receiver 14 accesses the application server 12. During this access, a request for an application list 71 is output.

In step S51, the application server 12 is accessed by the television receiver 14. Upon receipt of the request for the application list 71, the application server 12 goes to step S52, reads from the storage unit 38 (FIG. 4) the application list 71 being managed by the server 12, and provides the retrieved application list 71 to the television receiver 14.

In step S22, the television receiver 14 receives the application list 71 provided by the application server 12. In step S23, the television receiver 14 stores the received application list 71 and displays the initial screen based on the stored application list 71.

In step S24, the television receiver 14 starts accessing the application server 12, triggered by the user selecting a given application 72 from the initial screen. During the access, requests for the user-selected application 72 and for the registered applications 72 are output.

In step S53, the application server 12 is accessed by the television receiver 14. Given the request to provide the application 72, the application server 12 goes to step S54, reads from the storage unit 38 (FIG. 4) the requested application 72 being managed by the server 12, and provides the retrieved application 72 to the television receiver 14. At this point, depending on the request from the television receiver 14 side, a plurality of applications 72 may be read out and provided.

In step S25, the television receiver 14 receives the application 72 provided by the application server 12. In step S26, the television receiver 14 stores the received application 72 and starts the process based on the stored application 72.

In step S27, the television receiver 14 accesses the content server 13. This access is carried out when the content data 131 is deemed necessary while the process based on the application 72 is being executed.

In step S81, the content server 13 is accessed by the television receiver 14. Upon receipt of the request to provide the content data 131, the content server 13 goes to step S82, reads from the storage unit 108 (FIG. 6) the content data 131 being managed by the server 13, and provides the retrieved content data 131 to the television receiver 14.

A different content server 13 is accessed with regard to each application 72, so that relevant content data 131 is acquired.

In step S28, the television receiver 14 receives the content data 131 provided by the content server 13. In step S29, the television receiver 14 stores the received content data 131 and performs the process based on the stored content data 131, such as displaying of text.

Such processes as acquisition and storage of the content data 131 are repeatedly performed in a manner dependent on the application 72. For example, in the case of the application 72 for providing news articles, the content data 131 about news articles is acquired and provided to the user with relatively high frequency. And in the case of the application 72 for providing fortune-telling information, the content data 131 is acquired when the button for carrying out fortune-telling is operated.

Also, such processes as acquisition and storage of the content data 131 are repeatedly performed on the basis of the application 72 in normal mode, in focus mode, or in active mode.

In step S30, the television receiver 14 deletes the stored application 72 and content data 131. This process is triggered illustratively when the user has given an instruction to stop the processing by the application 72 (e.g., when an instruction is given to display the television broadcast program all over the screen) or when the power of the television receiver 14 is turned off.

As described, the application list 71, application 72, and content data 131 are acquired as needed by the television receiver 14 side, and processes are carried out based on the acquired application list 71, application 72, and content data 131. The application list 71, application 72, and content data 131 are deleted when they are no longer needed.

The processing performed by the television receiver 14 will now be described below by referring to the flowcharts shown in FIGS. 44 and 45.

In step S101, the television receiver 14 is given an instruction to view the initial screen. When wishing to view the initial screen, the user operates the remote controller 251 (FIG. 8) to give the television receiver 14 an instruction to display the initial screen. A control code designating the specifics of the instruction output by the remote controller 251 is received by the light reception unit 237 of the television receiver 14 and supplied to its CPU 232. By analyzing the supplied control code, the CPU 232 recognizes the received instruction to display the initial screen and performs its processing accordingly.

In step S102, the CPU 232 controls the network interface 234 and the like to access the application server 12 based on a preset URL. At this point, a request to acquire the application list 71 is also output.

In step S103, the CPU 232 of the television receiver 14 controls the network interface 234 to receive the application list 71 from the accessed application server 12, and stores the received application list 71 into the SDRAM 230.

Here, it is assumed for purpose of explanation that the application list 71 is acquired and stored given the instruction to view the initial screen. Alternatively, the application list 71 may be acquired and stored at other timings. For example, the application list 71 may be acquired when the power of the television receiver 14 is turned on. In such a case, the process of step S101 is triggered by power-up of the television receiver 14.

Also, the application list 71 may be acquired at predetermined intervals or at a predetermined time of day. In such cases, the process in step S101 is triggered by the result of the check that involves determining whether the predetermined interval has passed or the predetermined time or data is reached.

In any case, the application list 71 to be stored in the television receiver 14 side is continuously kept up to date.

In step S104, a check is made to determine whether there exist registered applications 72. The user can register desired applications 72 as discussed above. The information about the registered applications 72, such as IDs for identifying the applications 72, is stored illustratively in the flash memory 231.

Here, it is assumed for purpose of explanation that the information for identifying the applications 72 is stored in the flash memory 231. Alternatively, the IDs may be stored in a storage unit other than the flash memory 231 or in a dedicated storage unit for storing the IDs. It is also assumed for purpose of explanation that the set information is stored in the flash memory 231. Alternatively, the set information may be stored in a storage unit other than the flash memory 231 or in a dedicated storage unit for storing the set information.

The CPU 232 determines whether the IDs for identifying the applications 72 are stored in the flash memory 231. If the IDs are found to be stored, the CPU 232 determines that the registered applications 72 exist and thus proceeds to subsequent processes.

In step S105, the CPU 232 gives the graphic creation circuit 219 an instruction to generate the data of the initial screen based on the application list 71. On the basis of the initial screen data created by the graphic creation circuit 219, the panel drive circuit 220 controls the display panel 221. Under such control, the display panel 221 displays the initial screen such as one shown in FIG. 11.

Upon creation of the initial screen data, if the registered applications 72 were found to exist in step S104, the IDs matching the IDs of the registered applications 72 are detected from the application list 71. The data is then created in such a manner as to display, in the registration status display section 305, icons indicating the registered state of each of the applications 72 corresponding to the detected IDs.

In step S106, a check is made to determine whether any application 72 is selected from the initial screen. By analyzing the control code coming from the remote controller 251, the CPU 232 determines whether the enter button 272 of the remote controller 251 is operated. If the enter button 272 of the remote controller 251 is found to be operated, the CPU 232 determines that an application 72 has been selected from the initial screen.

As shown in FIG. 10, the cursor 311 is displayed on the initial screen. If the enter button 272 of the remote controller 251 is operated while the cursor 311 is being positioned on the icon representing a given application 72, that application 72 is determined to be selected and step S107 is reached.

Although not included in the processing of the flowchart shown in FIG. 44, the CPU 232 controls the graphic generation circuit 219 and the like to display the icon pointing to an application 72 in sliding fashion in the upward or downward direction if the up direction button 271-1 or down direction button 271-2 is found to be operated upon analysis of the control code. That kind of control is exercised as needed based on the control code coming from the remote controller 251.

If in step S106 an application 72 is found to be selected, then step S107 is reached. In step S107, the application server 12 is accessed. In step S108, the selected application 72 is acquired. If the registered applications 72 are found to exist, then both the selected application 72 and all registered applications 72 are acquired. If the utility named "SERVICE CAST" explained above in reference to FIG. 31 is selected, all registered applications 72 are acquired. The acquired applications 72 are stored into the flash memory 231.

In step S109, the CPU 232 starts the processes based on the applications 72 stored in the flash memory 231. In step S110, the content server 13 is accessed. In step S111, the content data 131 is acquired from the accessed content server 13 and stored into the flash memory 231.

Acquisition of the content data 131 is carried out as a process based on an application 72. Thus depending on the application 72, this process could be omitted. If this acquisition process is omitted, then the process of step S112 is omitted as well.

In step S112, processes based on the content data 131 are performed. In accordance with the processes based on the acquired applications 72, the graphic creation circuit 219 creates screen data made up of texts and pictures based on the content data 131. And on the basis of the data thus created, the panel drive circuit 220 controls the display panel 221 to display the normal mode screen such as one shown in FIG. 14.

In step S113 (FIG. 45), a check is made to determine whether an instruction to change to focus mode is given. If the instruction is found to be given, then step S114 is reached. The CPU 232 determines that the instruction to change to focus mode is given upon recognizing that the control code from the remote controller 251 is indicative of the operation performed on the enter button 272. It is assumed here for purpose of explanation that the enter button 272 is operated. If it is recognized that the up direction button 271-1 is operated, then the process based on the result of that recognition is carried out.

In step S114, the application 72 displayed in the area 412 in the middle of the application display area 402 is identified. In step S115, the process for executing the display in focus mode is performed. The display in focus mode is illustratively one shown in FIG. 17 where the upper and the lower areas 411 and 413 in the application display area 402 are dimmed, with buttons displayed in the area 412 in the middle.

The CPU 232 instructs the graphic creation circuit 219 to dim the upper and the lower areas 411 and 413 in the application display area 402 and to display buttons in the middle area 412 if such buttons apply to the application 72 currently displaying its information in the middle area 412. When the process based on these instructions is carried out, the focus mode screen such as one shown in FIG. 17 is displayed on the display panel 221.

In step S116, a check is made to determine whether an instruction to change to active mode is given. If the instruction is found to be given, then step S117 is reached. In step S117, the application 72 currently displayed in the middle area 412 is identified. In step S118, the items set for the identified application 72 are read out.

As explained above in reference to FIG. 20, illustratively the application 72 providing fortune-telling is structured to allow some items such as the constellation to be set. Given a set item (e.g., constellation), the application 72 provides relevant information to be acquired. If the process based on the application 72 displayed in the area 412 involves referencing the set items upon transition to active mode, then the CPU 232 reads out the set items in step S118.

Although it was explained above that the set items are read out upon transition to active mode, the set items may alternatively be read out in normal mode or in focus mode depending on the application 72.

And in active mode, some applications 72 may start the Web browser and transfer control to the processing of the activated Web browser. When the Web browser is started, control is exercised so that the process for acquiring information about television broadcast programs is not carried out.

In step S119, the content server 13 is accessed. In step S120, the content data 131 is acquired and stored. The content data 131 constitutes the information applicable to the set items. In step S121, the active mode screen such as one shown in FIG. 18 is displayed. This is a screen that displays only the information relevant to the application 72 identified in step S117. The information being displayed on the screen is based on the content data 131 acquired and stored in step S120.

When active mode is selected, step S122 is reached and the operations of the applications 72 except for that of the application 72 having its information displayed either in the area 412 or all over the display panel 221 are stopped. That is, the CPU 232 stops processing the applications 72 except for the application 72 identified in step S117.

In step S123, a check is made to determine whether an instruction to end the processes performed by the applications 72 is given. The instruction to end the processing of the applications 72 is deemed given when the user has issued the end instruction, when an instruction to display only television broadcast programs is given, or when the power of the television receiver 14 is turned off.

If in step S123 the instruction to terminate the processing is found to be given, then step S124 is reached and the stored applications 72 and content data 131 are deleted. In this manner, the stored data and the like are discarded when they are no longer needed. In other words, the stored information other than the set information is deleted, which leaves only the set information stored.

As described, the applications 72 and content data are acquired by the television receiver 14 side when they are needed, and are discarded when they are no longer necessary. This makes it possible to make effective use of the storage unit such as the flash memory 231, and to let a plurality of applications 72 run in parallel even if only a small storage capacity is available.

The processing explained above in reference to the flowcharts of FIGS. 44 and 45 is merely an example. Some steps such as that of acquiring the content data 131 may be omitted depending on the application 72.

Whereas the above-described embodiment of the invention has adopted the television receiver 14 as an example, this embodiment may be applied not only to the television receiver 14 but also to CE equipment such as DVD recorders.

In connection with the above embodiment of the invention, it was explained that the applications 72 may be such programs as widgets. Generally, the widgets are downloaded to the personal computer prior to use. When installed, the widgets are typically used in resident fashion. With the above-described embodiment, however, the applications are downloaded upon use and discarded when they are no longer necessary. Handled in this manner, the applications 72 are expected to offer diverse effects as discussed above.

And the applications 72 as part of the above-described embodiment may each be hierarchically structured. Also, illustratively the application 72-4 named "PHOTO FRIEND" need not be registered alone; a plurality of units of this kind of application may be registered. For example, the application 72-4 named "PHOTO FRIEND" may be registered individually for each of a plurality of friends. Naturally, this invention is not limited to the above-described applications 72; the invention may also be applied to other applications.

[Recording Medium]

The series of the steps described above may be executed by hardware or by software. Where the software-based processing is to be carried out, the programs constituting processing sequences may be either executed by a computer when incorporated in its dedicated hardware, or installed at program execution time from a suitable program recording medium into a general-purpose personal computer or like equipment capable of executing diverse functions based on the installed programs.

For example, the programs executed by the computer (CPU 31) structured as the application server 12 shown in FIG. 2 may be distributed recorded on the removable media 41 constituting package media such as magnetic disks (including flexible disks), optical disks (including CD-ROM (Compact Disc-Read Only Memory) and DVD (Digital Versatile Disc)), magneto-optical disks, or semiconductor memory; or may be offered through wired or wireless communication media such as local area networks, the Internet, and digital satellite broadcasts.

And when the removable media 41 are attached to the drive 40, the programs can be installed from the media into the storage unit 38 through the input/output interface 35. Also, the programs may be received by the communication unit 39 through wired or wireless communication media and installed into the storage unit 38. Alternatively, the programs may be preinstalled in the ROM 32 or in the storage unit 38.

Also, the programs for execution by the computer may be processed in the depicted sequence of this specification (i.e., on a time series basis), in parallel, or in otherwise necessarily timed fashion such as when they are invoked.

And in this specification, the term "system" refers to an entire configuration made up of a plurality of component devices.

It should be understood that the present invention when embodied is not limited to the above-described embodiment and that various modifications, variations and alternatives may be made of the invention so far as they are within the scope of the appended claims or the equivalents thereof.

The invention claimed is:

1. An information processing device comprising:
list acquisition means for accessing a first device based on a stored URL to acquire a list of information about a plurality of applications stored in the first device;
list display control means for controlling display of said list on a display device;
application acquisition means for accessing a second device to acquire an application therefrom;
content data acquisition means for executing a process based on said application and, in the course of the process, accessing a third device to acquire content data therefrom;
storage means for storing information including said application and said content data;
display control means for controlling the display based on said application and said content data; and
discarding means for discarding said application and said content data from said storage means when the process based on said application is terminated;
wherein, said information processing device is configured to enable (i) multiple applications from the plurality of applications to be registered for execution, (ii) a simultaneous start of all of said registered multiple applications based on a single request from a user to execute a single application, and (iii) a simultaneous display on the display device of said registered multiple applications after the request from the user.

2. The information processing device according to claim 1, wherein, if there exist applications that have been registered for simultaneous execution, then said application acquisition means acquires all the registered applications, wherein said content data acquisition means accesses a different unit of said third device for each of the applications and acquires content data therefrom; and
wherein said display control means controls the display using the content data corresponding to each of the applications.

3. The information processing device according to claim 1, wherein said first device and said second device are the same device, and wherein said third device differs with regard to each of said applications listed in said list.

4. The information processing device according to claim 1, wherein said applications are widgets.

5. An information processing method comprising:
a list acquisition step of controlling communication means to access a first device based on a stored URL to acquire a list of information about a plurality of applications stored in the first device;
a list display control step of controlling display of said list on display means;
an application acquisition step of controlling said communication means to access a second device and acquire an application therefrom;
a content data acquisition step of controlling said communication means to execute a process based on said application and, in the course of the process, to access a third device and acquire content data therefrom;
a display control step of controlling the display based on said application and said content data on said display means; and
a discarding step of controlling storage means to discard said application and said content data stored in said storage means when the process based on said application is terminated;
wherein, said information processing method further comprises (i) registering multiple applications from the plurality of applications for execution, (ii) simultaneously starting all of said registered multiple applications based on a single request from a user to execute a single application, and (iii) simultaneously displaying on the display means of said registered multiple applications after the request from the user.

6. A non-transitory computer-readable medium storing computer-executable instructions which, when executed by a processor, perform steps comprising:
- a list acquisition step of controlling communication means to access a first device based on a stored URL to acquire a list of information about a plurality of applications stored in the first device;
- a list display control step of controlling display of said list on display means;
- an application acquisition step of controlling said communication means to access a second device and acquire an application therefrom;
- a content data acquisition step of controlling said communication means to execute a process based on said application and, in the course of the process, to access a third device and acquire content data therefrom;
- a display control step of controlling the display based on said application and said content data on said display means; and
- a discarding step of controlling storage means to discard said application and said content data stored in said storage means when the process based on said application is terminated;
- and steps of (i) registering multiple applications from the plurality of applications for execution, (ii) simultaneously starting all of said registered multiple applications based on a single request from a user to execute a single application, and (iii) simultaneously displaying on the display means of said registered multiple applications after the request from the user.

* * * * *